(12) United States Patent
Okamoto et al.

(10) Patent No.: US 6,989,845 B1
(45) Date of Patent: Jan. 24, 2006

(54) MOTION PICTURE PSEUDO CONTOUR CORRECTING METHOD AND IMAGE DISPLAY DEVICE USING THE METHOD

(75) Inventors: Shigetsugu Okamoto, Toride (JP); Tadao Kyomoto, Matsudo (JP)

(73) Assignee: Sharp Kabushiki Kaisha, Osaka (JP)

( * ) Notice: Subject to any disclaimer, the term of this patent is extended or adjusted under 35 U.S.C. 154(b) by 750 days.

(21) Appl. No.: 09/658,136

(22) Filed: Sep. 8, 2000

(30) Foreign Application Priority Data

Sep. 9, 1999 (JP) ................................. 11-256368

(51) Int. Cl.
G09G 5/10 (2006.01)

(52) U.S. Cl. ...................................... 345/691; 345/690

(58) Field of Classification Search .................. 345/60, 345/63, 77, 89, 690, 691, 694; 348/606, 348/620, 621, 625, 627
See application file for complete search history.

(56) References Cited

U.S. PATENT DOCUMENTS

| | | | | |
|---|---|---|---|---|
| 5,387,947 A | * | 2/1995 | Shin ............................ | 348/699 |
| 5,420,633 A | * | 5/1995 | Matoba ....................... | 348/242 |
| 5,907,316 A | * | 5/1999 | Mikoshiba et al. .......... | 345/596 |
| 5,926,224 A | * | 7/1999 | Nagasawa ............... | 375/240.14 |
| 6,061,100 A | * | 5/2000 | Ward et al. ................. | 348/607 |
| 6,310,588 B1 | * | 10/2001 | Kawahara et al. ............ | 345/63 |
| 6,329,980 B1 | * | 12/2001 | Uehara et al. ............... | 345/204 |
| 6,344,839 B1 | * | 2/2002 | Denda et al. ................. | 345/60 |
| 6,373,477 B1 | * | 4/2002 | Van Dijk ..................... | 345/204 |
| 6,388,678 B1 | * | 5/2002 | Kasahara et al. ........... | 345/690 |
| 6,414,657 B1 | * | 7/2002 | Kasahara et al. ............. | 345/63 |

FOREIGN PATENT DOCUMENTS

| | | |
|---|---|---|
| JP | 10-133623 A | 5/1922 |
| JP | 7152017 A | 6/1995 |

(Continued)

OTHER PUBLICATIONS

Ishii, Kenji et al., Technical Report of IEICE, EID97-54 (Oct. 1997), pp. 43-48, "Consideration on Improving Motion Picture Quality of PDP with use of a Sub-field Method" (translation of relevant passages provided).

(Continued)

*Primary Examiner*—Dennis-Doon Chow
*Assistant Examiner*—Tom V. Sheng
(74) *Attorney, Agent, or Firm*—Birch, Stewart, Kolasch & Birch, LLP

(57) ABSTRACT

A gray level shift is detected as to adjacent pixels in the same field as that of an original signal inputted, so that gray level information is obtained. Concurrently with this step, a motion speed of the picture is detected as to each pixel of the original signal, so that motion information is obtained. A correction gray level signal according to the foregoing gray level information and motion information is obtained, and the correction gray level signal is outputted to the original signal. It therefore results in that a motion picture pseudo contour is detected as to two factors of space and time, and hence, not only the magnitude of gray level turbulence but also a range of pixels affected by the gray level turbulence can be accurately detected.

14 Claims, 66 Drawing Sheets

U.S. PATENT DOCUMENTS

| | | |
|---|---|---|
| JP | 9-102921 | 4/1997 |
| JP | 10-39828 | 2/1998 |
| JP | 10-133638 | 12/1998 |
| JP | 11-48928 | 2/1999 |
| JP | 11-212517 | 8/1999 |
| JP | 11-231832 | 8/1999 |
| JP | 11-327497 | 11/1999 |
| JP | 2001-34223 | 2/2001 |

FOREIGN PATENT DOCUMENTS

| | | |
|---|---|---|
| WO | WO 01/10131 A1 | 2/2001 |

OTHER PUBLICATIONS

Mikoshiba, Shigeo, IDW 1996, pp. 251-254, "Dynamic False Contours on PDPs—Fatal or Curable?".

* cited by examiner

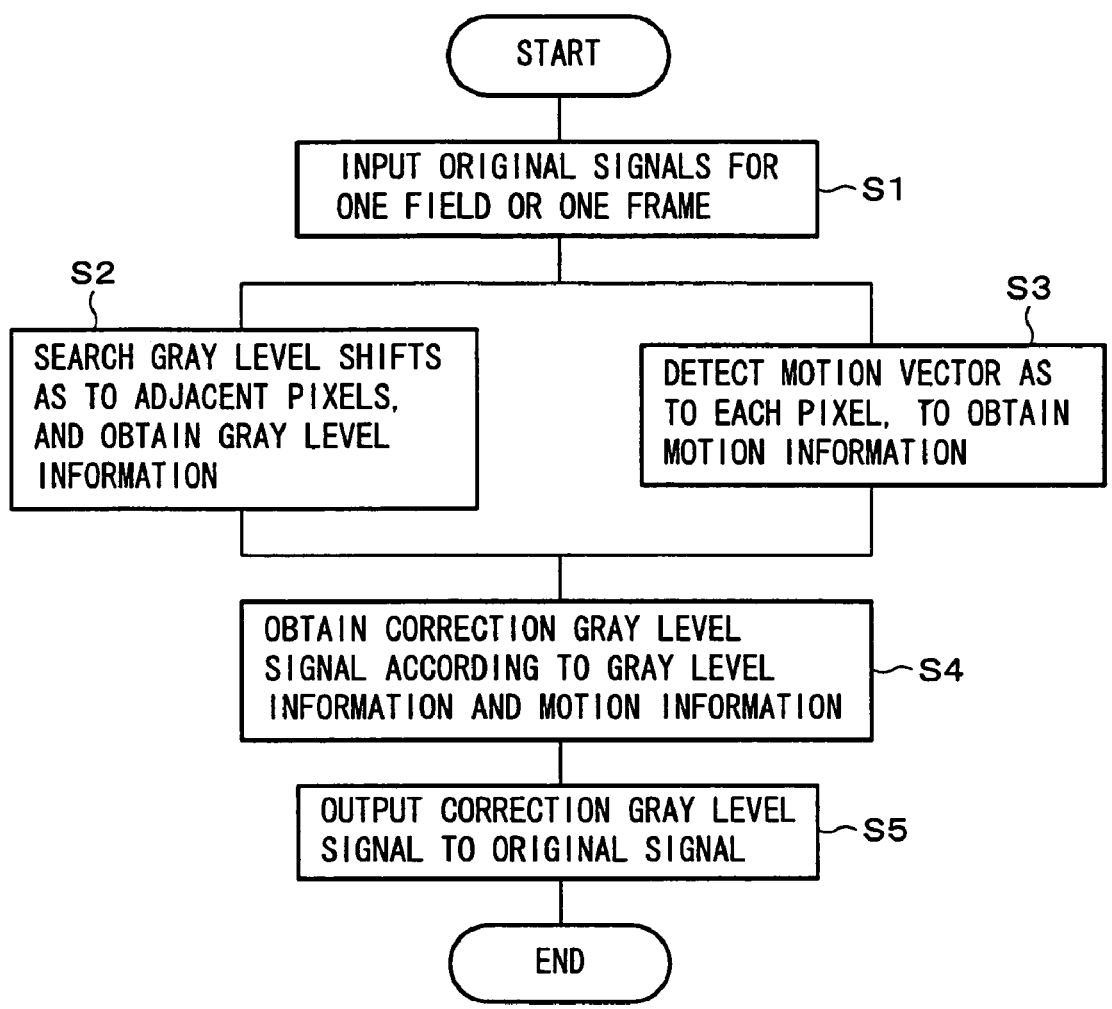
F I G. 1

SCREEN HORIZONTAL DIRECTION

SCREEN VERTICAL DIRECTION

1 PIXEL

F I G. 4
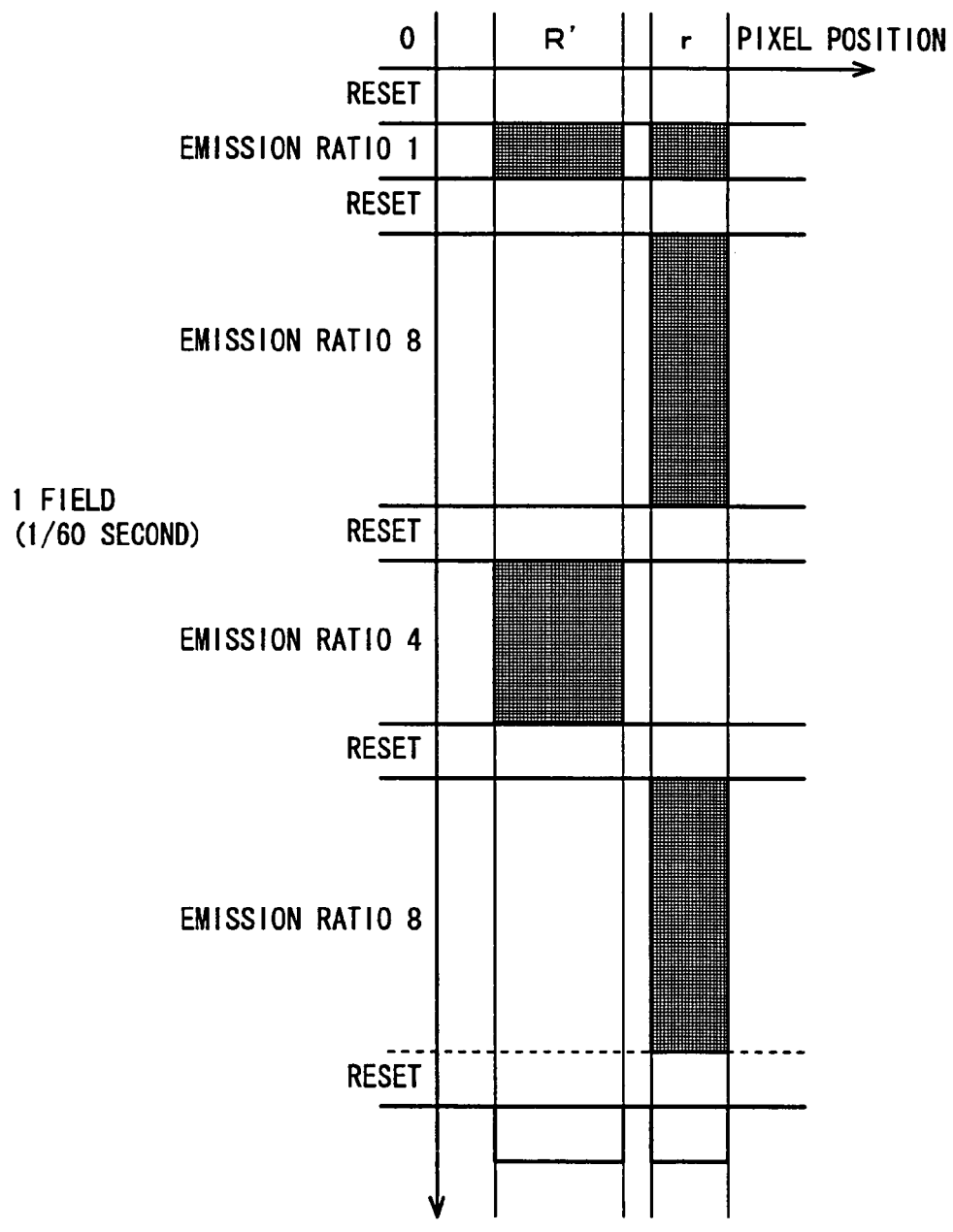

FIG. 5

FIRST REDUNDANCY SIGNAL PATTERN 1

| SUB-FIELD | SF1 | | SF2 | | SF3 | | SF4 | |
|---|---|---|---|---|---|---|---|---|
| TIME DIVISION RATIO | 1 | | 8 | | 4 | | 8 | |
| PIXEL DIVISION RATIO | 1 | 2 | 1 | 2 | 1 | 2 | 1 | 2 |
| GRAY LEVEL/WEIGHT TOTAL | 1 | 2 | 8 | 16 | 4 | 8 | 8 | 16 |
| 0 | 0 | 0 | 0 | 0 | 0 | 0 | 0 | 0 |
| 1 | 1 | 0 | 0 | 0 | 0 | 0 | 0 | 0 |
| 2 | 0 | 1 | 0 | 0 | 0 | 0 | 0 | 0 |
| 3 | 1 | 1 | 0 | 0 | 0 | 0 | 0 | 0 |
| 4 | 0 | 0 | 0 | 0 | 1 | 0 | 0 | 0 |
| 5 | 1 | 0 | 0 | 0 | 1 | 0 | 0 | 0 |
| 6 | 0 | 1 | 0 | 0 | 1 | 0 | 0 | 0 |
| 7 | 1 | 1 | 0 | 0 | 1 | 0 | 0 | 0 |
| 8 | 0 | 0 | 0 | 0 | 0 | 1 | 0 | 0 |
| 9 | 1 | 0 | 0 | 0 | 0 | 1 | 0 | 0 |
| 10 | 0 | 1 | 0 | 0 | 0 | 1 | 0 | 0 |
| 11 | 1 | 1 | 0 | 0 | 0 | 1 | 0 | 0 |
| 12 | 0 | 0 | 0 | 0 | 1 | 1 | 0 | 0 |
| 13 | 1 | 0 | 0 | 0 | 1 | 1 | 0 | 0 |
| 14 | 0 | 1 | 0 | 0 | 1 | 1 | 0 | 0 |
| 15 | 1 | 1 | 0 | 0 | 1 | 1 | 0 | 0 |
| 16 | 0 | 0 | 1 | 0 | 0 | 0 | 1 | 0 |
| 17 | 1 | 0 | 1 | 0 | 0 | 0 | 1 | 0 |
| 18 | 0 | 1 | 1 | 0 | 0 | 0 | 1 | 0 |
| 19 | 1 | 1 | 1 | 0 | 0 | 0 | 1 | 0 |
| 20 | 0 | 0 | 1 | 0 | 1 | 0 | 1 | 0 |
| 21 | 1 | 0 | 1 | 0 | 1 | 0 | 1 | 0 |
| 22 | 0 | 1 | 1 | 0 | 1 | 0 | 1 | 0 |
| 23 | 1 | 1 | 1 | 0 | 1 | 0 | 1 | 0 |
| 24 | 0 | 0 | 1 | 0 | 0 | 1 | 1 | 0 |
| 25 | 1 | 0 | 1 | 0 | 0 | 1 | 1 | 0 |
| 26 | 0 | 1 | 1 | 0 | 0 | 1 | 1 | 0 |
| 27 | 1 | 1 | 1 | 0 | 0 | 1 | 1 | 0 |
| 28 | 0 | 0 | 1 | 0 | 1 | 1 | 1 | 0 |
| 29 | 1 | 0 | 1 | 0 | 1 | 1 | 1 | 0 |
| 30 | 0 | 1 | 1 | 0 | 1 | 1 | 1 | 0 |
| 31 | 1 | 1 | 1 | 0 | 1 | 1 | 1 | 0 |
| 32 | 0 | 0 | 0 | 1 | 0 | 0 | 0 | 1 |
| 33 | 1 | 0 | 0 | 1 | 0 | 0 | 0 | 1 |
| 34 | 0 | 1 | 0 | 1 | 0 | 0 | 0 | 1 |
| 35 | 1 | 1 | 0 | 1 | 0 | 0 | 0 | 1 |
| 36 | 0 | 0 | 0 | 1 | 1 | 0 | 0 | 1 |
| 37 | 1 | 0 | 0 | 1 | 1 | 0 | 0 | 1 |
| 38 | 0 | 1 | 0 | 1 | 1 | 0 | 0 | 1 |
| 39 | 1 | 1 | 0 | 1 | 1 | 0 | 0 | 1 |
| 40 | 0 | 0 | 0 | 1 | 0 | 1 | 0 | 1 |
| 41 | 1 | 0 | 0 | 1 | 0 | 1 | 0 | 1 |
| 42 | 0 | 1 | 0 | 1 | 0 | 1 | 0 | 1 |
| 43 | 1 | 1 | 0 | 1 | 0 | 1 | 0 | 1 |
| 44 | 0 | 0 | 0 | 1 | 1 | 1 | 0 | 1 |
| 45 | 1 | 0 | 0 | 1 | 1 | 1 | 0 | 1 |
| 46 | 0 | 1 | 0 | 1 | 1 | 1 | 0 | 1 |
| 47 | 1 | 1 | 0 | 1 | 1 | 1 | 0 | 1 |
| 48 | 0 | 0 | 1 | 1 | 0 | 0 | 1 | 1 |
| 49 | 1 | 0 | 1 | 1 | 0 | 0 | 1 | 1 |
| 50 | 0 | 1 | 1 | 1 | 0 | 0 | 1 | 1 |
| 51 | 1 | 1 | 1 | 1 | 0 | 0 | 1 | 1 |
| 52 | 0 | 0 | 1 | 1 | 1 | 0 | 1 | 1 |
| 53 | 1 | 0 | 1 | 1 | 1 | 0 | 1 | 1 |
| 54 | 0 | 1 | 1 | 1 | 1 | 0 | 1 | 1 |
| 55 | 1 | 1 | 1 | 1 | 1 | 0 | 1 | 1 |
| 56 | 0 | 0 | 1 | 1 | 0 | 1 | 1 | 1 |
| 57 | 1 | 0 | 1 | 1 | 0 | 1 | 1 | 1 |
| 58 | 0 | 1 | 1 | 1 | 0 | 1 | 1 | 1 |
| 59 | 1 | 1 | 1 | 1 | 0 | 1 | 1 | 1 |
| 60 | 0 | 0 | 1 | 1 | 1 | 1 | 1 | 1 |
| 61 | 1 | 0 | 1 | 1 | 1 | 1 | 1 | 1 |
| 62 | 0 | 1 | 1 | 1 | 1 | 1 | 1 | 1 |
| 63 | 1 | 1 | 1 | 1 | 1 | 1 | 1 | 1 |

FIG. 6

FIRST REDUNDANCY SIGNAL PATTERN 2

| SUB-FIELD | SF1 | | SF2 | | SF3 | | SF4 | |
|---|---|---|---|---|---|---|---|---|
| TIME DIVISION RATIO | 1 | | 8 | | 4 | | 8 | |
| PIXEL DIVISION RATIO | 1 | 2 | 1 | 2 | 1 | 2 | 1 | 2 |
| GRAY LEVEL/ WEIGHT TOTAL | 1 | 2 | 8 | 16 | 4 | 8 | 8 | 16 |
| 0 | 0 | 0 | 0 | 0 | 0 | 0 | 0 | 0 |
| 1 | 1 | 0 | 0 | 0 | 0 | 0 | 0 | 0 |
| 2 | 0 | 1 | 0 | 0 | 0 | 0 | 0 | 0 |
| 3 | 1 | 1 | 0 | 0 | 0 | 0 | 0 | 0 |
| 4 | 0 | 0 | 0 | 0 | 1 | 0 | 0 | 0 |
| 5 | 1 | 0 | 0 | 0 | 1 | 0 | 0 | 0 |
| 6 | 0 | 1 | 0 | 0 | 1 | 0 | 0 | 0 |
| 7 | 1 | 1 | 0 | 0 | 1 | 0 | 0 | 0 |
| 8 | 0 | 0 | 1 | 0 | 0 | 0 | 0 | 0 |
| 9 | 1 | 0 | 1 | 0 | 0 | 0 | 0 | 0 |
| 10 | 0 | 1 | 1 | 0 | 0 | 0 | 0 | 0 |
| 11 | 1 | 1 | 1 | 0 | 0 | 0 | 0 | 0 |
| 12 | 0 | 0 | 1 | 0 | 1 | 0 | 0 | 0 |
| 13 | 1 | 0 | 1 | 0 | 1 | 0 | 0 | 0 |
| 14 | 0 | 1 | 1 | 0 | 1 | 0 | 0 | 0 |
| 15 | 1 | 1 | 1 | 0 | 1 | 0 | 0 | 0 |
| 16 | 0 | 0 | 1 | 0 | 0 | 1 | 0 | 0 |
| 17 | 1 | 0 | 1 | 0 | 0 | 1 | 0 | 0 |
| 18 | 0 | 1 | 1 | 0 | 0 | 1 | 0 | 0 |
| 19 | 1 | 1 | 1 | 0 | 0 | 1 | 0 | 0 |
| 20 | 0 | 0 | 1 | 0 | 1 | 1 | 0 | 0 |
| 21 | 1 | 0 | 1 | 0 | 1 | 1 | 0 | 0 |
| 22 | 0 | 1 | 1 | 0 | 1 | 1 | 0 | 0 |
| 23 | 1 | 1 | 1 | 0 | 1 | 1 | 0 | 0 |
| 24 | 0 | 0 | 0 | 1 | 0 | 0 | 1 | 0 |
| 25 | 1 | 0 | 0 | 1 | 0 | 0 | 1 | 0 |
| 26 | 0 | 1 | 0 | 1 | 0 | 0 | 1 | 0 |
| 27 | 1 | 1 | 0 | 1 | 0 | 0 | 1 | 0 |
| 28 | 0 | 0 | 0 | 1 | 1 | 0 | 1 | 0 |
| 29 | 1 | 0 | 0 | 1 | 1 | 0 | 1 | 0 |
| 30 | 0 | 1 | 0 | 1 | 1 | 0 | 1 | 0 |
| 31 | 1 | 1 | 0 | 1 | 1 | 0 | 1 | 0 |
| 32 | 0 | 0 | 0 | 1 | 0 | 1 | 1 | 0 |
| 33 | 1 | 0 | 0 | 1 | 0 | 1 | 1 | 0 |
| 34 | 0 | 1 | 0 | 1 | 0 | 1 | 1 | 0 |
| 35 | 1 | 1 | 0 | 1 | 0 | 1 | 1 | 0 |
| 36 | 0 | 0 | 0 | 1 | 1 | 1 | 1 | 0 |
| 37 | 1 | 0 | 0 | 1 | 1 | 1 | 1 | 0 |
| 38 | 0 | 1 | 0 | 1 | 1 | 1 | 1 | 0 |
| 39 | 1 | 1 | 0 | 1 | 1 | 1 | 1 | 0 |
| 40 | 0 | 0 | 1 | 1 | 0 | 0 | 0 | 1 |
| 41 | 1 | 0 | 1 | 1 | 0 | 0 | 0 | 1 |
| 42 | 0 | 1 | 1 | 1 | 0 | 0 | 0 | 1 |
| 43 | 1 | 1 | 1 | 1 | 0 | 0 | 0 | 1 |
| 44 | 0 | 0 | 1 | 1 | 1 | 0 | 0 | 1 |
| 45 | 1 | 0 | 1 | 1 | 1 | 0 | 0 | 1 |
| 46 | 0 | 1 | 1 | 1 | 1 | 0 | 0 | 1 |
| 47 | 1 | 1 | 1 | 1 | 1 | 0 | 0 | 1 |
| 48 | 0 | 0 | 1 | 1 | 0 | 1 | 0 | 1 |
| 49 | 1 | 0 | 1 | 1 | 0 | 1 | 0 | 1 |
| 50 | 0 | 1 | 1 | 1 | 0 | 1 | 0 | 1 |
| 51 | 1 | 1 | 1 | 1 | 0 | 1 | 0 | 1 |
| 52 | 0 | 0 | 1 | 1 | 1 | 1 | 0 | 1 |
| 53 | 1 | 0 | 1 | 1 | 1 | 1 | 0 | 1 |
| 54 | 0 | 1 | 1 | 1 | 1 | 1 | 0 | 1 |
| 55 | 1 | 1 | 1 | 1 | 1 | 1 | 0 | 1 |
| 56 | 0 | 0 | 1 | 1 | 0 | 1 | 1 | 1 |
| 57 | 1 | 0 | 1 | 1 | 0 | 1 | 1 | 1 |
| 58 | 0 | 1 | 1 | 1 | 0 | 1 | 1 | 1 |
| 59 | 1 | 1 | 1 | 1 | 0 | 1 | 1 | 1 |
| 60 | 0 | 0 | 1 | 1 | 1 | 1 | 1 | 1 |
| 61 | 1 | 0 | 1 | 1 | 1 | 1 | 1 | 1 |
| 62 | 0 | 1 | 1 | 1 | 1 | 1 | 1 | 1 |
| 63 | 1 | 1 | 1 | 1 | 1 | 1 | 1 | 1 |

FIG. 7

FIRST REDUNDANCY SIGNAL PATTERN 3

| SUB-FIELD | SF1 | SF2 | | SF3 | | SF4 | |
|---|---|---|---|---|---|---|---|
| TIME DIVISION RATIO | 1 | 8 | | 4 | | 8 | |
| PIXEL DIVISION RATIO | 1 | 2 | 1 | 2 | 1 | 2 | 1 | 2 |

| GRAY LEVEL/ WEIGHT TOTAL | 1 | 2 | 8 | 16 | 4 | 8 | 8 | 16 |
|---|---|---|---|---|---|---|---|---|
| 0 | 0 | 0 | 0 | 0 | 0 | 0 | 0 | 0 |
| 1 | 1 | 0 | 0 | 0 | 0 | 0 | 0 | 0 |
| 2 | 0 | 1 | 0 | 0 | 0 | 0 | 0 | 0 |
| 3 | 1 | 1 | 0 | 0 | 0 | 0 | 0 | 0 |
| 4 | 0 | 0 | 0 | 0 | 1 | 0 | 0 | 0 |
| 5 | 1 | 0 | 0 | 0 | 1 | 0 | 0 | 0 |
| 6 | 0 | 1 | 0 | 0 | 1 | 0 | 0 | 0 |
| 7 | 1 | 1 | 0 | 0 | 1 | 0 | 0 | 0 |
| 8 | 0 | 0 | 0 | 0 | 0 | 0 | 1 | 0 |
| 9 | 1 | 0 | 0 | 0 | 0 | 0 | 1 | 0 |
| 10 | 0 | 1 | 0 | 0 | 0 | 0 | 1 | 0 |
| 11 | 1 | 1 | 0 | 0 | 0 | 0 | 1 | 0 |
| 12 | 0 | 0 | 0 | 0 | 1 | 0 | 1 | 0 |
| 13 | 1 | 0 | 0 | 0 | 1 | 0 | 1 | 0 |
| 14 | 0 | 1 | 0 | 0 | 1 | 0 | 1 | 0 |
| 15 | 1 | 1 | 0 | 0 | 1 | 0 | 1 | 0 |
| 16 | 0 | 0 | 0 | 0 | 0 | 1 | 1 | 0 |
| 17 | 1 | 0 | 0 | 0 | 0 | 1 | 1 | 0 |
| 18 | 0 | 1 | 0 | 0 | 0 | 1 | 1 | 0 |
| 19 | 1 | 1 | 0 | 0 | 0 | 1 | 1 | 0 |
| 20 | 0 | 0 | 0 | 0 | 1 | 1 | 1 | 0 |
| 21 | 1 | 0 | 0 | 0 | 1 | 1 | 1 | 0 |
| 22 | 0 | 1 | 0 | 0 | 1 | 1 | 1 | 0 |
| 23 | 1 | 1 | 0 | 0 | 1 | 1 | 1 | 0 |
| 24 | 0 | 0 | 1 | 0 | 0 | 0 | 0 | 1 |
| 25 | 1 | 0 | 1 | 0 | 0 | 0 | 0 | 1 |
| 26 | 0 | 1 | 1 | 0 | 0 | 0 | 0 | 1 |
| 27 | 1 | 1 | 1 | 0 | 0 | 0 | 0 | 1 |
| 28 | 0 | 0 | 1 | 0 | 1 | 0 | 0 | 1 |
| 29 | 1 | 0 | 1 | 0 | 1 | 0 | 0 | 1 |
| 30 | 0 | 1 | 1 | 0 | 1 | 0 | 0 | 1 |
| 31 | 1 | 1 | 1 | 0 | 1 | 0 | 0 | 1 |
| 32 | 0 | 0 | 1 | 0 | 0 | 1 | 0 | 1 |
| 33 | 1 | 0 | 1 | 0 | 0 | 1 | 0 | 1 |
| 34 | 0 | 1 | 1 | 0 | 0 | 1 | 0 | 1 |
| 35 | 1 | 1 | 1 | 0 | 0 | 1 | 0 | 1 |
| 36 | 0 | 0 | 1 | 0 | 1 | 1 | 0 | 1 |
| 37 | 1 | 0 | 1 | 0 | 1 | 1 | 0 | 1 |
| 38 | 0 | 1 | 1 | 0 | 1 | 1 | 0 | 1 |
| 39 | 1 | 1 | 1 | 0 | 1 | 1 | 0 | 1 |
| 40 | 0 | 0 | 0 | 1 | 0 | 0 | 1 | 1 |
| 41 | 1 | 0 | 0 | 1 | 0 | 0 | 1 | 1 |
| 42 | 0 | 1 | 0 | 1 | 0 | 0 | 1 | 1 |
| 43 | 1 | 1 | 0 | 1 | 0 | 0 | 1 | 1 |
| 44 | 0 | 0 | 0 | 1 | 1 | 0 | 1 | 1 |
| 45 | 1 | 0 | 0 | 1 | 1 | 0 | 1 | 1 |
| 46 | 0 | 1 | 0 | 1 | 1 | 0 | 1 | 1 |
| 47 | 1 | 1 | 0 | 1 | 1 | 0 | 1 | 1 |
| 48 | 0 | 0 | 0 | 1 | 0 | 1 | 1 | 1 |
| 49 | 1 | 0 | 0 | 1 | 0 | 1 | 1 | 1 |
| 50 | 0 | 1 | 0 | 1 | 0 | 1 | 1 | 1 |
| 51 | 1 | 1 | 0 | 1 | 0 | 1 | 1 | 1 |
| 52 | 0 | 0 | 0 | 1 | 1 | 1 | 1 | 1 |
| 53 | 1 | 0 | 0 | 1 | 1 | 1 | 1 | 1 |
| 54 | 0 | 1 | 0 | 1 | 1 | 1 | 1 | 1 |
| 55 | 1 | 1 | 0 | 1 | 1 | 1 | 1 | 1 |
| 56 | 0 | 0 | 1 | 1 | 0 | 1 | 1 | 1 |
| 57 | 1 | 0 | 1 | 1 | 0 | 1 | 1 | 1 |
| 58 | 0 | 1 | 1 | 1 | 0 | 1 | 1 | 1 |
| 59 | 1 | 1 | 1 | 1 | 0 | 1 | 1 | 1 |
| 60 | 0 | 0 | 1 | 1 | 1 | 1 | 1 | 1 |
| 61 | 1 | 0 | 1 | 1 | 1 | 1 | 1 | 1 |
| 62 | 0 | 1 | 1 | 1 | 1 | 1 | 1 | 1 |
| 63 | 1 | 1 | 1 | 1 | 1 | 1 | 1 | 1 |

STATIC STATE

+1 PIXEL/FIELD

−1 PIXEL/FIELD

+2 PIXEL/FIELD

-2 PIXEL/FIELD

+3 PIXEL/FIELD

-3 PIXEL/FIELD

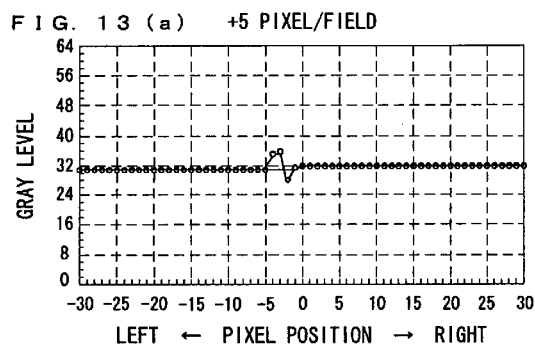
FIG. 13 (a)   +5 PIXEL/FIELD
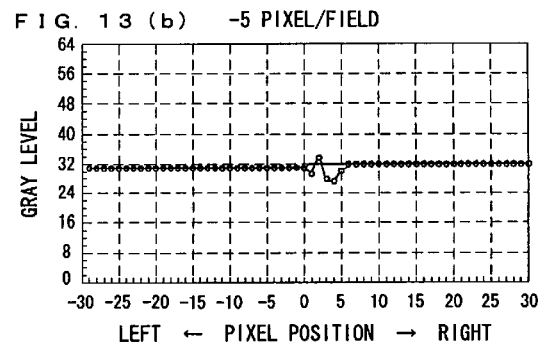
FIG. 13 (b)   −5 PIXEL/FIELD
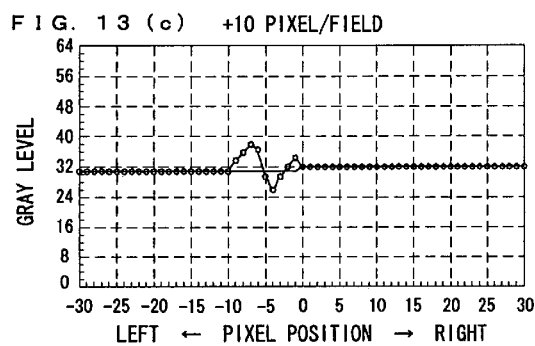
FIG. 13 (c)   +10 PIXEL/FIELD
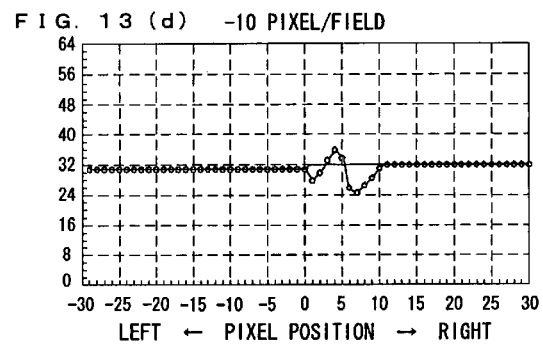
FIG. 13 (d)   −10 PIXEL/FIELD
\* In each drawing, O indicates a motion picture contour hindrance value, and − indicates an output gray level value of an original picture. The first redundancy signal pattern 1 is used.

F I G. 14 (a)
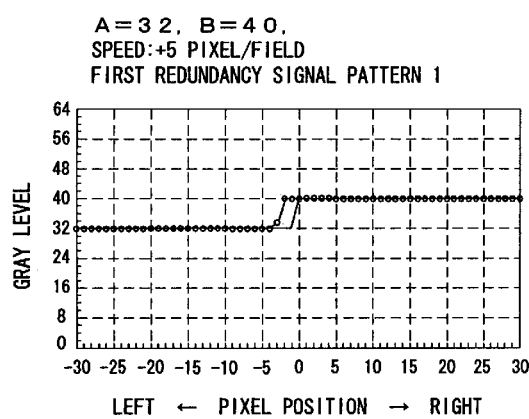
A=32, B=40,
SPEED:+5 PIXEL/FIELD
FIRST REDUNDANCY SIGNAL PATTERN 1
F I G. 14 (b)
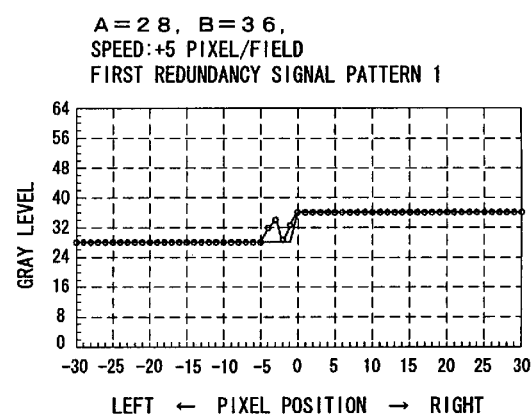
A=28, B=36,
SPEED:+5 PIXEL/FIELD
FIRST REDUNDANCY SIGNAL PATTERN 1

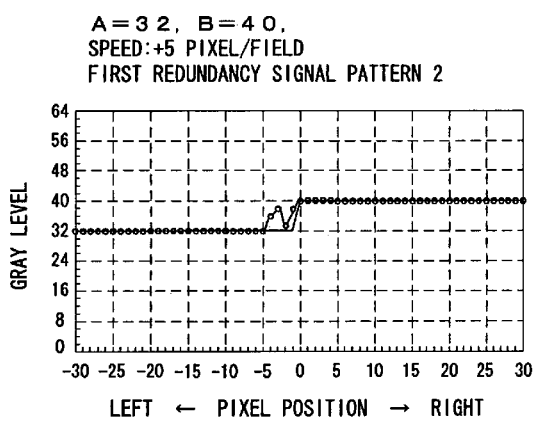
F I G. 15 (a)
A=32, B=40,
SPEED:+5 PIXEL/FIELD
FIRST REDUNDANCY SIGNAL PATTERN 2
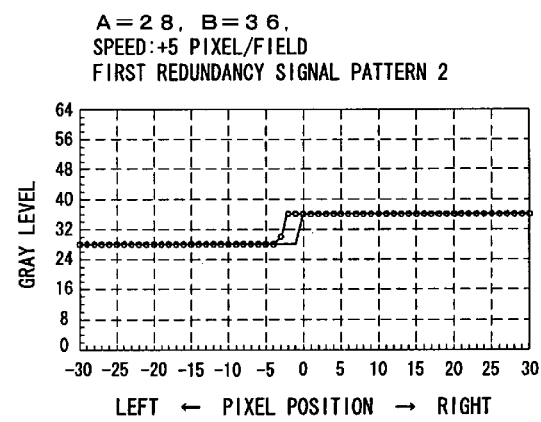
F I G. 15 (b)
A=28, B=36,
SPEED:+5 PIXEL/FIELD
FIRST REDUNDANCY SIGNAL PATTERN 2

FIG. 18

OUTPUT CORRECTION GRAY LEVEL DEPENDENT ON POSITIVE MOTION
SPEED IN HORIZONTAL DIRECTION WHEN A=35 AND B=40
NUMBER IN () INDICATES REDUNDANCY PATTERN NUMBER.

| SPEED | PIXEL DISTANCE n FROM PIXEL A [PIXEL] | | | | | | | |
|---|---|---|---|---|---|---|---|---|
| [PIXEL/FIELD] | 0 | 1 | 2 | 3 | 4 | 5 | 6 | 7 |
| 0 | 3 5 (1) | 4 0 (1) | ( CORRECTION IS UNNECESSARY FOR THIS SPEED ) | | | | | |
| 1 | 3 5 (1) | 3 2 (1) | | | | | | |
| 2 | 3 5 (1) | 3 2 (1) | | | | | | |
| 3 | 3 5 (1) | 3 2 (1) | 3 2 (1) | | | | | |
| 4 | 3 5 (1) | 3 2 (1) | 3 2 (1) | | | | | |
| 5 | 3 5 (1) | 3 2 (1) | 3 2 (1) | | | | | |
| 6 | 3 5 (1) | 3 2 (1) | 3 2 (1) | 3 2 (1) | | | | |
| 7 | 3 5 (1) | 3 2 (1) | 3 2 (1) | 3 2 (1) | | | | |
| 8 | 3 5 (1) | 3 2 (1) | 3 2 (1) | 3 2 (1) | 3 2 (1) | | | |
| 9 | 3 5 (1) | 3 2 (1) | 3 2 (1) | 3 2 (1) | 3 2 (1) | | | |
| 1 0 | 3 5 (1) | 3 2 (1) | 3 2 (1) | 3 2 (1) | 3 2 (1) | 3 2 (1) | | |
| 1 1 | 3 5 (1) | 3 2 (1) | 3 2 (1) | 3 2 (1) | 3 2 (1) | 3 2 (1) | | |
| 1 2 | 3 5 (1) | 3 2 (1) | 3 2 (1) | 3 2 (1) | 3 2 (1) | 3 2 (1) | 3 2 (1) | |
| 1 3 | 3 5 (1) | 3 2 (1) | 3 2 (1) | 3 2 (1) | 3 2 (1) | 3 2 (1) | 3 2 (1) | |
| 1 4 | 3 5 (1) | 3 2 (1) | 3 2 (1) | 3 2 (1) | 3 2 (1) | 3 2 (1) | 3 2 (1) | 3 2 (1) |
| 1 5 | 3 5 (1) | 3 2 (1) | 3 2 (1) | 3 2 (1) | 3 2 (1) | 3 2 (1) | 3 2 (1) | 3 2 (1) |

FIG. 19

OUTPUT CORRECTION GRAY LEVEL DEVIATION DEPENDENT ON POSITIVE MOTION SPEED IN HORIZONTAL DIRECTION WHEN A=35 AND B=40

| SPEED [PIXEL/FIELD] | PIXEL DISTANCE n FROM PIXEL A [PIXEL] | | | | | | | |
|---|---|---|---|---|---|---|---|---|
| | 0 | 1 | 2 | 3 | 4 | 5 | 6 | 7 |
| 0 | 0 (1) | 0 (1) | (CORRECTION IS UNNECESSARY FOR THIS SPEED) | | | | | |
| 1 | 0 (1) | −8 (1) | | | | | | |
| 2 | 0 (1) | −8 (1) | | | | | | |
| 3 | 0 (1) | −8 (1) | −8 (1) | | | | | |
| 4 | 0 (1) | −8 (1) | −8 (1) | | | | | |
| 5 | 0 (1) | −8 (1) | −8 (1) | | | | | |
| 6 | 0 (1) | −8 (1) | −8 (1) | −8 (1) | | | | |
| 7 | 0 (1) | −8 (1) | −8 (1) | −8 (1) | | | | |
| 8 | 0 (1) | −8 (1) | −8 (1) | −8 (1) | −8 (1) | | | |
| 9 | 0 (1) | −8 (1) | −8 (1) | −8 (1) | −8 (1) | | | |
| 10 | 0 (1) | −8 (1) | −8 (1) | −8 (1) | −8 (1) | −8 (1) | | |
| 11 | 0 (1) | −8 (1) | −8 (1) | −8 (1) | −8 (1) | −8 (1) | | |
| 12 | 0 (1) | −8 (1) | −8 (1) | −8 (1) | −8 (1) | −8 (1) | −8 (1) | |
| 13 | 0 (1) | −8 (1) | −8 (1) | −8 (1) | −8 (1) | −8 (1) | −8 (1) | |
| 14 | 0 (1) | −8 (1) | −8 (1) | −8 (1) | −8 (1) | −8 (1) | −8 (1) | −8 (1) |
| 15 | 0 (1) | −8 (1) | −8 (1) | −8 (1) | −8 (1) | −8 (1) | −8 (1) | −8 (1) |

FIG. 20

| | A\B | 0 1 2 3 | 4 5 6 7 | 8 9 10 11 | 12 13 14 15 | 16 17 18 19 | 20 21 22 23 | 24 25 26 27 | 28 29 30 31 |
|---|---|---|---|---|---|---|---|---|---|
| GRAY LEVEL VALUE A BEFORE GRAY LEVEL SHIFT FOCUSED PIXEL ↓ | 0<br>1<br>2<br>3 | N | E (1) | E (1) | E (1) | F (2) | F (2) | F (2) | F (2) |
| | 4<br>5<br>6<br>7 | E (1) | N | E (1) | E (1) | F (2) | F (2) | F (2) | F (2) |
| | 8<br>9<br>10<br>11 | E (1) | E (1) | N | E (1) | F (2) | F (2) | F (2) | F (2) |
| | 12<br>13<br>14<br>15 | E (1) | E (1) | E (1) | N | C (2) | C (2) | C (2) | C (2) |
| | 16<br>17<br>18<br>19 | C (3) | C (3) | C (3) | C (3) | N | E (1) | E (1) | E (1) |
| | 20<br>21<br>22<br>23 | F (3) | F (3) | F (3) | F (3) | E (1) | N | E (1) | E (1) |
| | 24<br>25<br>26<br>27 | F (3) | F (3) | F (3) | F (3) | E (1) | E (1) | N | E (1) |
| | 28<br>29<br>30<br>31 | F (3) | F (3) | F (3) | F (3) | E (1) | E (1) | E (1) | N |

→ GRAY LEVEL VALUE B AFTER GRAY LEVEL SHIFT ADJACENT PIXEL

FIG.21

| | | GRAY LEVEL VALUE B AFTER GRAY LEVEL SHIFT ADJACENT PIXEL | | | | | | | |
|---|---|---|---|---|---|---|---|---|---|
| | A\B | 32 33 34 35 | 36 37 38 39 | 40 41 42 43 | 44 45 46 47 | 48 49 50 51 | 52 53 54 55 | 56 57 58 59 | 60 61 62 63 |
| GRAY LEVEL VALUE A BEFORE GRAY LEVEL SHIFT FOCUSED PIXEL | 0<br>1<br>2<br>3 | F(2) | F(2) | F(2) | F(2) | F(2) | F(2) | F(2) | F(2) |
| | 4<br>5<br>6<br>7 | F(2) | F(2) | F(2) | F(2) | F(2) | F(2) | F(2) | F(2) |
| | 8<br>9<br>10<br>11 | F(2)** | F(2)** | F(2)** | F(2)** | F(2) | F(2) | F(2) | F(2) |
| | 12<br>13<br>14<br>15 | F(2)* | F(2)* | F(2)* | F(2)* | F(2) | F(2) | F(2) | F(2) |
| | 16<br>17<br>18<br>19 | f(2) | f(2) | f(2) | f(2) | F(2) | F(2) | F(2) | F(2) |
| | 20<br>21<br>22<br>23 | f(2) | f(2) | f(2) | f(2) | F(2) | F(2) | F(2) | F(2) |
| | 24<br>25<br>26<br>27 | f(2)* | f(2)* | f(2)* | f(2)* | F(2) | F(2) | F(2) | F(2) |
| | 28<br>29<br>30<br>31 | D(2) | f(2)** | f(2)** | f(2)** | F(2) | F(2) | F(2) | F(2) |

FIG. 22

GRAY LEVEL VALUE B AFTER GRAY LEVEL SHIFT ADJACENT PIXEL

| A\B | 0 1 2 3 | 4 5 6 7 | 8 9 10 11 | 12 13 14 15 | 16 17 18 19 | 20 21 22 23 | 24 25 26 27 | 28 29 30 31 |
|---|---|---|---|---|---|---|---|---|
| 32 33 34 35 | F (3) | F (3) | F (3) | F (3) | f (3) ** | f (3) ** | f (3) ** | D (3) |
| 36 37 38 39 | F (3) | F (3) | F (3) | F (3) | f (3) * | f (3) * | f (3) * | f (3) * |
| 40 41 42 43 | F (3) | F (3) | F (3) | F (3) | f (3) | f (3) | f (3) | f (3) |
| 44 45 46 47 | F (3) | F (3) | F (3) | F (3) | f (3) | f (3) | f (3) | f (3) |
| 48 49 50 51 | F (3) | F (3) | F (3) | F (3) | F (3) * | F (3) * | F (3) * | F (3) * |
| 52 53 54 55 | F (3) | F (3) | F (3) | F (3) | F (3) ** | F (3) ** | F (3) ** | F (3) ** |
| 56 57 58 59 | F (3) | F (3) | F (3) | F (3) | F (3) | F (3) | F (3) | F (3) |
| 60 61 62 63 | F (3) | F (3) | F (3) | F (3) | F (3) | F (3) | F (3) | F (3) |

GRAY LEVEL VALUE A BEFORE GRAY LEVEL SHIFT FOCUSED PIXEL

FIG. 23

GRAY LEVEL VALUE B AFTER GRAY LEVEL SHIFT ADJACENT PIXEL

| A\B | 32 33 34 35 | 36 37 38 39 | 40 41 42 43 | 44 45 46 47 | 48 49 50 51 | 52 53 54 55 | 56 57 58 59 | 60 61 62 63 |
|---|---|---|---|---|---|---|---|---|
| 32 33 34 35 | N | E (1) | E (1) | E (1) | F (2) | F (2) | F (2) | F (2) |
| 36 37 38 39 | E (1) | N | E (1) | E (1) | F (2) | F (2) | F (2) | F (2) |
| 40 41 42 43 | E (1) | E (1) | N | E (1) | F (2) | F (2) | F (2) | F (2) |
| 44 45 46 47 | E (1) | E (1) | E (1) | N | C (2) | C (2) | C (2) | C (2) |
| 48 49 50 51 | C (3) | C (3) | C (3) | C (3) | N | E (1) | E (1) | E (1) |
| 52 53 54 55 | F (3) | F (3) | F (3) | F (3) | E (1) | N | E (1) | E (1) |
| 56 57 58 59 | F (3) | F (3) | F (3) | F (3) | E (1) | E (1) | N | E (1) |
| 60 61 62 63 | F (3) | F (3) | F (3) | F (3) | E (1) | E (1) | E (1) | N |

GRAY LEVEL VALUE A BEFORE GRAY LEVEL SHIFT FOCUSED PIXEL

F I G. 24

| SYMBOL | FORMULAE |
|---|---|
| N | $G_n = B$, $n=1$ |
| E(1) | $G_n = B - 4TM$, $n=1 \sim Nmax(V)$, $Nmax(V) = V/2 + \{V<4\}$ |
| C(Jh) | $G_1 = B - 4T[M-2 + \{AND(M=1, OR(V=4, V>=8))\} + 2\{AND(M=1, V<=2)\} + \{AND(OR(M=2, M=4), V<=2)\}]$<br>$G_2 = G_1 - 4T[2 - \{AND(M=1, OR(V=2, V=4, V>=8))\} + \{AND(M=1, V=3)\} - \{AND(M=2, V=2)\} - \{AND(M=3, V<=3)\}]$<br>$G_n = G_{n-1} - 4T$, $n=1 \sim Nmax(V)$, $Nmax(V) = 1 + \{AND(M<=3, V>=2)\} + \{AND(M=4, V>=3)\} + \{AND(M<=2, V>=4)\} + \{AND(M>=3, V>=5)\}$ |
| D(Jh) | $G_1 = B + 4T[1 - \{V=2\} + \{V=1\}]$, $G_2 = G_1 - 4T[2 - \{V<=3\}]$<br>$G_n = G_{n-1} - 4T$, $n=1 \sim Nmax(V)$, $Nmax(V) = 1 + \{V>=2\} + \{V>=3\}$ |
| F(Jh) | $G_1 = B - 4T[J + \{AND(J=1, V<=3)\} + \{AND(J=2, V<=4)\} + \{AND(J>=3, V<=5)\}]$, $G_n = G_{n-1} - 4T$, $n=1 \sim Nmax(V)$<br>$Nmax(V) = 1 + \{AND(J=0, V>=2)\} + \{AND(J=1, V>=3)\} + \{AND(J>=2, V>=4)\} + \{AND(J=0, V>=4)\} + \{AND(J=1, V>=5)\} + \{AND(J>=2, V>=6)\}$ |
| F(Jh)* | $G_1 = B - 4T[J + \{AND(J=0, V<=3)\} + \{AND(J=1, V<=4)\} + \{AND(J>=2, V<=5)\}]$, $G_n = G_{n-1} - 4T$, $n=1 \sim Nmax(V)$<br>$Nmax(V) = 1 + 2\{AND(J=0, V>=2)\} + \{AND(J=1, V>=3)\} + \{AND(J>=2, V>=4)\} + \{AND(J=0, V>=4)\} + 2\{AND(J=1, V>=5)\} + 2\{AND(J>=2, V>=6)\}$ |
| F(Jh)** | $G_1 = B - 4T[J + \{AND(J=0, V<=3)\} + \{AND(J=1, V<=4)\} + \{AND(J>=2, V<=5)\}]$, $G_n = G_{n-1} - 4T$, $n=1 \sim Nmax(V)$<br>$Nmax(V) = 1 + \{AND(J<=1, V>=3)\} + \{AND(J>=2, V>=4)\} + \{AND(J=0, V>=4)\} + \{AND(J=1, V>=5)\} + \{AND(J>=2, V>=6)\}$ |
| f(Jh) | $G_1 = B - 4TJ$, $G_n = G_{n-1} - 4T$, $n=1 \sim Nmax(V)$<br>$Nmax(V) = 1 + \{AND(J=0, V>=2)\} + \{AND(J=1, V>=3)\} + \{AND(J>=2, V>=4)\} + \{AND(J=0, V>=4)\} + \{AND(J=1, V>=5)\} + \{AND(J>=2, V>=6)\}$ |
| f(Jh)* | $G_1 = B - 4T[J - \{V=1\}]$, $G_n = G_{n-1} - 4T$, $n=1 \sim Nmax(V)$<br>$Nmax(V) = 1 + \{AND(J=0, V>=2)\} + \{AND(J=1, V>=3)\} + \{AND(J>=2, V>=4)\} + \{AND(J=0, V>=4)\} + \{AND(J=1, V>=5)\} + \{AND(J>=2, V>=6)\}$ |
| f(Jh)** | $G_1 = B - 4T[J - 1 - \{V=1\}]$, $G_n = G_{n-1} - 4T$, $n=1 \sim Nmax(V)$<br>$Nmax(V) = 1 + \{AND(J<=2, V>=2)\} + \{AND(J>=3, V>=4)\} + \{AND(J>=2, V>=4)\} + \{AND(J>=3, V>=6)\}$ |

A: GRAY LEVEL VALUE OF FOCUSED PIXEL
B: GRAY LEVEL VALUE OF PIXEL ADJACENT IN MOTION DIRECTION
V: ABSOLUTE VALUE OF MOTION SPEED [PIXEL/FIELD]
M = $|(B/4) - (A/4)|$ : NUMBER OF SHIFT BLOCKS FOR EVERY UNIT OF 4 GRAY LEVELS
K = $|4(B/16) - (A/4)|$ : INTERNAL-BLOCK-USE VARIABLE FOR EVERY UNIT OF 16 GRAY LEVELS
J = M−K: CALCULATION-USE INTERNAL VARIABLE

T = $(B-A)/|B-A|$ : INCREASE/DECREASE OF CHANGE OF GRAY LEVEL VALUE IN MOTION DIRECTION (INCREASE: POSITIVE VALUE, DECREASE: NEGATIVE VALUE)
n: PIXEL DISTANCE FROM PIXEL A AS STARTING POINT (LET DISTANCE IN MOTION DIRECTION BE EXPRESSED WITH A POSITIVE VALUE)
Gn: GRAY LEVEL VALUE OF CORRECTION SIGNAL AT POSITION n
Nmax: MAXIMUM NUMBER OF CORRECTION SIGNALS
Jh = $1 + \{T>0\} + 2\{T<0\}$ : REFERENTIAL NUMERAL OF REDUNDANCY SIGNAL PATTERN OF CORRECTION SIGNAL TO BE INSERTED Results of logical operations described in { } indicate True=1 or False=0.
In a division calculation, an integer result is derived by dropping a fraction.

FIG. 25

SECOND REDUNDANCY SIGNAL PATTERN 1

| SUB-FIELD | SF1 | | SF2 | | SF3 | | SF4 | |
|---|---|---|---|---|---|---|---|---|
| TIME DIVISION RATIO | 8 | | 4 | | 1 | | 8 | |
| PIXEL DIVISION RATIO | 1 | 2 | 1 | 2 | 1 | 2 | 1 | 2 |
| GRAY LEVEL/ WEIGHT TOTAL | 8 | 16 | 4 | 8 | 1 | 2 | 8 | 16 |
| 0 | 0 | 0 | 0 | 0 | 0 | 0 | 0 | 0 |
| 1 | 0 | 0 | 0 | 0 | 1 | 0 | 0 | 0 |
| 2 | 0 | 0 | 0 | 0 | 0 | 1 | 0 | 0 |
| 3 | 0 | 0 | 0 | 0 | 1 | 1 | 0 | 0 |
| 4 | 0 | 0 | 1 | 0 | 0 | 0 | 0 | 0 |
| 5 | 0 | 0 | 1 | 0 | 1 | 0 | 0 | 0 |
| 6 | 0 | 0 | 1 | 0 | 0 | 1 | 0 | 0 |
| 7 | 0 | 0 | 1 | 0 | 1 | 1 | 0 | 0 |
| 8 | 0 | 0 | 0 | 1 | 0 | 0 | 0 | 0 |
| 9 | 0 | 0 | 0 | 1 | 1 | 0 | 0 | 0 |
| 10 | 0 | 0 | 0 | 1 | 0 | 1 | 0 | 0 |
| 11 | 0 | 0 | 0 | 1 | 1 | 1 | 0 | 0 |
| 12 | 0 | 0 | 1 | 1 | 0 | 0 | 0 | 0 |
| 13 | 0 | 0 | 1 | 1 | 1 | 0 | 0 | 0 |
| 14 | 0 | 0 | 1 | 1 | 0 | 1 | 0 | 0 |
| 15 | 0 | 0 | 1 | 1 | 1 | 1 | 0 | 0 |
| 16 | 1 | 0 | 0 | 0 | 0 | 0 | 1 | 0 |
| 17 | 1 | 0 | 0 | 0 | 1 | 0 | 1 | 0 |
| 18 | 1 | 0 | 0 | 0 | 0 | 1 | 1 | 0 |
| 19 | 1 | 0 | 0 | 0 | 1 | 1 | 1 | 0 |
| 20 | 1 | 0 | 1 | 0 | 0 | 0 | 1 | 0 |
| 21 | 1 | 0 | 1 | 0 | 1 | 0 | 1 | 0 |
| 22 | 1 | 0 | 1 | 0 | 0 | 1 | 1 | 0 |
| 23 | 1 | 0 | 1 | 0 | 1 | 1 | 1 | 0 |
| 24 | 1 | 0 | 0 | 1 | 0 | 0 | 1 | 0 |
| 25 | 1 | 0 | 0 | 1 | 1 | 0 | 1 | 0 |
| 26 | 1 | 0 | 0 | 1 | 0 | 1 | 1 | 0 |
| 27 | 1 | 0 | 0 | 1 | 1 | 1 | 1 | 0 |
| 28 | 1 | 0 | 1 | 1 | 0 | 0 | 1 | 0 |
| 29 | 1 | 0 | 1 | 1 | 1 | 0 | 1 | 0 |
| 30 | 1 | 0 | 1 | 1 | 0 | 1 | 1 | 0 |
| 31 | 1 | 0 | 1 | 1 | 1 | 1 | 1 | 0 |
| 32 | 0 | 1 | 0 | 0 | 0 | 0 | 0 | 1 |
| 33 | 0 | 1 | 0 | 0 | 1 | 0 | 0 | 1 |
| 34 | 0 | 1 | 0 | 0 | 0 | 1 | 0 | 1 |
| 35 | 0 | 1 | 0 | 0 | 1 | 1 | 0 | 1 |
| 36 | 0 | 1 | 1 | 0 | 0 | 0 | 0 | 1 |
| 37 | 0 | 1 | 1 | 0 | 1 | 0 | 0 | 1 |
| 38 | 0 | 1 | 1 | 0 | 0 | 1 | 0 | 1 |
| 39 | 0 | 1 | 1 | 0 | 1 | 1 | 0 | 1 |
| 40 | 0 | 1 | 0 | 1 | 0 | 0 | 0 | 1 |
| 41 | 0 | 1 | 0 | 1 | 1 | 0 | 0 | 1 |
| 42 | 0 | 1 | 0 | 1 | 0 | 1 | 0 | 1 |
| 43 | 0 | 1 | 0 | 1 | 1 | 1 | 0 | 1 |
| 44 | 0 | 1 | 1 | 1 | 0 | 0 | 0 | 1 |
| 45 | 0 | 1 | 1 | 1 | 1 | 0 | 0 | 1 |
| 46 | 0 | 1 | 1 | 1 | 0 | 1 | 0 | 1 |
| 47 | 0 | 1 | 1 | 1 | 1 | 1 | 0 | 1 |
| 48 | 1 | 1 | 0 | 0 | 0 | 0 | 1 | 1 |
| 49 | 1 | 1 | 0 | 0 | 1 | 0 | 1 | 1 |
| 50 | 1 | 1 | 0 | 0 | 0 | 1 | 1 | 1 |
| 51 | 1 | 1 | 0 | 0 | 1 | 1 | 1 | 1 |
| 52 | 1 | 1 | 1 | 0 | 0 | 0 | 1 | 1 |
| 53 | 1 | 1 | 1 | 0 | 1 | 0 | 1 | 1 |
| 54 | 1 | 1 | 1 | 0 | 0 | 1 | 1 | 1 |
| 55 | 1 | 1 | 1 | 0 | 1 | 1 | 1 | 1 |
| 56 | 1 | 1 | 0 | 1 | 0 | 0 | 1 | 1 |
| 57 | 1 | 1 | 0 | 1 | 1 | 0 | 1 | 1 |
| 58 | 1 | 1 | 0 | 1 | 0 | 1 | 1 | 1 |
| 59 | 1 | 1 | 0 | 1 | 1 | 1 | 1 | 1 |
| 60 | 1 | 1 | 1 | 1 | 0 | 0 | 1 | 1 |
| 61 | 1 | 1 | 1 | 1 | 1 | 0 | 1 | 1 |
| 62 | 1 | 1 | 1 | 1 | 0 | 1 | 1 | 1 |
| 63 | 1 | 1 | 1 | 1 | 1 | 1 | 1 | 1 |

FIG. 26

SECOND REDUNDANCY SIGNAL PATTERN 2

| SUB-FIELD | SF1 | | SF2 | | SF3 | | SF4 | |
|---|---|---|---|---|---|---|---|---|
| TIME DIVISION RATIO | 8 | | 4 | | 1 | | 8 | |
| PIXEL DIVISION RATIO | 1 | 2 | 1 | 2 | 1 | 2 | 1 | 2 |
| GRAY LEVEL/ WEIGHT TOTAL | 8 | 16 | 4 | 8 | 1 | 2 | 8 | 16 |
| 0 | 0 | 0 | 0 | 0 | 0 | 0 | 0 | 0 |
| 1 | 0 | 0 | 0 | 0 | 1 | 0 | 0 | 0 |
| 2 | 0 | 0 | 0 | 0 | 0 | 1 | 0 | 0 |
| 3 | 0 | 0 | 0 | 0 | 1 | 1 | 0 | 0 |
| 4 | 0 | 0 | 1 | 0 | 0 | 0 | 0 | 0 |
| 5 | 0 | 0 | 1 | 0 | 1 | 0 | 0 | 0 |
| 6 | 0 | 0 | 1 | 0 | 0 | 1 | 0 | 0 |
| 7 | 0 | 0 | 1 | 0 | 1 | 1 | 0 | 0 |
| 8 | 1 | 0 | 0 | 0 | 0 | 0 | 0 | 0 |
| 9 | 1 | 0 | 0 | 0 | 1 | 0 | 0 | 0 |
| 10 | 1 | 0 | 0 | 0 | 0 | 1 | 0 | 0 |
| 11 | 1 | 0 | 0 | 0 | 1 | 1 | 0 | 0 |
| 12 | 1 | 0 | 1 | 0 | 0 | 0 | 0 | 0 |
| 13 | 1 | 0 | 1 | 0 | 1 | 0 | 0 | 0 |
| 14 | 1 | 0 | 1 | 0 | 0 | 1 | 0 | 0 |
| 15 | 1 | 0 | 1 | 0 | 1 | 1 | 0 | 0 |
| 16 | 1 | 0 | 0 | 1 | 0 | 0 | 0 | 0 |
| 17 | 1 | 0 | 0 | 1 | 1 | 0 | 0 | 0 |
| 18 | 1 | 0 | 0 | 1 | 0 | 1 | 0 | 0 |
| 19 | 1 | 0 | 0 | 1 | 1 | 1 | 0 | 0 |
| 20 | 1 | 0 | 1 | 1 | 0 | 0 | 0 | 0 |
| 21 | 1 | 0 | 1 | 1 | 1 | 0 | 0 | 0 |
| 22 | 1 | 0 | 1 | 1 | 0 | 1 | 0 | 0 |
| 23 | 1 | 0 | 1 | 1 | 1 | 1 | 0 | 0 |
| 24 | 0 | 1 | 0 | 0 | 0 | 0 | 1 | 0 |
| 25 | 0 | 1 | 0 | 0 | 1 | 0 | 1 | 0 |
| 26 | 0 | 1 | 0 | 0 | 0 | 1 | 1 | 0 |
| 27 | 0 | 1 | 0 | 0 | 1 | 1 | 1 | 0 |
| 28 | 0 | 1 | 1 | 0 | 0 | 0 | 1 | 0 |
| 29 | 0 | 1 | 1 | 0 | 1 | 0 | 1 | 0 |
| 30 | 0 | 1 | 1 | 0 | 0 | 1 | 1 | 0 |
| 31 | 0 | 1 | 1 | 0 | 1 | 1 | 1 | 0 |
| 32 | 0 | 1 | 0 | 1 | 0 | 0 | 1 | 0 |
| 33 | 0 | 1 | 0 | 1 | 1 | 0 | 1 | 0 |
| 34 | 0 | 1 | 0 | 1 | 0 | 1 | 1 | 0 |
| 35 | 0 | 1 | 0 | 1 | 1 | 1 | 1 | 0 |
| 36 | 0 | 1 | 1 | 1 | 0 | 0 | 1 | 0 |
| 37 | 0 | 1 | 1 | 1 | 1 | 0 | 1 | 0 |
| 38 | 0 | 1 | 1 | 1 | 0 | 1 | 1 | 0 |
| 39 | 0 | 1 | 1 | 1 | 1 | 1 | 1 | 0 |
| 40 | 1 | 1 | 0 | 0 | 0 | 0 | 0 | 1 |
| 41 | 1 | 1 | 0 | 0 | 1 | 0 | 0 | 1 |
| 42 | 1 | 1 | 0 | 0 | 0 | 1 | 0 | 1 |
| 43 | 1 | 1 | 0 | 0 | 1 | 1 | 0 | 1 |
| 44 | 1 | 1 | 1 | 0 | 0 | 0 | 0 | 1 |
| 45 | 1 | 1 | 1 | 0 | 1 | 0 | 0 | 1 |
| 46 | 1 | 1 | 1 | 0 | 0 | 1 | 0 | 1 |
| 47 | 1 | 1 | 1 | 0 | 1 | 1 | 0 | 1 |
| 48 | 1 | 1 | 0 | 1 | 0 | 0 | 0 | 1 |
| 49 | 1 | 1 | 0 | 1 | 1 | 0 | 0 | 1 |
| 50 | 1 | 1 | 0 | 1 | 0 | 1 | 0 | 1 |
| 51 | 1 | 1 | 0 | 1 | 1 | 1 | 0 | 1 |
| 52 | 1 | 1 | 1 | 1 | 0 | 0 | 0 | 1 |
| 53 | 1 | 1 | 1 | 1 | 1 | 0 | 0 | 1 |
| 54 | 1 | 1 | 1 | 1 | 0 | 1 | 0 | 1 |
| 55 | 1 | 1 | 1 | 1 | 1 | 1 | 0 | 1 |
| 56 | 1 | 1 | 0 | 1 | 0 | 0 | 1 | 1 |
| 57 | 1 | 1 | 0 | 1 | 1 | 0 | 1 | 1 |
| 58 | 1 | 1 | 0 | 1 | 0 | 1 | 1 | 1 |
| 59 | 1 | 1 | 0 | 1 | 1 | 1 | 1 | 1 |
| 60 | 1 | 1 | 1 | 1 | 0 | 0 | 1 | 1 |
| 61 | 1 | 1 | 1 | 1 | 1 | 0 | 1 | 1 |
| 62 | 1 | 1 | 1 | 1 | 0 | 1 | 1 | 1 |
| 63 | 1 | 1 | 1 | 1 | 1 | 1 | 1 | 1 |

FIG. 27

SECOND REDUNDANCY SIGNAL PATTERN 3

| SUB-FIELD | SF1 | | SF2 | | SF3 | | SF4 | |
|---|---|---|---|---|---|---|---|---|
| TIME DIVISION RATIO | 8 | | 4 | | 1 | | 8 | |
| PIXEL DIVISION RATIO | 1 | 2 | 1 | 2 | 1 | 2 | 1 | 2 |
| GRAY LEVEL/ WEIGHT TOTAL | 8 | 16 | 4 | 8 | 1 | 2 | 8 | 16 |
| 0 | 0 | 0 | 0 | 0 | 0 | 0 | 0 | 0 |
| 1 | 0 | 0 | 0 | 0 | 1 | 0 | 0 | 0 |
| 2 | 0 | 0 | 0 | 0 | 0 | 1 | 0 | 0 |
| 3 | 0 | 0 | 0 | 0 | 1 | 1 | 0 | 0 |
| 4 | 0 | 0 | 1 | 0 | 0 | 0 | 0 | 0 |
| 5 | 0 | 0 | 1 | 0 | 1 | 0 | 0 | 0 |
| 6 | 0 | 0 | 1 | 0 | 0 | 1 | 0 | 0 |
| 7 | 0 | 0 | 1 | 0 | 1 | 1 | 0 | 0 |
| 8 | 0 | 0 | 0 | 0 | 0 | 0 | 1 | 0 |
| 9 | 0 | 0 | 0 | 0 | 1 | 0 | 1 | 0 |
| 10 | 0 | 0 | 0 | 0 | 0 | 1 | 1 | 0 |
| 11 | 0 | 0 | 0 | 0 | 1 | 1 | 1 | 0 |
| 12 | 0 | 0 | 1 | 0 | 0 | 0 | 1 | 0 |
| 13 | 0 | 0 | 1 | 0 | 1 | 0 | 1 | 0 |
| 14 | 0 | 0 | 1 | 0 | 0 | 1 | 1 | 0 |
| 15 | 0 | 0 | 1 | 0 | 1 | 1 | 1 | 0 |
| 16 | 0 | 0 | 0 | 1 | 0 | 0 | 1 | 0 |
| 17 | 0 | 0 | 0 | 1 | 1 | 0 | 1 | 0 |
| 18 | 0 | 0 | 0 | 1 | 0 | 1 | 1 | 0 |
| 19 | 0 | 0 | 0 | 1 | 1 | 1 | 1 | 0 |
| 20 | 0 | 0 | 1 | 1 | 0 | 0 | 1 | 0 |
| 21 | 0 | 0 | 1 | 1 | 1 | 0 | 1 | 0 |
| 22 | 0 | 0 | 1 | 1 | 0 | 1 | 1 | 0 |
| 23 | 0 | 0 | 1 | 1 | 1 | 1 | 1 | 0 |
| 24 | 1 | 0 | 0 | 0 | 0 | 0 | 0 | 1 |
| 25 | 1 | 0 | 0 | 0 | 1 | 0 | 0 | 1 |
| 26 | 1 | 0 | 0 | 0 | 0 | 1 | 0 | 1 |
| 27 | 1 | 0 | 0 | 0 | 1 | 1 | 0 | 1 |
| 28 | 1 | 0 | 1 | 0 | 0 | 0 | 0 | 1 |
| 29 | 1 | 0 | 1 | 0 | 1 | 0 | 0 | 1 |
| 30 | 1 | 0 | 1 | 0 | 0 | 1 | 0 | 1 |
| 31 | 1 | 0 | 1 | 0 | 1 | 1 | 0 | 1 |
| 32 | 1 | 0 | 0 | 1 | 0 | 0 | 0 | 1 |
| 33 | 1 | 0 | 0 | 1 | 1 | 0 | 0 | 1 |
| 34 | 1 | 0 | 0 | 1 | 0 | 1 | 0 | 1 |
| 35 | 1 | 0 | 0 | 1 | 1 | 1 | 0 | 1 |
| 36 | 1 | 0 | 1 | 1 | 0 | 0 | 0 | 1 |
| 37 | 1 | 0 | 1 | 1 | 1 | 0 | 0 | 1 |
| 38 | 1 | 0 | 1 | 1 | 0 | 1 | 0 | 1 |
| 39 | 1 | 0 | 1 | 1 | 1 | 1 | 0 | 1 |
| 40 | 0 | 1 | 0 | 0 | 0 | 0 | 1 | 1 |
| 41 | 0 | 1 | 0 | 0 | 1 | 0 | 1 | 1 |
| 42 | 0 | 1 | 0 | 0 | 0 | 1 | 1 | 1 |
| 43 | 0 | 1 | 0 | 0 | 1 | 1 | 1 | 1 |
| 44 | 0 | 1 | 1 | 0 | 0 | 0 | 1 | 1 |
| 45 | 0 | 1 | 1 | 0 | 1 | 0 | 1 | 1 |
| 46 | 0 | 1 | 1 | 0 | 0 | 1 | 1 | 1 |
| 47 | 0 | 1 | 1 | 0 | 1 | 1 | 1 | 1 |
| 48 | 0 | 1 | 0 | 1 | 0 | 0 | 1 | 1 |
| 49 | 0 | 1 | 0 | 1 | 1 | 0 | 1 | 1 |
| 50 | 0 | 1 | 0 | 1 | 0 | 1 | 1 | 1 |
| 51 | 0 | 1 | 0 | 1 | 1 | 1 | 1 | 1 |
| 52 | 0 | 1 | 1 | 1 | 0 | 0 | 1 | 1 |
| 53 | 0 | 1 | 1 | 1 | 1 | 0 | 1 | 1 |
| 54 | 0 | 1 | 1 | 1 | 0 | 1 | 1 | 1 |
| 55 | 0 | 1 | 1 | 1 | 1 | 1 | 1 | 1 |
| 56 | 1 | 1 | 0 | 1 | 0 | 0 | 1 | 1 |
| 57 | 1 | 1 | 0 | 1 | 1 | 0 | 1 | 1 |
| 58 | 1 | 1 | 0 | 1 | 0 | 1 | 1 | 1 |
| 59 | 1 | 1 | 0 | 1 | 1 | 1 | 1 | 1 |
| 60 | 1 | 1 | 1 | 1 | 0 | 0 | 1 | 1 |
| 61 | 1 | 1 | 1 | 1 | 1 | 0 | 1 | 1 |
| 62 | 1 | 1 | 1 | 1 | 0 | 1 | 1 | 1 |
| 63 | 1 | 1 | 1 | 1 | 1 | 1 | 1 | 1 |

F I G. 2 9
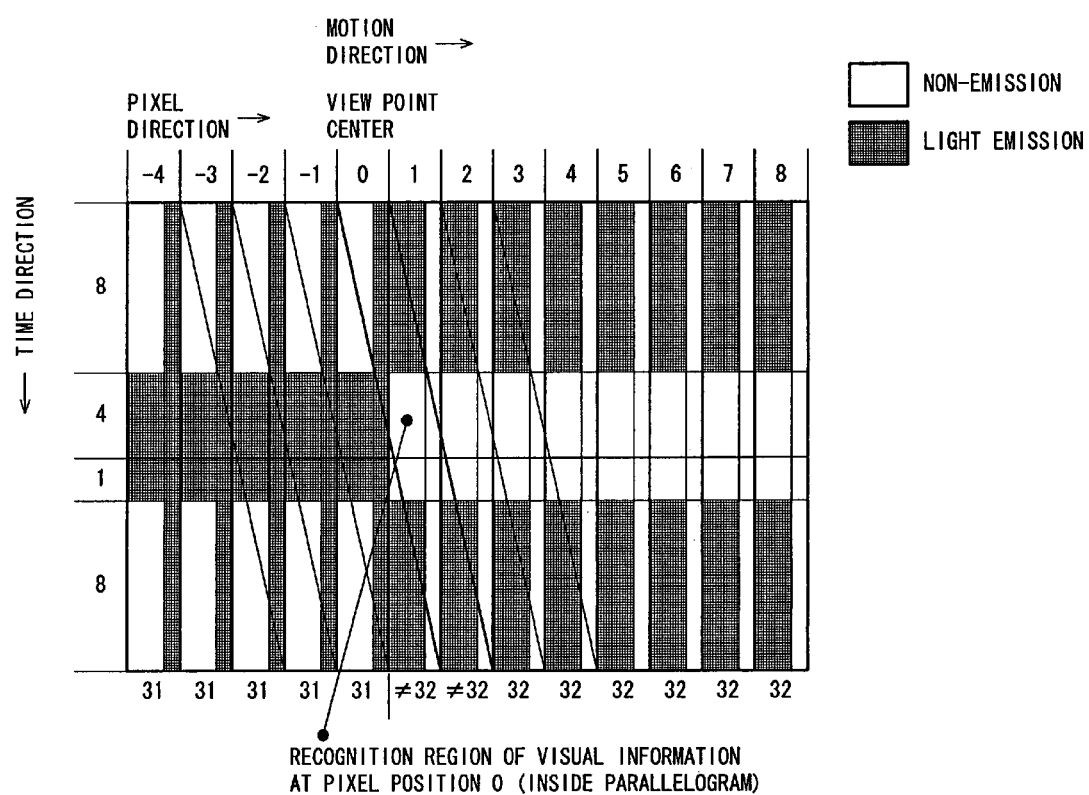

FIG. 30

| A\B | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 |
|---|---|---|---|---|---|---|---|---|---|---|---|---|---|---|---|---|---|---|---|---|---|---|---|---|---|---|---|---|---|---|---|---|
| 0 | N | | | | N | | N | | N | | N | | N | | N | | N | | N | | N | | N | | N | | N | | N | | N | |
| 1 | | | | | | | | | | | | | | | | | | | | | | | | | | | | | | | | |
| 2 | | | C1 N | | C1 N | | N | | C1 N | | N | | N N | | N | | D1 N | | N | | C1 N | | N | | C1 N | | N | | N N | | N | |
| 3 | | | C1 C1 | | C1 C1 | | | | C1 C1 | | | | C1 N | | | | D1 D1 | | | | C1 C1 | | | | C1 C1 | | | | C1 N | | | |
| 4 | N | | C1 C1 | | | | N | | N N | | N | | N | | N | | E 2 | | | | N N | | N | | N | | N | | N | | N | |
| 5 | | | N C1 | | N | | | | C1 N | | | | | | | | | | | | E2 N | | | | | | | | | | | |
| 6 | N | | N | | | | C 1 | | N N | | C1 N | | C1 N | | N | | | | | | E 2 | | N N | | C1 N | | N | | C1 N | | N | |
| 7 | | | | | | | | | | | C1 N | | C1 C1 | | | | | | | | | | E2 N | | C1 C1 | | | | C1 C1 | | | |
| 8 | N | | C1 C1 | | N C1 | | C 1 | | N | | N | | N | | N | | E 2 | | | | E 2 | | N N | | N | | N | | N | | N | |
| 9 | | | N C1 | | N N | | | | | | | | | | | | | | | | | | E2 N | | | | | | | | | |
| 10 | N | | N | | N | | N C1 | | | | C1 N | | C1 N | | N | | | | | | | | E 2 | | N N | | C1 N | | N | |
| 11 | | | | | | | N N | | | | C1 C1 | | | | | | | | | | | | E2 N | | C1 C1 | | | |
| 12 | N | | N C1 | | N | | C1 C1 | | N | | C1 C1 | | | | F 2 | | | | E 2 | | | | E 2 | | | | N | | N | |
| 13 | | | N N | | | | N C1 | | | | N C1 | | N | | | | | | | | | | | | | | | | | |
| 14 | N | | N | | N | | N | | N | | N | | | | | | | | | | | | | | | | D1 N | | | |
| 15 | | | | | | | | | | | | | | | | | | | | | | | | | | | D1 D1 | | | |
| 16 | N | | D1 D1 | | E 3 | | | | E 3 | | | | F 3 | | | | N | | | | N | | N | | N | | N | | N | | N | |
| 17 | | | N D1 | | | | | | | | | | | | | | | | | | | | | | | | | | | | | |
| 18 | N | | N | | | | | | | | | | | | | | | | | | C1 N | | N | | C1 N | | N | | N N | | N | |
| 19 | | | | | | | | | | | | | | | | | | | | | | C1 C1 | | | | C1 C1 | | | | C1 N | | | |
| 20 | N | | C1 C1 | | N E3 | | E 3 | | E 3 | | | | E 3 | | | | N | | C1 C1 | | N | | N N | | N | | N | | N | |
| 21 | | | N C1 | | N N | | | | | | | | | | | | | | N C1 | | | | C1 N | | | | | | | |
| 22 | N | | N | | N E3 | | | | | | | | | | | | N | | N | | | | C 1 | | N N | | C1 N | | N | |
| 23 | | | | | N N | | | | | | | | | | | | | | | | | | | | C1 N | | C1 C1 | | | |
| 24 | N | | C1 C1 | | N | | C1 C1 | | N E3 | | E 3 | | E 3 | | | | N | | C1 C1 | | N C1 | | C 1 | | N | | N | | N | |
| 25 | | | N C1 | | | | N C1 | | N N | | | | | | | | | | N C1 | | N N | | | | | | | | | |
| 26 | N | | N | | N | | N | | N E3 | | | | | | | | N | | N | | N C1 | | | | C1 N | | N | |
| 27 | | | | | | | | | N N | | | | | | | | | | | | N N | | | | C1 C1 | | | |
| 28 | N | | N C1 | | N | | C1 C1 | | N | | C1 C1 | | N | | D1 D1 | | N | | N C1 | | N | | C1 C1 | | N | | C1 C1 | | N | |
| 29 | | | N N | | | | N C1 | | | | N C1 | | | | N D1 | | | | N N | | | | N C1 | | | | N C1 | | | |
| 30 | N | | N | | N | | N | | N | | N | | N | | N | | N | | N | | N | | N | | N | | | |
| 31 | | | | | | | | | | | | | | | | | | | | | | | | | | | | | | | |

↓ GRAY LEVEL VALUE A BEFORE GRAY LEVEL SHIFT FOCUSED PIXEL
→ GRAY LEVEL VALUE B AFTER GRAY LEVEL SHIFT ADJACENT PIXEL

FIG. 31

→ GRAY LEVEL VALUE B AFTER GRAY LEVEL SHIFT ADJACENT PIXEL

↓ GRAY LEVEL VALUE A BEFORE GRAY LEVEL SHIFT FOCUSED PIXEL

| A\B | 32 | 33 | 34 | 35 | 36 | 37 | 38 | 39 | 40 | 41 | 42 | 43 | 44 | 45 | 46 | 47 | 48 | 49 | 50 | 51 | 52 | 53 | 54 | 55 | 56 | 57 | 58 | 59 | 60 | 61 | 62 | 63 |
|---|---|---|---|---|---|---|---|---|---|---|---|---|---|---|---|---|---|---|---|---|---|---|---|---|---|---|---|---|---|---|---|---|
| 0 | N | | N | | N | | N | | N | | N | | N | | N | | N | | N | | N | | N | | N | | N | | N | | N | |
| 1 | | | | | | | | | | | | | | | | | | | | | | | | | | | | | | | | |
| 2 | D1 N | | N | | C1 N | | N | | C1 N | | N | | N N | | N | | D1 N | | N | | C1 N | | N | | C1 N | | N | | N N | | N | |
| 3 | D1 D1 | | | | C1 C1 | | | | C1 C1 | | | | C1 N | | | | D1 D1 | | | | C1 C1 | | | | C1 C1 | | | | C1 N | | | |
| 4 | E 2 | | | | N N | | N | | N | | N | | N | | N | | E 2 | | | | N N | | N | | N | | N | | N | | N | |
| 5 | | | | | E2 N | | | | | | | | | | | | | | | | E2 N | | | | | | | | | | | |
| 6 | | | | | E 2 | | N N | | C1 N | | N | | C1 N | | N | | | | | | E 2 | | N N | | C1 N | | N | | C1 N | | N | |
| 7 | | | | | | | E2 N | | C1 C1 | | | | C1 C1 | | | | | | | | | | E2 N | | C1 C1 | | | | C1 C1 | | | |
| 8 | E 2 | | | | E 2 | | | | N N | | N | | N | | N | | E 2 | | | | E 2 | | | | N N | | N | | N | | N | |
| 9 | | | | | | | | | E2 N | | | | | | | | | | | | | | | | E2 N | | | | | | | |
| 10 | | | | | | | | | E 2 | | N N | | C1 N | | N | | | | | | | | | | E 2 | | N N | | C1 N | | N | |
| 11 | | | | | | | | | | | E2 N | | C1 C1 | | | | | | | | | | | | | | E2 N | | C1 C1 | | | |
| 12 | F 2 | | | | E 2 | | | | E 2 | | | | N | | N | | F 2 | | | | E 2 | | | | E 2 | | | | N | | N | |
| 13 | | | | | | | | | | | | | | | | | | | | | | | | | | | | | | | | |
| 14 | | | | | | | | | | | | | D1 N | | | | | | | | | | | | | | | | D1 N | | | |
| 15 | | | | | | | | | | | | | D1 D1 | | N | | | | | | | | | | | | | | D1 D1 | | N | |
| 16 | N | | N | | N | | N | | N | | N | | N | | N | | N | | N | | N | | N | | N | | N | | N | | N | |
| 17 | | | | | | | | | | | | | | | | | | | | | | | | | | | | | | | | |
| 18 | D1 N | | N | | C1 N | | N | | C1 N | | N | | N N | | N | | D1 N | | N | | C1 N | | N | | C1 N | | N | | N N | | N | |
| 19 | D1 D1 | | | | C1 C1 | | | | C1 C1 | | | | C1 N | | | | D1 D1 | | | | C1 C1 | | | | C1 C1 | | | | C1 N | | | |
| 20 | E 2 | | | | N N | | N | | N | | N | | N | | N | | E 2 | | | | N N | | N | | N | | N | | N | | N | |
| 21 | | | | | E2 N | | | | | | | | | | | | | | | | E2 N | | | | | | | | | | | |
| 22 | | | | | E 2 | | N N | | C1 N | | N | | C1 N | | N | | | | | | E 2 | | N N | | C1 N | | N | | C1 N | | N | |
| 23 | | | | | | | E2 N | | C1 C1 | | | | C1 C1 | | | | | | | | | | E2 N | | C1 C1 | | | | C1 C1 | | | |
| 24 | E 2 | | | | E 2 | | | | N N | | N | | N | | N | | E 2 | | | | E 2 | | | | N N | | N | | N | | N | |
| 25 | | | | | | | | | E2 N | | | | | | | | | | | | | | | | E2 N | | | | | | | |
| 26 | | | | | | | | | E 2 | | N N | | C1 N | | N | | | | | | | | | | E 2 | | N N | | C1 N | | N | |
| 27 | | | | | | | | | | | E2 N | | C1 C1 | | | | | | | | | | | | | | E2 N | | C1 C1 | | | |
| 28 | F 2 | | | | E 2 | | | | E 2 | | | | N | | N | | F 2 | | | | E 2 | | | | E 2 | | | | N | | N | |
| 29 | | | | | | | | | | | | | | | | | | | | | | | | | | | | | | | | |
| 30 | | | | | | | | | | | | | D1 N | | | | | | | | | | | | | | | | D1 N | | | |
| 31 | | | | | | | | | | | | | D1 D1 | | N | | | | | | | | | | | | | | D1 D1 | | N | |

FIG. 32

GRAY LEVEL VALUE B AFTER GRAY LEVEL SHIFT ADJACENT PIXEL →

GRAY LEVEL VALUE A BEFORE GRAY LEVEL SHIFT FOCUSED PIXEL ↓

| A\B | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 |
|---|---|---|---|---|---|---|---|---|---|---|---|---|---|---|---|---|---|---|---|---|---|---|---|---|---|---|---|---|---|---|---|---|
| 32 | N | D1 D1 N D1 | | | E 3 | | | | E 3 | | | | F 3 | | | | N | D1 D1 N D1 | | | E 3 | | | | E 3 | | | | F 3 | | | |
| 33 | | | | | | | | | | | | | | | | | | | | | | | | | | | | | | | | |
| 34 | | | | | | | | | | | | | | | | | | | | | | | | | | | | | | | | |
| 35 | N | N | | | | | | | | | | | | | | | N | N | | | | | | | | | | | | | | |
| 36 | N | C1 C1 N C1 | N E3 N N | E 3 | | | E 3 | | | E 3 | | | | | | | N | C1 C1 N C1 | N E3 N N | E 3 | | | E 3 | | | | E 3 | | | |
| 37 | | | | | | | | | | | | | | | | | | | | | | | | | | | | | | | | |
| 38 | | | | N E3 N N | | | | | | | | | | | | | | | | N E3 N N | | | | | | | | | | | | |
| 39 | N | N | N | | | | | | | | | | | | | | N | N | N | | | | | | | | | | | | | |
| 40 | N | C1 C1 N C1 | N | C1 C1 N C1 | N E3 N N | E 3 | | | E 3 | | | | | | | | N | C1 C1 N C1 | N | C1 C1 N C1 | N E3 N N | E 3 | | | | E 3 | | | | |
| 41 | | | | | | | | | | | | | | | | | | | | | | | | | | | | | | | | |
| 42 | | | | | | | N E3 N N | | | | | | | | | | | | | | | | N E3 N N | | | | | | | | | |
| 43 | N | N | N | N | N | | | | | | | | | | | | N | N | N | N | N | | | | | | | | | | | |
| 44 | N | N C1 N N | N | C1 C1 N C1 | N | C1 C1 N C1 | N | D1 D1 N D1 | N | N C1 N N | N | C1 C1 N C1 | N | C1 C1 N C1 | N | D1 D1 N D1 | | | | | | | | | | | | | | | | |
| 45 | | | | | | | | | | | | | | | | | | | | | | | | | | | | | | | | |
| 46 | | | | | | | | | | | | | | | | | | | | | | | | | | | | | | | | |
| 47 | N | N | N | N | N | N | N | N | N | N | N | N | N | N | N | N | | | | | | | | | | | | | | | | |
| 48 | N | D1 D1 N D1 | | | E 3 | | | | E 3 | | | | F 3 | | | | N | D1 D1 N D1 | | | E 3 | | | | E 3 | | | | F 3 | | | |
| 49 | | | | | | | | | | | | | | | | | | | | | | | | | | | | | | | | |
| 50 | | | | | | | | | | | | | | | | | | | | | | | | | | | | | | | | |
| 51 | N | N | | | | | | | | | | | | | | | N | N | | | | | | | | | | | | | | |
| 52 | N | C1 C1 N C1 | N E3 N N | E 3 | | | E 3 | | | E 3 | | | | | | | N | C1 C1 N C1 | N E3 N N | E 3 | | | E 3 | | | | E 3 | | | |
| 53 | | | | | | | | | | | | | | | | | | | | | | | | | | | | | | | | |
| 54 | | | | N E3 N N | | | | | | | | | | | | | | | | N E3 N N | | | | | | | | | | | | |
| 55 | N | N | N | | | | | | | | | | | | | | N | N | N | | | | | | | | | | | | | |
| 56 | N | C1 C1 N C1 | N | C1 C1 N C1 | N E3 N N | E 3 | | | E 3 | | | | | | | | N | C1 C1 N C1 | N | C1 C1 N C1 | N E3 N N | E 3 | | | | E 3 | | | | |
| 57 | | | | | | | | | | | | | | | | | | | | | | | | | | | | | | | | |
| 58 | | | | | | | N E3 N N | | | | | | | | | | | | | | | | N E3 N N | | | | | | | | | |
| 59 | N | N | N | N | N | | | | | | | | | | | | N | N | N | N | N | | | | | | | | | | | |
| 60 | N | N C1 N N | N | C1 C1 N C1 | N | C1 C1 N C1 | N | D1 D1 N D1 | N | N C1 N N | N | C1 C1 N C1 | N | C1 C1 N C1 | N | D1 D1 N D1 | | | | | | | | | | | | | | | | |
| 61 | | | | | | | | | | | | | | | | | | | | | | | | | | | | | | | | |
| 62 | | | | | | | | | | | | | | | | | | | | | | | | | | | | | | | | |
| 63 | N | N | N | N | N | N | N | N | N | N | N | N | N | N | N | N | | | | | | | | | | | | | | | | |

FIG. 33

GRAY LEVEL VALUE B AFTER GRAY LEVEL SHIFT ADJACENT PIXEL (→)

GRAY LEVEL VALUE A BEFORE GRAY LEVEL SHIFT FOCUSED PIXEL (↓)

| A\B | 32 | 33 | 34 | 35 | 36 | 37 | 38 | 39 | 40 | 41 | 42 | 43 | 44 | 45 | 46 | 47 | 48 | 49 | 50 | 51 | 52 | 53 | 54 | 55 | 56 | 57 | 58 | 59 | 60 | 61 | 62 | 63 |
|---|---|---|---|---|---|---|---|---|---|---|---|---|---|---|---|---|---|---|---|---|---|---|---|---|---|---|---|---|---|---|---|---|
| 32,33 | N | | | | N | | N | | N | | N | | N | | N | | N | | N | | N | | N | | N | | N | | N | | N | |
| 34,35 | | | | | C1 N / C1 C1 | | N | | C1 N / C1 C1 | | N | | N N / C1 N | | N | | D1 N / D1 D1 | | N | | C1 N / C1 C1 | | N | | C1 N / C1 C1 | | N | | N N / C1 N | | N | |
| 36,37 | N | | C1 C1 / N C1 | | N | | | | N N / C1 N | | N | | N | | N | | E 2 | | | | N N / E2 N | | N | | N | | N | | N | | N | |
| 38,39 | N | | N | | | | | | C 1 | | N N / C1 N | | C1 N / C1 C1 | | N | | | | | | E 2 | | N N / E2 N | | C1 N / C1 C1 | | N | | C1 N / C1 C1 | | N | |
| 40,41 | N | | C1 C1 / N C1 | | N C1 / N N | | C 1 | | N | | | | N | | N | | E 2 | | | | E 2 | | | | N N / E2 N | | N | | N | | N | |
| 42,43 | N | | N | | N | | N C1 / N N | | | | | | C1 N / C1 C1 | | N | | | | | | | | | | E 2 | | N N / E2 N | | C1 N / C1 C1 | | N | |
| 44,45 | N | | N C1 / N N | | N | | C1 C1 / N C1 | | N | | C1 C1 / N C1 | | N | | | | F 2 | | | | E 2 | | | | E 2 | | | | N | | N | |
| 46,47 | N | | N | | N | | N | | N | | N | | | | | | | | | | | | | | | | | | D1 N / D1 D1 | | N | |
| 48,49 | N | | D1 D1 / N D1 | | E 3 | | | | E 3 | | | | F 3 | | | | N | | | | N | | N | | N | | N | | N | | N | |
| 50,51 | N | | N | | | | | | | | | | | | | | | | | | C1 N / C1 C1 | | N | | C1 N / C1 C1 | | N | | N N / C1 N | | N | |
| 52,53 | N | | C1 C1 / N C1 | | N E3 / N N | | E 3 | | E 3 | | | | E 3 | | | | N | | C1 C1 / N C1 | | N | | | | N N / C1 N | | N | | N | | N | |
| 54,55 | N | | N | | N | | N E3 / N N | | | | | | | | | | N | | N | | | | | | C 1 | | N N / C1 N | | C1 N / C1 C1 | | N | |
| 56,57 | N | | C1 C1 / N C1 | | N | | C1 C1 / N C1 | | N E3 / N N | | E 3 | | E 3 | | | | N | | C1 C1 / N C1 | | N C1 / N N | | C 1 | | N | | | | N | | N | |
| 58,59 | N | | N | | N | | N | | N | | N E3 / N N | | | | | | N | | N | | N | | N C1 / N N | | | | | | C1 N / C1 C1 | | N | |
| 60,61 | N | | N C1 / N N | | N | | C1 C1 / N C1 | | N | | C1 C1 / N C1 | | N | | D1 D1 / N D1 | | N | | N C1 / N N | | N | | C1 C1 / N C1 | | N | | C1 C1 / N C1 | | N | | | |
| 62,63 | N | | N | | N | | N | | N | | N | | N | | N | | N | | N | | N | | N | | N | | N | | N | |

FIG. 34

| SYMBOL | FORMULAE |
|---|---|
| N | $G_n=B$, $n=1$ |
| $C_{Jh}$ | $G_n=B+2T\{V>=6\}$, $n=1$, $Jh=1$ |
| $D_{Jh}$ | $G_n=B+2T\{V>=4\}$<br>$G_n=G_{n-1}$<br>$n=1\sim Nmax$ (V)<br>$Nmax(V)=1+\{V>=4\}+\{V>=10\}$, $Jh=1$ |
| $E_{Jh}$ | $G_n=A+4T\{V>=3\}$<br>$G_n=G_{n-1}$<br>$n=1\sim Nmax$ (V)<br>$Nmax(V)=2+\{V>=5\}+\{V>=10\}$, $Jh=1+\{T>0\}+2\{T<0\}$ |
| $F_{Jh}$ | $G_1=A+12T\{V=1\}+4T[OR(V=2,V>=8)]+8T[AND(V>=3,V<=7)]$<br>$G_2=A-4T[OR(V=4,V=5)]$<br>$G_n=G_{n-1}$<br>$n=1\sim Nmax$ (V)<br>$Nmax(V)=1+\{V>=2\}+\{V>=6\}+\{V>=10\}$, $Jh=1+\{T>0\}+2\{T<0\}$ |

A: GRAY LEVEL VALUE OF FOCUSED PIXEL
B: GRAY LEVEL VALUE OF PIXEL ADJACENT IN MOTION DIRECTION
V: ABSOLUTE VALUE OF MOTION SPEED [PIXEL/FIELD]
Jh: REFERENTIAL NUMERAL OF REDUNDANCY SIGNAL PATTERN OF
    CORRECTION SIGNAL TO BE INSERTED
$T=(B-A)/|B-A|$ : INCREASE/DECREASE OF CHANGE OF GRAY LEVEL VALUE IN MOTION DIRECTION
               (INCREASE: POSITIVE VALUE, DECREASE: NEGATIVE VALUE)
Results of logical operations described in {} indicate True=1 or False=0.

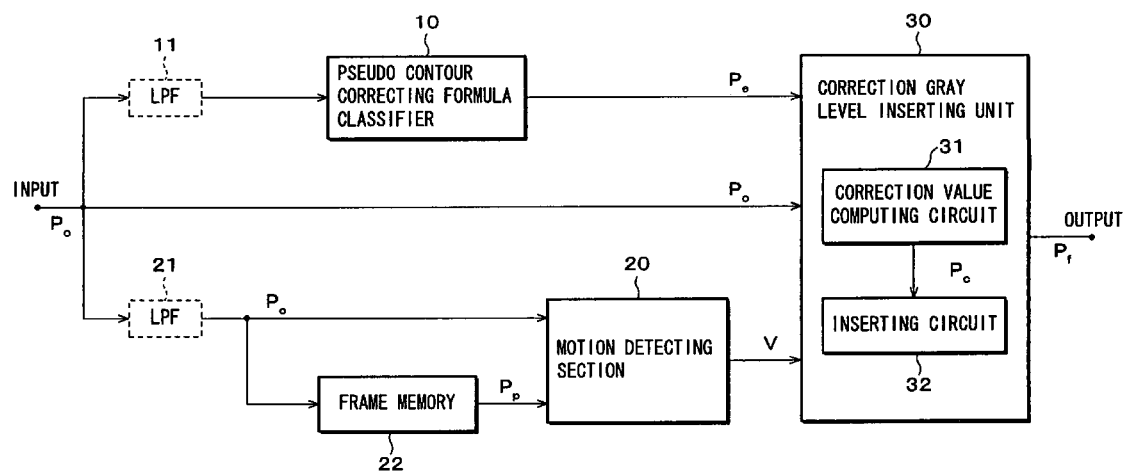
F I G. 3 5

FIG. 36

| NUMERAL Gr. | CORRECTING FORMULA Gr. |
|---|---|
| 0 | N |
| 1 | E (1) |
| 2 | C (Jh) |
| 3 | D (Jh) |
| 4 | F (Jh) |
| 5 | F (Jh) * |
| 6 | F (Jh) ** |
| 7 | f (Jh) |
| 8 | f (Jh) * |
| 9 | f (Jh) ** |

N represents non-correction.
Numeral in () represents a referential numeral of a redundancy signal pattern used.
Jh is 2 or 3.

FIG. 37

| NUMERAL Gr. | CORRECTING FORMULA Gr. |
|---|---|
| 0 | N |
| 1 | C1 |
| 2 | D1 |
| 3 | $E_{Jh}$ |
| 4 | $F_{Jh}$ |

N represents non-correction.
Jh is 2 or 3.

COMPUTATION RESULT OF CORRECTED RAMP-WAVEFORM MOTION PICTURE (TIME DIVISION 1:8:4:8)

F I G. 4 2
COMPUTATION RESULT OF NON-CORRECTED RAMP-WAVEFORM MOTION PICTURE (TIME DIVISION 1:8:4:8)

COMPUTATION RESULT OF CORRECTED RAMP-WAVEFORM MOTION PICTURE (TIME DIVISION 8:4:1:8)

COMPUTATION RESULT OF NON-CORRECTED RAMP-WAVEFORM MOTION PICTURE (TIME DIVISION 8:4:1:8)

F I G. 5 1
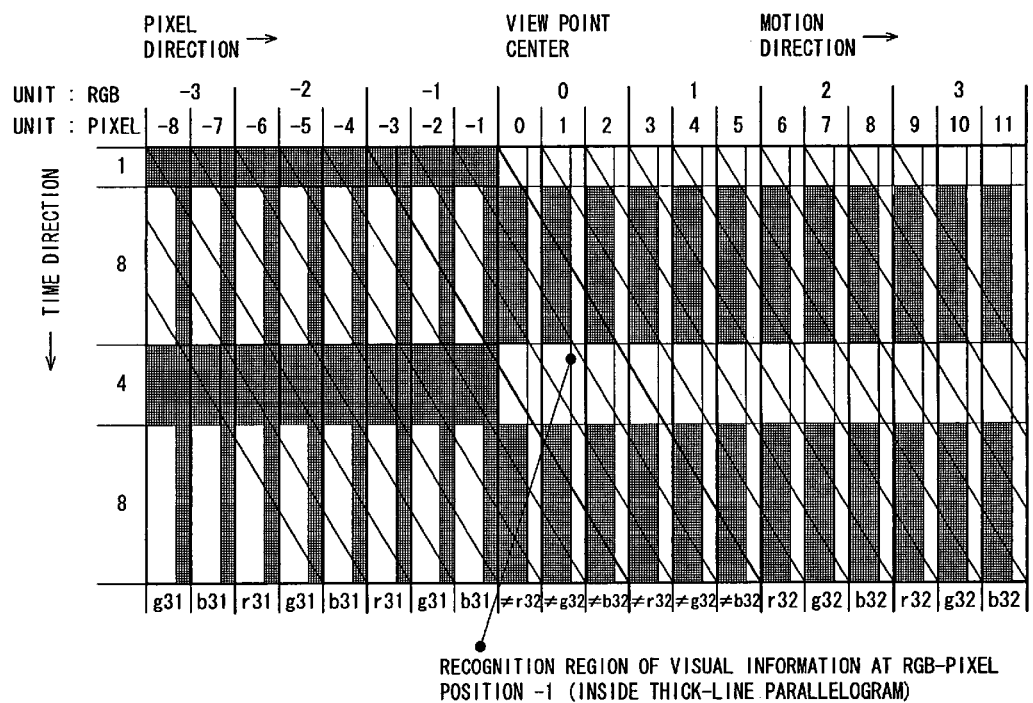
RECOGNITION REGION OF VISUAL INFORMATION AT RGB-PIXEL
POSITION -1 (INSIDE THICK-LINE PARALLELOGRAM)

RECOGNITION REGION OF VISUAL INFORMATION AT RGB-PIXEL POSITION -1 (INSIDE THICK-LINE PARALLELOGRAM)

| LOCAL COORDINATE | 0 | 1 | 2 | 3 | 4 | 5 | 6 | 7 | 8 | 9 | 10 | 11 |
|---|---|---|---|---|---|---|---|---|---|---|---|---|
| x COORDINATE | 5 | 6 | 7 | 8 | 9 | 10 | 11 | 12 | 13 | 14 | 15 | 16 |
| EXTRACTED PIXEL | 0 | 2 | 7 | 11 | 21 | 28 | 44 | 53 | 69 | 78 | 86 | 95 |
| y COORDINATE | 12 | 11 | 11 | 10 | 9 | 9 | 8 | 8 | 7 | 6 | 6 | 5 |

HORIZONTAL CONTRIBUTION COMPONENT

FIG. 55 (b)

| LOCAL COORDINATE | 0 | 1 | 2 | 3 | 4 | 5 | 6 | 7 |
|---|---|---|---|---|---|---|---|---|
| x COORDINATE | 5 | 6 | 7 | 9 | 11 | 12 | 14 | 15 |
| EXTRACTED PIXEL | 0 | 2 | 6 | 21 | 44 | 54 | 78 | 87 |
| y COORDINATE | 12 | 11 | 10 | 9 | 8 | 7 | 6 | 5 |

VERTICAL CONTRIBUTION COMPONENT

FIG. 56(a)

| LOCAL COORDINATE | 0 | 1 | 2 | 3 | 4 | 5 | 6 | 7 | 8 | 9 | 10 | 11 |
|---|---|---|---|---|---|---|---|---|---|---|---|---|
| x COORDINATE | 5 | 6 | 7 | 8 | 9 | 10 | 11 | 12 | 13 | 14 | 15 | 16 |
| EXTRACTED PIXEL | 0 | 2' | 7' | 11' | ⊠ | ⊠ | ⊠ | ⊠ | ⊠ | ⊠ | ⊠ | ⊠ |
| y COORDINATE | ↑12 | ↑11 | 11 | 10 | 9 | 9 | 8 | 8 | 7 | 6 | 6 | 5 |

HORIZONTAL CONTRIBUTION COMPONENT

ADJACENT PIXEL

FOCUSED PIXEL

FIG. 56(b)

| LOCAL COORDINATE | 0 | 1 | 2 | 3 | 4 | 5 | 6 | 7 |
|---|---|---|---|---|---|---|---|---|
| x COORDINATE | 5 | 6 | 7 | 9 | 11 | 12 | 14 | 15 |
| EXTRACTED PIXEL | 0 | 2" | 6" | 21" | ⊠ | ⊠ | ⊠ | ⊠ |
| y COORDINATE | ↑12 | ↑11 | 10 | 9 | 8 | 7 | 6 | 5 |

VERTICAL CONTRIBUTION COMPONENT

ADJACENT PIXEL

FOCUSED PIXEL

TEST PICTURE:STATIC STATE

TEST PICTURE:NON-CORRECTED RESULT

TEST PICTURE:CORRECTED RESULT

FIG. 66
CONVENTIONAL ART

| NUMBER OF SUB-FIELD | SUB-FIELD |||||| 
|---|---|---|---|---|---|---|
| | SF9 | SF8 | SF7 | SF6 | SF5 | SF4~0 |
| 8 | - | - | 128 | 64 | 32 | 16, 8, 4, 2, 1 |
| 10 | 64 | 64 | 32 | 32 | 32 | 16, 8, 4, 2, 1 |
| 10 | 48 | 48 | 48 | 48 | 32 | 16, 8, 4, 2, 1 |

MOTION PICTURE PSEUDO CONTOUR CORRECTING METHOD AND IMAGE DISPLAY DEVICE USING THE METHOD

FIELD OF THE INVENTION

The present invention relates to an image display device capable of half-tone display by the time division method in which one field period or one frame period in image display is divided into a plurality of sub-fields, such as a plasma display panel or a ferroelectric liquid crystal display, and particularly relates to correction of a motion picture pseudo contour that is a problem peculiar to this type of image display devices.

BACKGROUND OF THE INVENTION

Recently, a plasma display panel (hereinafter referred to with its abbreviation, "PDP") and a ferroelectric liquid crystal display have drawn attention as a display device with which display in a large screen, great display capacity, and multiple-gray-level display can be realized.

For example, a PDP generally adopts the time division gray-scale display method as follows: in advance, one field (or called as one frame in some cases: either of the same defines 60 Hz cycle) period is divided into a plurality of 8 to 12 sub-field (sub-frame) periods that differ in the length of the emission period, and independent ON/OFF states of the sub-field periods are selectively combined, so that the gray-scale display should be carried out due to the effect of accumulation sensed by eyes (afterimage effect).

A concrete example of realizing 256 gray levels by the foregoing time division gray-scale display method is shown in FIG. 61. In this example, one field period is divided into 8 sub-field periods SF1 through SF8, then each of the sub-field periods SF1 through SF8 is divided into an addressing period and a display period, and the relative ratio of the lengths of the display periods is set to 1:2:4:8:16:32:64:128 ($2^n$; n=0 to 7). By selectively combining independent ON/OFF states of the respective sub-field periods thus set, 256 gray levels can be realized.

However, in the case of the foregoing time division gray-scale display method, to display a gray level "127" for example, the state is ON in the sub-field periods SF1 through SF7 as shown in FIG. 62, thereby resulting in that the emission period (indicated by hatching in the figure) of PDP comes concentratedly in the first half of the one field period. Besides, to display the gray level "128", the state is ON only in the sub-field period SF8, thereby resulting in that emission period comes concentratedly in the latter half of the one field period.

Therefore, as shown in FIG. 63 as an example, in the case where an object 112 with a brightness of the gray level "128" moves upward in a background 111 with a brightness of the gray level "127", the observer, since following the object 112 with eyes, captures motion from an image 112a to an image 112b as the object 112.

Here, a pixel located at a lower part of the contour of the image 112a displays the gray level "128" according to the ON state in the sub-field period SF8, and subsequently displays the gray level "127" of the background 111 after the image 112a moves upwards according to the ON state in the sub-field periods SF1 through SF7. Thus, the pixel located in the lower part of the contour of the image 112a is successively ON in the sub-field period SF8 and the sub-field periods SF1 through SF7, and consequently the pixel appears to the observer as if it would display a gray level "255".

On the other hand, a pixel located at an upper part of the contour of the image 112a moving has displayed the gray level "127" of the background 111 until before the image 112a moves thereto, and therefore, the pixel is turned OFF in the sub-field period SF8 after it has been ON in the sub-field periods SF1 through SF7. Then, with the image 112b moving thereto, the pixel necessarily remains OFF in the sub-field periods SF1 through SF7 until it is turned ON in the sub-field period SF8, to display the gray level "128". Thus, the pixel located at the upper part of the contour of the image 112b moving thereto is successively OFF in the sub-field period SF8 and the sub-field periods SF1 through SF7, and consequently the pixel appears to the observer as if it would display a gray level "0".

Thus, there occurs a phenomenon in which the gray level (0, 255) different from the gray level that should be seen (128) actually appears to be seen in a contour of the object 112 (this phenomenon is hereinafter referred to as "motion picture pseudo contour").

In most cases, the motion picture pseudo contour is a phenomenon in which upon motion of a picture with smooth gray level gradation, a belt-form virtual image having a luminance or a chromaticity that does not originally exist in a picture is recognized, giving the observer a strong impression of deterioration of image quality, or a phenomenon in which, in an object with smooth gray level gradation, gray level interference with a remarkable peak occurs in a continuous space with respect to a specific gray level shift. Since the interference is spatially continuous, this results in that a contour that should not exist is seen by the humans' eyes.

In other words, this motion picture pseudo contour is a new image-quality-concerned problem that has not occurred to CRT displays but occurs to PDPs and the like that adopt the time division gray-scale display method, and it can be defined as: "distortion of an image observed when the point of view travels over a display device screen; often occurring to a contour part of a motion picture displayed in gray scale; generation thereof depends on a product of a length of an emission period of a pixel and a view point travelling speed, as well as on non-uniformity of emission in terms of time, and causes disorder of gray levels and colors".

Incidentally, such a principle of generation of the motion picture pseudo contour is explained by Mikoshiba et al., "Dynamic False Contours on PDPs-Fatal or Curable?", IDW'96 (Kobe International Meeting in 1996, 11, 27–29). It is also explained in "Consideration on Improving Motion Picture Quality of PDP with use of a Sub-Field Method" (Keiji ISHII et al., Technical Report of the Institute of Electronics, Information and Communication Engineers, Vol. 97, No. 336, issued on Oct. 23, 1997).

On the other hand, to alleviate the motion picture pseudo contour, for example, the foregoing "Consideration on Improving Motion Picture Quality of PDP with use of a Sub-Field Method" directed attention to that the amplitude of the motion picture pseudo contour that is a difference between the gray level of the motion picture pseudo contour and the original gray level increases in proportion to the length of a display period in a sub-field period, and proposed that the amplitude of the motion picture pseudo contour is decreased by dividing the sub-field period including a long display period thereby increasing the number of sub-field periods having short display periods.

FIG. 66 illustrates an example of division into sub-field periods. In this example, the number of sub-fields is increased from 8 to 10 based on the following two types of division formulae:

$$128+64=64+64+32+32$$

$$128+64=48+48+48+48$$

The foregoing document describes that image quality can be improved by, apart from the method which increases the number of the sub-field periods, the method which compresses the display period of each sub-field period, the method which optimizes the arrangement of the sub-field periods, or the method which adaptively controls emission patterns by signal processing to select an optimal emission pattern of each sub-field period.

Furthermore, for example, the Japanese Publication for Laid-Open Patent Application No. 39828/1998 (Tokukaihei 10-39828 [Date of Publication; Feb. 13, 1998]) discloses a method which inserts a correction gray level value or a correction pulse in a part of gray level shift at which the motion picture pseudo contour is generated.

The technique of the publication is intended to alleviate the motion picture pseudo contour of the video in a half-tone display method and device for performing half-tone display by the frame time division method, and as explained with reference to FIG. 61, the technique relates to the half-tone display method which, to display an image, provides a plurality of emission blocks in each frame and displays half-tones with combinations of the emission blocks.

In the foregoing half-tone display method, in the case where light emission patterns of light emission blocks of respective pixels change in successive frames, image information is compared between two frames, and the light emission block preliminarily determined for luminance adjustment is added or subtracted to or from each pixel where light emission state changes, according to the state of the change.

More specifically, as shown in FIGS. 64(a), 64(b), and 64(c), when a display picture is scrolled from the left side to the right side at a rate of 1 coordinate/F (frame) along an x-axis on retinas in a state in which halftone levels with respective luminances K(x) of 128 and 127 are adjacently displayed, a dark line (DL) is generated in the boundary part between the halftone levels 128 and 127, that is, at coordinates of x=4 on retinas that follow the display picture moving. The dark line (DL) is expressed as L(1)=L(3)>>L(2), using a stimulus quantity L(x) on retinas.

In this case, as shown in FIGS. 65(a), 65(b), and 65(c), a stimulus value ΔL(4) according to an equivalent pulse EPA (light emission block: sub-frame) that is derived so as to satisfy the following formula is added to pixels where the dark line (DL) is generated:

$$L(1) \geq L(2)+\Delta L(4) \geq L(3)$$

Then, as shown in FIG. 65(c), it follows that the stimulus value L(x) on retinas is added by the stimulus value ΔL(4) in L(2) of the boundary part between the halftone levels 128 and 127 and the moving picture pseudo contour (color pseudo contour) of the video is suppressed.

On the other hand, in the case of a ferroelectric liquid crystal display device, it is possible to adopt a time division gray-scale display method identical to the aforementioned one, taking advantage of the characteristic of ferroelectric liquid crystal in that the orientation of molecules abruptly switches between two directions when an applied electric field crosses a threshold value.

For example, the Japanese Publication for Laid-Open Patent Application No. 152017/1995 (Tokukaihei 7-152017 [Date of Publication: Jun. 16, 1995]) discloses a method in which ultrafine particles are dispersed in a layer of ferro-electric liquid crystal so that a micro domain whose transmittance is caused to vary with a voltage applied is generated around each ultrafine particle, and gradation control is executed by any one of the pulse voltage/amplitude modulation method, the pixel electrode division method, and the time division method, or combination of some of the same.

However, although the turbulence of luminance in the motion picture pseudo contour increases in interrelation with a motion speed of a picture, as will be described later in the "Description of the Preferred Embodiments" section, the foregoing conventional method for alleviating or correcting the motion picture pseudo contour does not take the motion speed of a picture into consideration at all.

More specifically, the foregoing "Consideration on Improving Motion Picture Quality of PDP with use of a Sub-Field Method" describes the method which increases the number of time divisions, the method which compresses the display period of each sub-field period, the method which optimizes the arrangement of the sub-field periods in terms of time, and the method which adaptively controls emission patterns by signal processing to select an optimal emission pattern of each sub-field period, but these methods are methods that merely improve the motion picture pseudo contour, uniformly, irrespective of the motion speed of a picture, an individual magnitude of gray level turbulence, etc.

Furthermore, the method for correcting a motion picture pseudo contour disclosed by Tokukaihei 10-39828 discloses a method that merely adds/subtracts a correction-use light emission block that is unchanged even with variation of the motion speed, with respect to a pixel at which the motion picture pseudo contour is generated. The foregoing document does not propose a correction method responsive to the motion speed of a picture.

Furthermore, Tokukaihei 7-152017 does not mention the problem of the motion picture pseudo contour at all.

Therefore, the foregoing conventional schemes regarding the motion picture pseudo contours have not gone farther from the level of mere decrease of the motion picture pseudo contour, as shown in the graph of Tokukaihei 10-39828 that shows a result of correction. Thus, there still remain problems relating to precision of correction.

On the other hand, the method that increases the number of the sub-field periods resulting from division of one field as proposed by the "Consideration on Improving Motion Picture Quality of PDP with use of a Sub-Field Method" achieves an effect in decreasing the motion picture pseudo contour and realizing high quality display, but undergoes the following secondary problem, since a time for one scanning cycle has to be shortened.

Taking into consideration the response time of the emission elements per se, the time for turning on/off gates provided in each element, and blank periods in display, a waiting time is required to some extent other than the time for scanning. In the case of an overall-flush-type PDP, gates are scanned in a dark state, and overall light emission is executed after a certain necessary time has passed after the scanning was thoroughly completed. For this reason, as the number of sub-fields increases, the limitations on the time required for the light emission process may possibly become not tolerated, as the number of scanning lines increases. In short, control of operation timings of the device becomes difficult.

Furthermore, with regard to circuitry, signals are made to have high frequencies as the number of sub-fields increases, and hence, the power consumption of the device tends to increase. This is because that the power consumption is generally proportional to a frequency used. More specifically, the number of times of discharge inside a circuit is generally proportional to the frequency, and proportionally the average current increases as well. Therefore, if resistance components in the circuit cannot be sufficiently lowered, consumed power increases as the current increases.

SUMMARY OF THE INVENTION

An object of the present invention is to provide a motion picture pseudo contour correcting method and an image display device using the method that enable to decrease the number of time divisions and to simplify circuit arrangement for correcting a motion picture pseudo contour, and to correct a motion picture pseudo contour with high precision.

To achieve the foregoing object, a motion picture pseudo contour correcting method of the present invention is characterized by comprising the steps of (a) detecting a gray level shift from a focused pixel to an adjacent pixel, as gray level information of the focused pixel, (b) detecting a motion vector indicative of a speed and a direction of motion of a picture from the focused pixel to another pixel, as motion information of the focused pixel, and (c) outputting a corrected gray level signal based on input of an original signal of the picture, the gray level information, and the motion information.

By the foregoing method, gray level information and motion information of a focused pixel are detected. Then, with input of an original signal, the foregoing gray level information, and the foregoing motion information, a corrected gray level signal is outputted.

Conventionally, a method applied to reduce a motion picture pseudo contour has been a method in which between gray level shifts at which a motion picture pseudo contour occurs, a correction gray level value or a correction pulse according to the gray level shifts is inserted. More specifically, a light emission block for adjustment of luminance is added or subtracted to or from a light emission block of a pixel where light emission state changes from a frame to a next frame, according to the state of the change.

However, since conventionally it was not discovered that the turbulence of magnitude of luminance increases in proportion to a motion speed of a picture, the motion speed of the picture was not taken into consideration at all in correction of a motion picture pseudo contour. As a result, the motion picture pseudo contour was corrected with insufficient precision.

On the other hand, according to the foregoing method of the present invention, a corrected gray level signal is outputted with input of an original signal of a picture, the foregoing gray level information, and the foregoing motion information.

More specifically, in the present invention, the motion picture pseudo contour correction is executed based on inputs of not only a gray level shift from a focused pixel to an adjacent pixel but also motion information such as a motion vector indicative of a speed and a direction of motion of a picture from a focused pixel to an adjacent pixel, so that a corrected gray level signal is outputted.

Therefore, motion picture pseudo contour correction with high precision can be executed appropriately according to a gray level shift and a motion speed of a picture, even if a magnitude of the gray level shift or a range of pixels affected by the gray level shift are changed, thereby enabling image display without disorder of gray levels and colors.

Furthermore, to achieve the foregoing object, an image display device of the present invention is characterized by comprising (i) a gray level information detecting section for detecting a gray level shift from a focused pixel to an adjacent pixel as gray level information of the focused pixel, (ii) a motion information detecting section for detecting a motion vector indicative of a speed and a direction of a picture when the picture moves from the focused pixel to another pixel, as motion information of the focused pixel, and (iii) a correction-use signal generating section for outputting a corrected gray level signal, based on an original signal of the picture, the gray level information, and the motion information that are inputted thereto.

According to the foregoing arrangement, gray level information of a focused pixel is detected by the gray level information detecting section, and motion information of the focused pixel is detected by the motion information detecting section. An original signal of the picture, the gray level information and the motion information are inputted to the correction-use signal generating section, and a corrected gray level signal is outputted from the correction-use signal generating section.

Thus, upon motion picture pseudo contour correction, not only gray level information but also a motion vector indicative of a speed and a direction of motion of a picture from the focused pixel to the adjacent pixel are considered as motion information.

Therefore, motion picture pseudo contour correction with high precision can be executed appropriately according to a gray level shift and a motion speed of a picture, even if a magnitude of the gray level shift or a range of pixels affected by the gray level shift are changed, thereby enabling image display without disorder of gray levels and colors.

For a fuller understanding of the nature and advantages of the invention, reference should be made to the ensuing detailed description taken in conjunction with the accompanying drawings.

BRIEF DESCRIPTION OF THE DRAWINGS

FIG. 1 is a flowchart illustrating a flow of a process based on a motion picture pseudo contour correcting method in accordance with the present invention.

FIG. 4 is an explanatory view illustrating an example of a driving sequence for half-tone display executed by applying the pixel division display method shown in FIGS. 3(a) and 3(b) in combination with the time division display method.

FIG. 5 is a view illustrating an example of a gray level signal pattern used in a driving sequence for half-tone display executed by applying the pixel division display method shown in FIGS. 3(a) and 3(b) in combination with the time division display method.

FIG. 6 is a view illustrating another gray level signal pattern used in the same driving sequence to which the gray level signal pattern shown in FIG. 5 is applied.

FIG. 7 is a view illustrating still another gray level signal pattern used in the same driving sequence to which the gray level signal pattern shown in FIG. 5 is applied.

FIGS. 13(a) through 13(d) are graphs illustrating magnitudes and shapes of a motion picture pseudo contour produced when the step-like picture of FIG. 8 moves, depending on respective speeds of the motion of the picture that are different from those of FIGS. 11(a) through 11(c) and 12(a) through 12(d).

FIGS. 14(a) and 14(b) are graphs for explaining gray level signal patterns used in a driving sequence, and differences in magnitudes and shapes between motion picture pseudo contours produced.

FIGS. 15(a) and 15(b) are other graphs for explaining a gray level signal pattern used in a driving sequence, and differences in magnitudes and shapes between motion picture pseudo contours produced.

FIG. 18 is a view showing pixels supplied with correction gray level signals upon motion of a step-like picture in which regions with different gray levels are adjoined, in relation with motion speeds.

FIG. 19 is a view showing gray level values of the correction gray level signals, that are expressed with gray level deviations with respect to gray level values of adjacent pixels.

FIG. 20 is a partial view showing relationship between gray level values before and after gray level shifts and correction patterns corresponding to the gray level shifts in the case where a certain gray level signal pattern is applied to a driving sequence, regarding a certain range of gray level values.

FIG. 21 is a partial view showing the relationship regarding another range of gray level values continuous to that of FIG. 20.

FIG. 22 is a partial view showing the relationship regarding still another range of gray level values continuous to that of FIG. 20.

FIG. 23 is a partial view showing the relationship regarding still another range of gray level values continuous to those of FIGS. 21 and 22.

FIG. 24 is a view showing logical formulae for calculation of correction gray levels that utilize gray levels before and after gray level shifts and motion speeds of a picture as arguments, regarding each of the various correction patterns shown in FIGS. 20 through 23.

FIG. 25 is a view illustrating an example of a gray level signal pattern used in a driving sequence for half-tone display executed by applying the pixel division display method shown in FIGS. 3(a) and 3(b) in combination with a time division display method that is different from that shown in FIGS. 5 through 7.

FIG. 26 is a view illustrating another gray level signal pattern used in the same driving sequence to which the gray level signal pattern shown in FIG. 25 is applied.

FIG. 27 is a view illustrating still another gray level signal pattern used in the same driving sequence to which the gray level signal pattern shown in FIG. 25 is applied.

FIG. 29 is an explanatory view for explaining visual information in the vicinity of the view point center in the case where the step-like picture of FIG. 28 moves.

FIG. 30 is a partial view showing relationship between gray level values before and after gray level shifts and correction patterns corresponding to the gray level shifts in the case where a certain gray level signal pattern is applied to a driving sequence different from that in the case of FIGS. 20 through 23, regarding a certain range of gray level values.

FIG. 31 is a partial view showing the relationship regarding another range of gray level values continuous to that of FIG. 30.

FIG. 32 is a partial view showing the relationship regarding still another range of gray level values continuous to that of FIG. 30.

FIG. 33 is a partial view showing the relationship regarding still another range of gray level values continuous to those of FIGS. 31 and 32.

FIG. 34 is a view showing logical formulae for calculation of correction gray levels using as arguments gray levels before and after gray level shifts and motion speeds of a picture, regarding each of the various correction patterns shown in FIGS. 30 through 33.

FIG. 35 is a block diagram illustrating an arrangement of an image display device executing the motion picture pseudo contour correcting method in accordance with the present invention.

FIG. 36 is a view illustrating correspondence between correcting formulae corresponding to the correction patterns shown in FIGS. 20 through 23 and numerals, so that numerals indicative of the correcting formulae should be outputted by a pseudo contour correcting formula classifier.

FIG. 37 is a view illustrating correspondence between correcting formulae corresponding to the correction patterns shown in FIGS. 30 through 33 and numerals, so that numerals indicative of the correcting formulae should be outputted by a pseudo contour correcting formula classifier.

FIG. 42 is a view illustrating a display result in the case where the same picture as above is moved in the same manner as above without correction of a motion picture pseudo contour, for comparison with the correction result shown in FIG. 41.

FIG. 51 is an explanatory view for explaining visual gray level information in the case of FIG. 50, corresponding to that in the case of FIG. 10.

FIG. 54(a) is a schematic explanatory view showing a motion vector of a focused pixel in a two-dimensional pixel arrangement, and FIG. 54(b) is a schematic explanatory view showing pixels extracted as being related to the motion vector.

FIGS. 55(a) and 55(b) are explanatory views showing pixels extracted as being related to a horizontal component of the motion vector and pixels extracted as being related to a vertical component.

FIGS. 56(a) and 56(b) are an explanatory view illustrating a state in which pixels to be fed with correction gray level signals are determined regarding a horizontal contribution component as well as regarding a vertical contribution component.

FIG. 66 is a diagram illustrating an example of field division in which a sub-field with a long display period, among the sub-fields shown in FIG. 61, is further divided.

DESCRIPTION OF THE PREFERRED EMBODIMENTS

Figure 2:
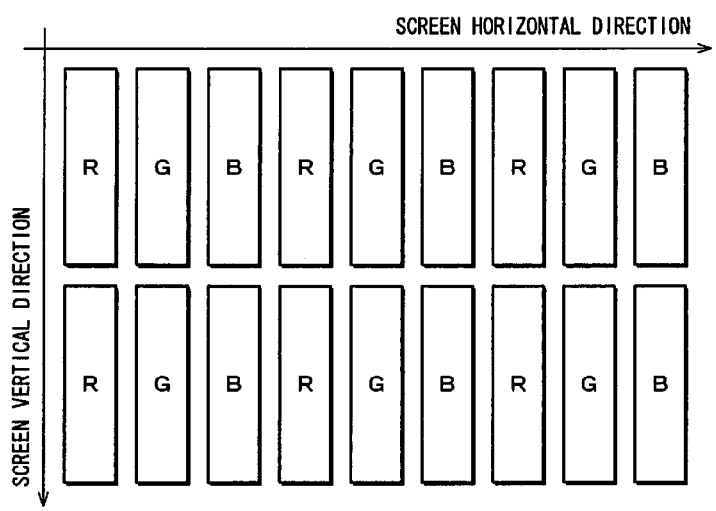
FIGS. 2(a) and 2(b) are explanatory views schematically illustrating an example of a stripe-form pixel arrangement of a pixel non-division type for color display.
Figure 2:
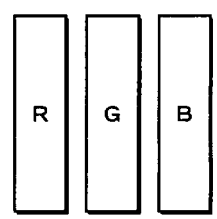

First of all, a flow of a process for correcting a motion picture pseudo contour in accordance with the present invention will be explained as follows, with reference to a flowchart of FIG. 1.

First of all, an image display device inputs a picture composed of a plurality of pixels, with original signals for one field or one frame of a motion picture, in a signal form for gray-scale display with a predetermined number of gray levels on a display screen (step 1, hereinafter abbreviatedly referred to as S1). Then, as to adjacent pixels in the same field or the same frame, combinations of gray levels of pixels (gray level shift) are searched, and gray level information is obtained (S2).

More specifically, a level A of a certain focused pixel and levels B of at most 8 pixels adjacent to the focused pixel are searched. Thus, at most 8 pieces of information on level combination A-B may be obtained as level information as to each pixel. Alternatively, at most 8 pieces of information on deviation of the level B with respect to the level A may be obtained as gray level information.

On the other hand, concurrently with the process at S2, a motion vector as information about a motion speed (speed and direction) of a picture is detected as to each pixel with an original signal for one field or one frame, about which gray level information is to be obtained. By so doing, motion information is obtained (S3).

It has been found that a magnitude of turbulence of a gray level and a range of pixels affected by the turbulence change according to the gray level shift and the motion speed of a picture. Therefore, to correct the motion picture contour, a correction gray level signal (motion picture pseudo contour correction signal) is obtained according to the foregoing gray level information and the motion vector (S4), and the correction gray level signal is supplied to the original signal, so that the original signal and the correction gray level signal are synthesized (S5).

Thus, a spatial gray level turbulence within one field or one frame can be detected from gray level information of a focused pixel and an adjacent pixel, and by combining the gray level turbulence with the motion information of the picture, a time-related gray level turbulence upon motion of the picture in a picture motion direction that occurs as time lapses can be detected.

Therefore, according to the motion picture pseudo contour of the present invention, two factors of the spacial turbulence and the time turbulence of a gray level are used in detecting a generated motion picture pseudo contour. Therefore, not only a magnitude of the gray level turbulence in the generated motion picture pseudo contour but also a range of pixels that are affected by the gray level turbulence can be accurately detected.

By repeating the process (S1 to S5) for correcting motion picture pseudo contour in an original signal corresponding to one field or one frame of a motion picture, gray levels of pixels at which a motion picture pseudo contour appears are corrected, so that the motion picture pseudo contour can be corrected with high precision.

Incidentally, the pixels to which the correction gray level signal should be outputted, that is, the pixels to be corrected, are determined according to the gray level information and the motion vector at S4.

The following description will explain in detail the motion picture pseudo contour correcting method, and an image display device using the foregoing method.

First Embodiment

The following description will explain an embodiment regarding the motion picture pseudo contour correcting method of the present invention, with reference to FIGS. 2(a), 2(b), through 24.

The present embodiment will be explained by taking as an example a method for correcting a motion picture pseudo contour in the case where a driving sequence based on the time division gray scale display method in combination with the pixel division method is applied to a ferroelectric liquid crystal display, a plasma display panel (hereinafter referred to as PDP), etc. as a display device with a large screen, a large capacity, and a multiple-gray-level display.

Incidentally, the motion picture pseudo contour correcting method of the present invention is arranged so as to achieve higher precision in motion picture pseudo contour correction than conventionally, in the case where at least the time division gray scale display method is adopted to a method or a device carrying out half-tone display. Further, by adopting the pixel division method in combination, the number of time division can be reduced. Consequently, control of the operation timing of the device is made easier, while an advantage of suppression of power consumption can be achieved.

1.1 Pixel Structure

First, the following description will explain pixel arrangement on the display. FIG. 2(a) schematically illustrate stripe-form pixel arrangement of a pixel non-division type corresponding to color display. In this case, areas of R pixels, G pixels, and B pixels that display red, green, and blue, respectively, are equal to one another, and therefore, their ratio is 1:1:1.

Furthermore, as shown in FIG. 2(b), one set of an R pixel, a G pixel, and a B pixel adjoined in a horizontal direction of the screen consists of one unit pixel (hereinafter simply referred to as pixel) for color display.

Figure 3:
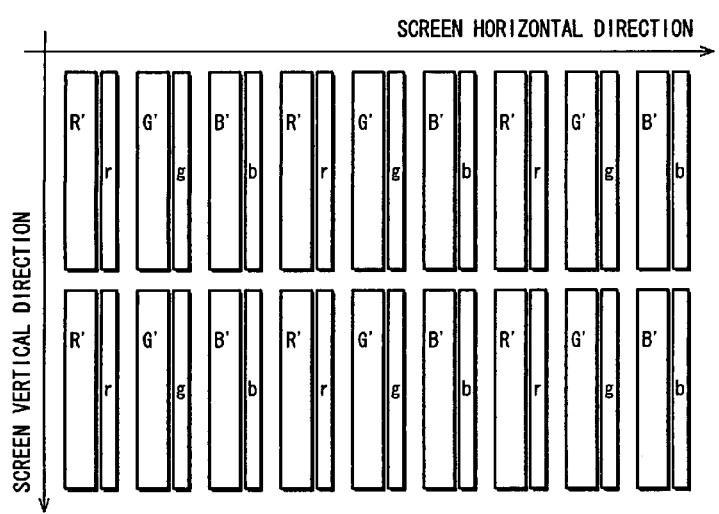
FIGS. 3(a) and 3(b) are explanatory views schematically illustrating a stripe-form pixel arrangement of a pixel division type responsive to color display.
Figure 3:
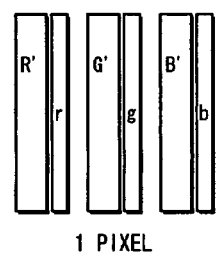

To be compared with the foregoing pixel arrangement of the pixel non-division type, a stripe-form pixel arrangement of a pixel division type in accordance with the present embodiment is shown in FIG. 3(a). Comparing FIGS. 2(a) and 3(a), it can be seen that each R pixel in FIG. 2(a) is divided into an R' sub-pixel and an r sub-pixel at an area ratio of 2:1. This also applies to each G pixel and each B pixel, as well as their corresponding sub-pixels, that is, G' sub-pixel and g sub-pixel, and B' sub-pixel and b sub-pixel.

Incidentally, one pixel carrying out color display is composed of an R' sub-pixel, an r sub-pixel, a G' sub-pixel, a g sub-pixel, a B' sub-pixel, and b sub-pixel that adjoin to each other in a horizontal direction of the screen, as shown in FIG. 3(b).

1.2 Driving Sequence

The following description will explain the time division gray scale display method in which a display period of one field is divided into four sub-fields at a time ratio of 1:8:4:8, in combination with the pixel division display method in which one pixel is divided into two sub-pixels at an area ratio of 2:1 as shown in FIGS. 3(a) and 3(b). Note that, for conveniences' sake, the R' sub-pixel and r sub-pixel shown in FIG. 4 are taken as an example.

The abscissa in FIG. 4 is a spatial axis concerning positions of the R' sub-pixel and r sub-pixel, while the ordinate thereof is a time axis. Along the time axis, one field (=1/60 second) is indicated in which an addressing period denoted with "RESET" and a display period denoted with each emission ratio are alternately provided.

In the case where that the R' sub-pixel and r sub-pixel are made to illuminate for all of four sub-fields, a gray level value K herein has a maximum value as follows:

$$K=1 \cdot R+1 \cdot r+8 \cdot R+8 \cdot r+4 \cdot R+4 \cdot r+8 \cdot R+8 \cdot r=21 \cdot R+21 \cdot r$$

Then, K=63 is derived when 2 and 1 are substituted for R and r in the foregoing formula, respectively, based on R=2 and r=1 according to the area ratio between the R' sub-pixel and r sub-pixel. On the other hand, the minimum of the gray level value K is 0. Therefore, the number of gray levels displayable by the driving sequence shown in FIG. 4 is 64, as the values of the gray levels are from 0 to 63.

Further, in the case of the emission pattern of FIG. 4 in which emission areas are shown by hatching, the emission pattern has a gray level value K expressed as follows:

$$K=1 \cdot R+1 \cdot r+0 \cdot R+8 \cdot r+4 \cdot R+0 \cdot R+8 \cdot r=5 \cdot R+17 \cdot r$$

Then, K=27 is derived as 2 and 1 are substituted for R and r in the foregoing formula, respectively. Consequently, a tone of the gray level value 27 can be displayed by the foregoing emission pattern.

Figure 61:
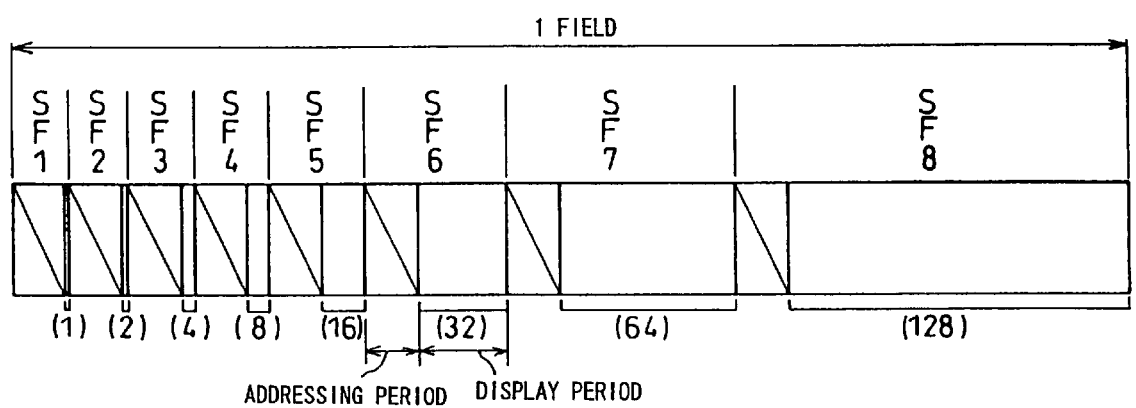
FIG. 61 is an explanatory view illustrating an example of division of one field for realizing the 256-level display by the conventional time division gray-scale display method.
Figure 62:
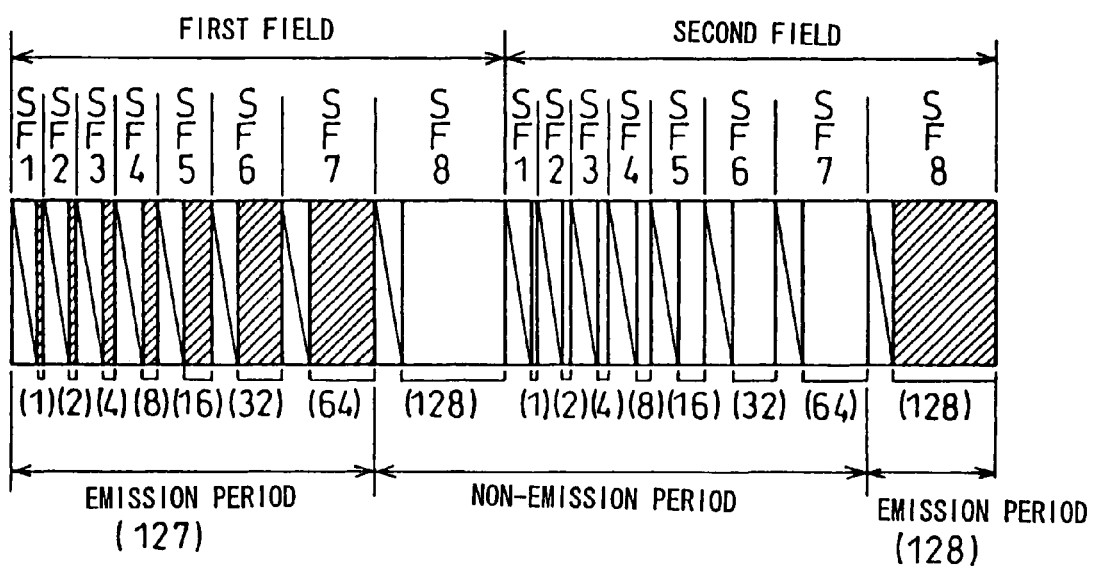
FIG. 62 is an explanatory view illustrating sub-fields for emission to display a half-tone gray levels 128 and 127 by the conventional time division gray-scale display method.
Figure 63:
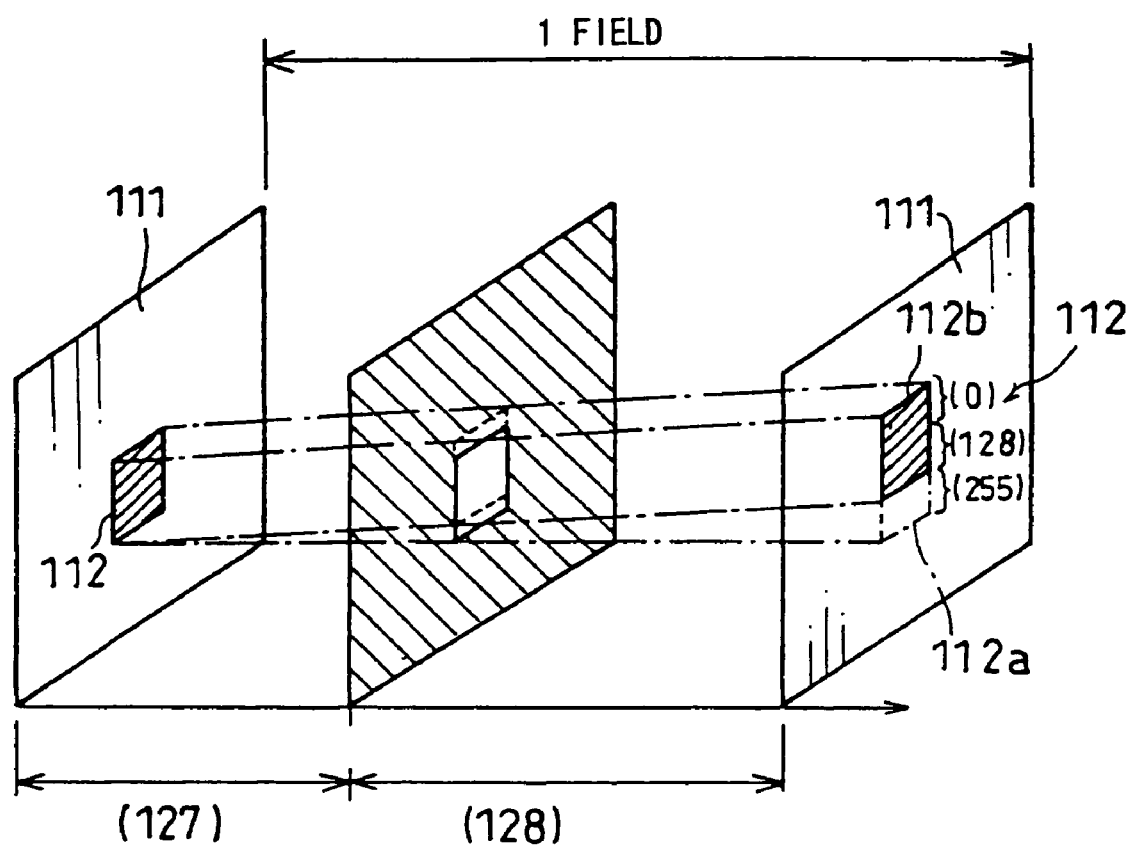
FIG. 63 is a concept view for explaining how a motion picture pseudo contour is generated.
Figure 64A:
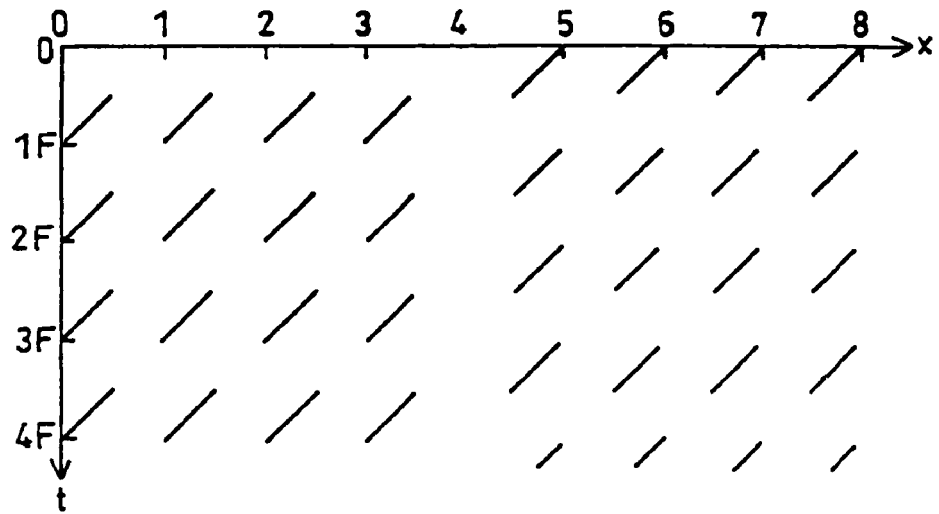
FIGS. 64(a) through 64(c) are explanatory views illustrating, in the case where pictures with the half-tone gray levels 127 and 128 are adjacently displayed and moved, how a dark line is generated at a boundary between the pictures with the different gray levels.
Figure 64B:
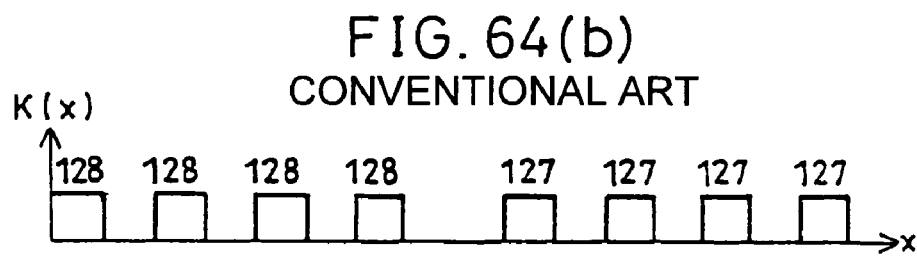
Figure 64C:
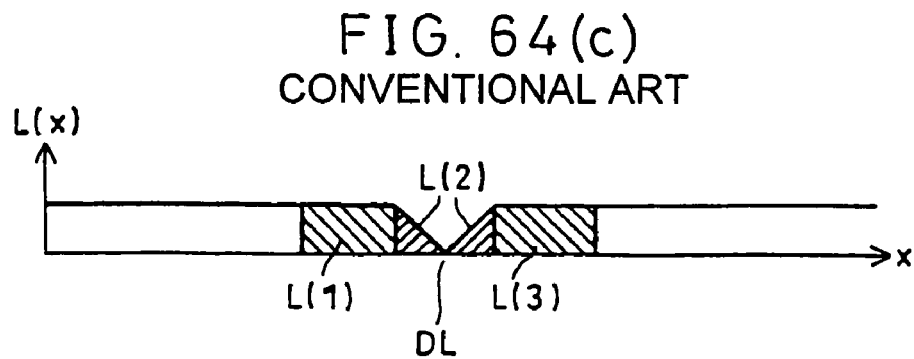
Figure 65A:
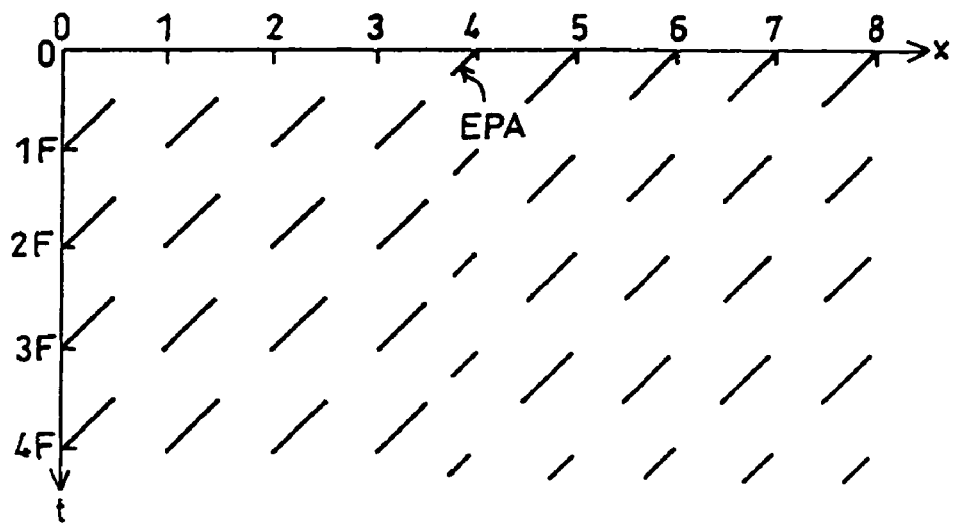
FIGS. 65(a) through 65(c) are explanatory views illustrating an effect in the case where an equivalent pulse is applied to correct the dark line shown in FIGS. 64(a) through 64(c).
Figure 65B:
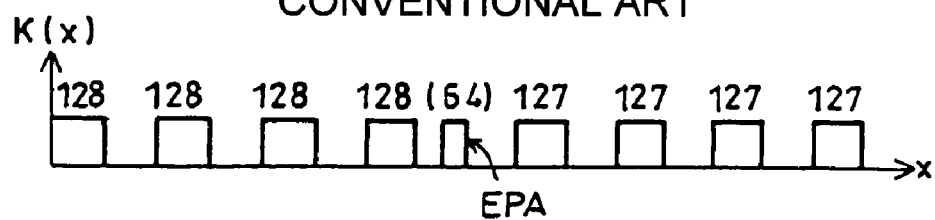
Figure 65C:
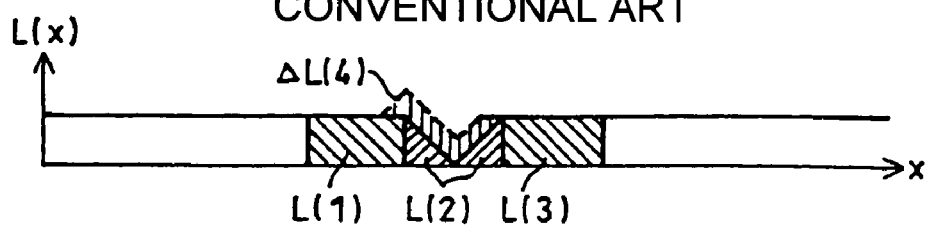

Incidentally, to realize 64 gray levels by the time division gray scale display method alone, 6 sub-field periods SF1 through SF6 are required, as obvious from FIG. 61. Thus, the time division gray scale display method in combination with the pixel division display method enables realization of a multiplicity of gray levels with a relatively small number of sub-fields.

Incidentally, as described in the BACKGROUND OF THE INVENTION section, the reason why there are provided two display periods with an emission ratio of 8, which are the second and the fourth, is as follows: interference of the motion picture pseudo contour can be suppressed by dividing a ratio at which a maximum-weight period becomes relatively long; and further, since a plurality of signal patterns (ON/OFF patterns) that output the same gray level value are generated by dividing the maximum-weight period, a signal pattern causing the pseudo contour interference to become smaller can be appropriately selected.

Concrete examples of the plurality of signal patterns are shown in FIGS. 5 through 7. Any one of these three signal patterns enables 64-level gray scale display by the time division gray scale display method in which a display period of one field is divided into four sub-fields at a time ratio of 1:8:4:8, in combination with the pixel division display method in which one pixel is divided into two sub-pixels at an area ratio of 2:1.

Looking at a gray level value 10, the signal patterns in FIGS. 5 to 7 are different to one another even with the same gray level value. Therefore, it follows that the driving sequence in this example case possesses three redundancies available as the signal patterns of the 64-level gray scale display. Accordingly the signal patterns shown in FIGS. 5 through 7 are hereinafter referred to as "first redundancy signal pattern 1", "first redundancy signal pattern 2", and "first redundancy signal pattern 3", respectively.

Figure 8:
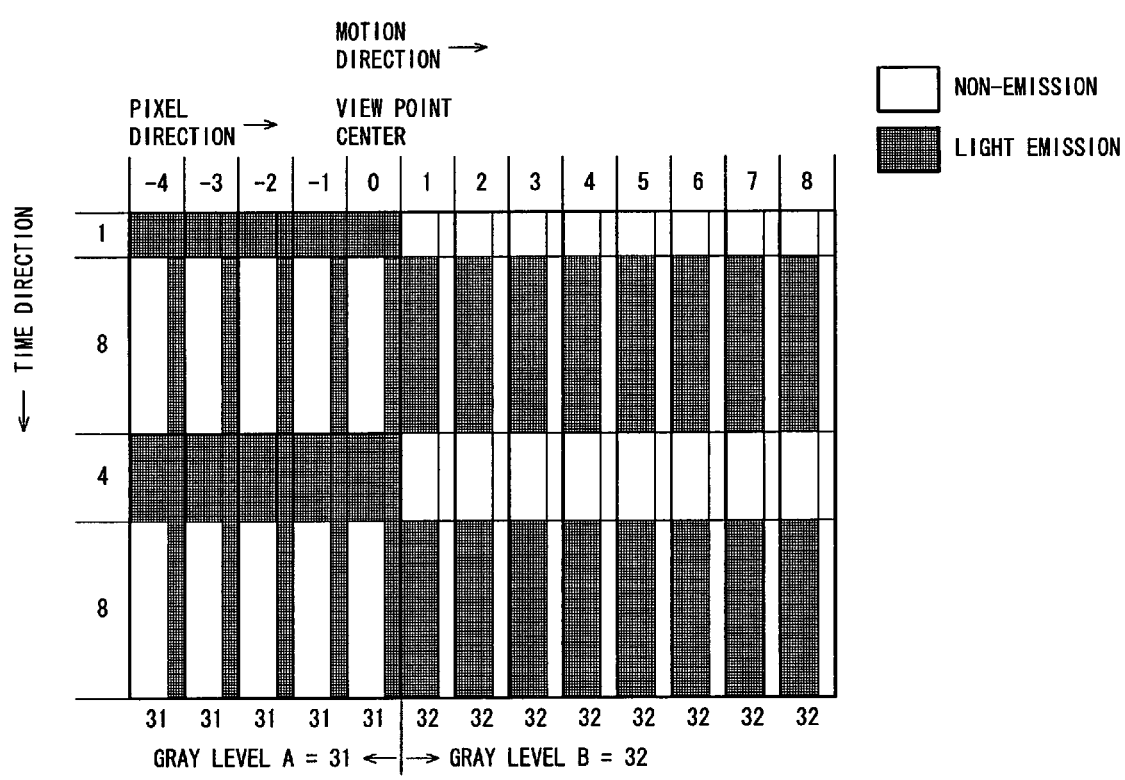
FIG. 8 is an explanatory view schematically illustrating an example of display timings for a step-like picture in which regions with different gray levels are adjoined.

As an example, FIG. 8 shows display timings in the case where a step-like picture which has a picture having the gray level value A=31 and a picture having the gray level value B=32 is displayed by applying the driving sequence according to the first redundancy signal pattern 1. The abscissa in FIG. 8 is a spatial axis with a position of a pixel at the view point center being 0: values −4 to 8 are indicative of positions of pixels adjacent to the view point center. The ordinate is a time-axis, indicating that display periods at a ratio of 1:8:4:8 are set in one field (=1/60 second). Note that addressing periods included the respective sub-fields are omitted in the figure, for conveniences' sake.

1.3 Motion Picture Pseudo Contour Simulation Result

Assume that, in FIG. 8, a picture with a gray level value A=31 moves in a horizontal direction from left to right of the display (i.e., in the positive direction of the spatial axis) at a rate of 2 pixels/field. Note that FIG. 8 illustrates, not display timings of RGB color display, but simplified display timings for monochrome display.

Figure 9:
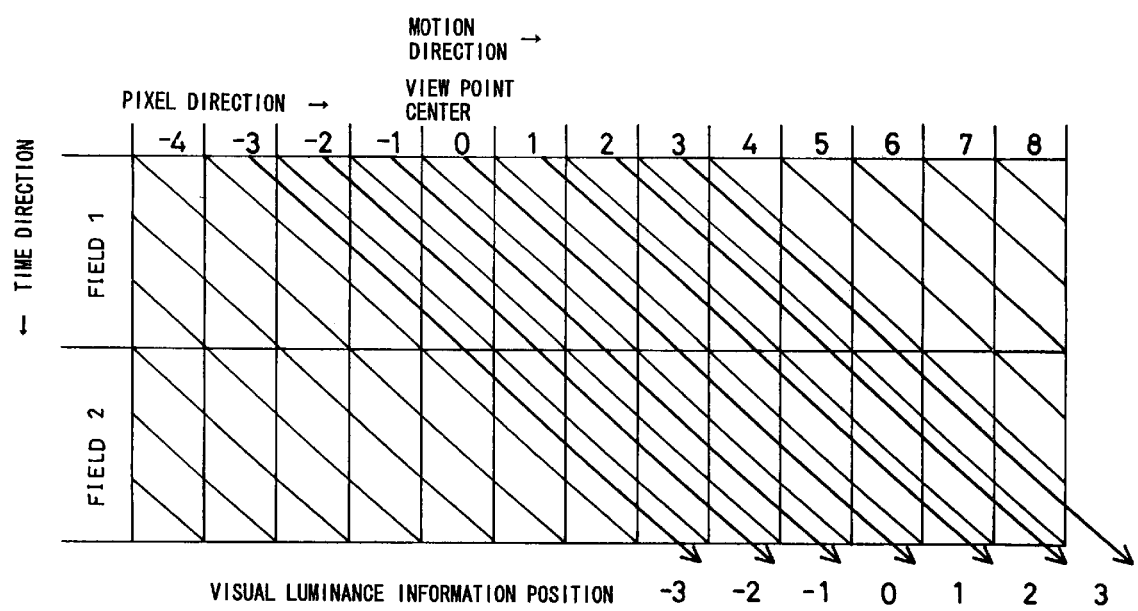
FIG. 9 is an explanatory view for explaining visual changes of luminance information in the case where the view point follows a motion of a picture.

Incidentally, as explained above, in the case of the time division gray scale display method, a motion picture pseudo contour is generated when the view point follows the picture that is moving. The visual information of the same can be approximately expressed as a product of a luminance of a display element in a display state in the time axis direction (time direction) and a luminance thereof in a display state in the spatial axis direction (pixel direction), as shown in FIG. 9.

Figure 10:
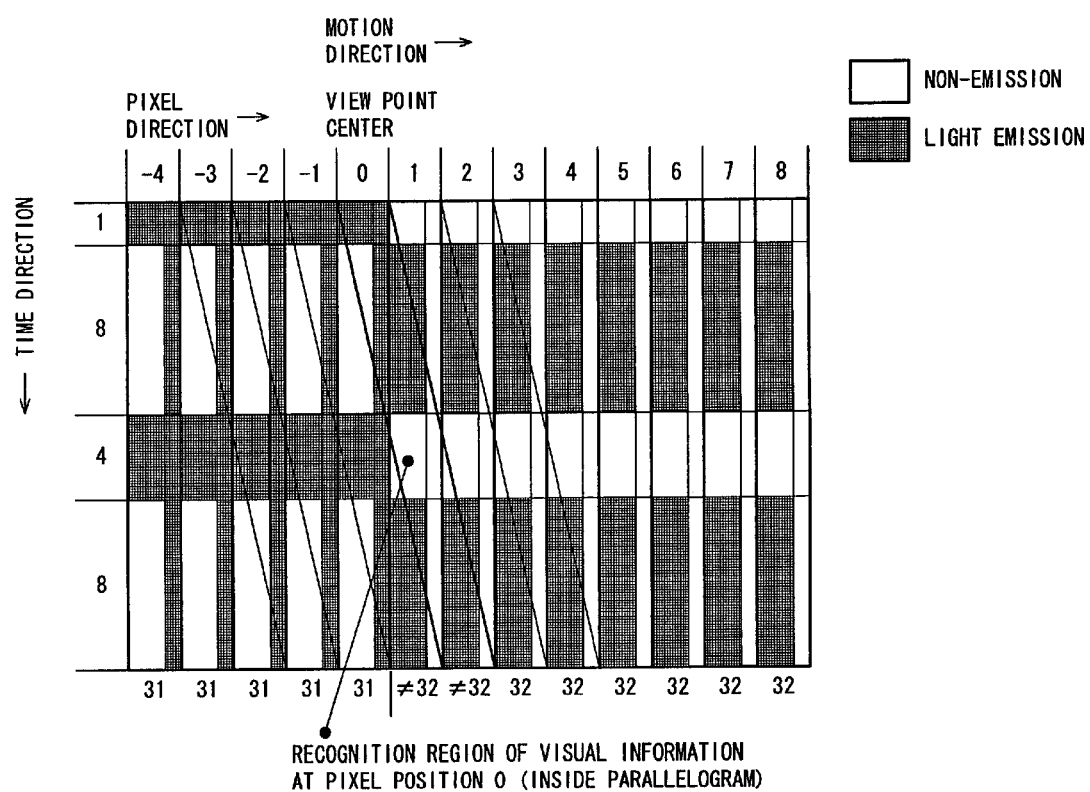
FIG. 10 is an explanatory view for explaining visual information in the vicinity of the view point center in the case where the step-like picture of FIG. 8 moves.

Applying this to FIG. 8, visual gray level information at a border between the pictures with the different gray levels in the step-like picture shown in FIG. 8 corresponds to an area of travel of the view point expressed as a parallelogram, as indicated by thick lines in FIG. 10. In an example shown in FIG. 10, a sum of areas of emission regions in the parallelogram at the pixel positions of 0 and −1 are different from a sum of areas of emission regions in the parallelogram at other pixel positions, thereby resulting that visual emission errors are recognized at the pixel positions of 0 and −1.

Figure 50:
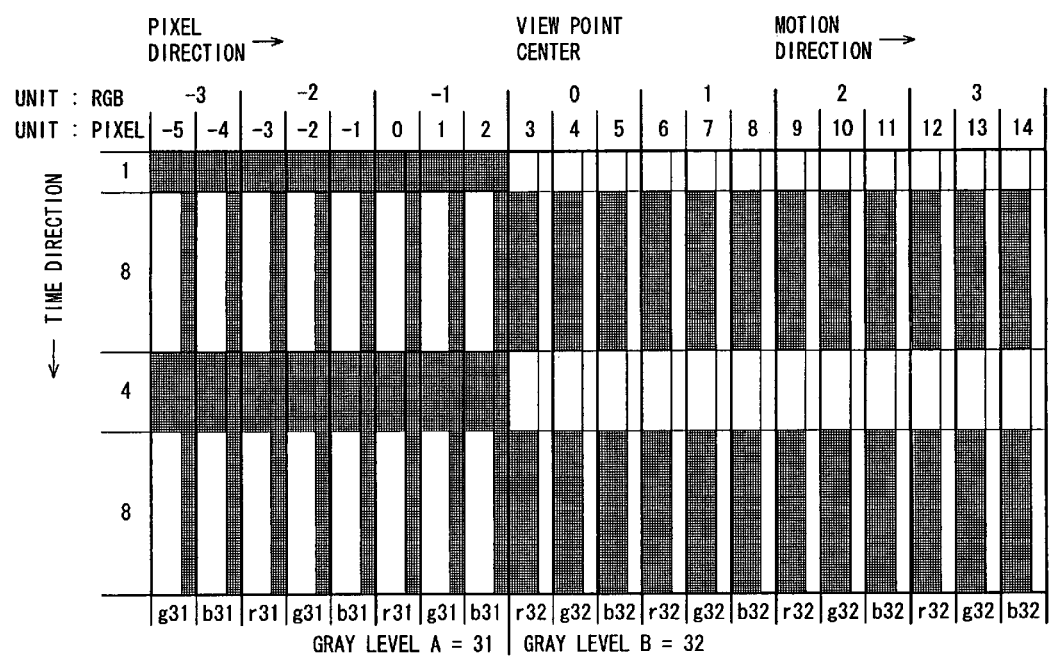
FIG. 50 is an explanatory view schematically illustrating display timings in RGB color display case corresponding to the case of FIG. 8.

On the other hand, the display timings in the case of the RGB color display, corresponding to FIG. 8, are shown in FIG. 50, and visual gray level information in the foregoing case, corresponding to FIG. 10, is shown in FIG. 51. In FIGS. 50 and 51, each pixel in FIG. 8 is developed into R, G, B pixels that are adjacent to each other.

Upon eye tracking, fog occurs to each of the R, G, B pixels independently, and there is no particular boundary for a set of R, G, B pixels from another set, though one set is treated as one unit spatially. Therefore, in the parallelogram shown in FIG. 51, an overlapped area of a B (blue) pixel is taken as a representative value, to actually calculate a motion picture pseudo contour generated upon eye tracking. In so doing, focusing each of the red, green, and blue colors, the same eye tracking weight is obtained in average.

The following description will explain a result of research about relationship between a manner of generation of a motion picture pseudo contour and a motion speed of a picture. A case was assumed as an example where the gray levels with values A=31 and B=32 are adjacently displayed, and a motion picture pseudo contour was simulated that was generated when the first redundancy signal pattern 1 was used and the horizontal motion speed was step-wisely varied in a range of −10 pixels/field to +10 pixels/field. Incidentally, if the horizontal motion speed has a negative value, it means that the picture is moved in the direction from the gray level value B=32 side to the gray level value A=31 side, that is, from right to left of the display.

Figure 11:
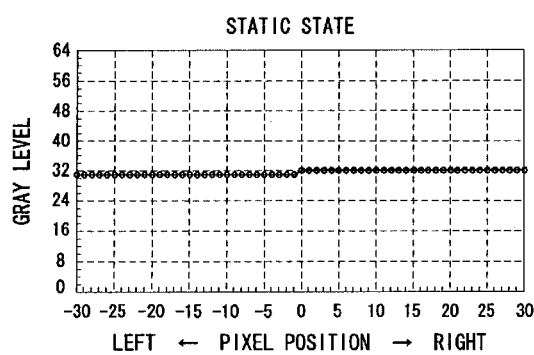
FIGS. 11(a) through 11(c) are graphs illustrating magnitudes and shapes of a motion picture pseudo contour produced when the step-like picture of FIG. 8 moves, depending on respective speeds of the motion of the picture.
Figure 11:
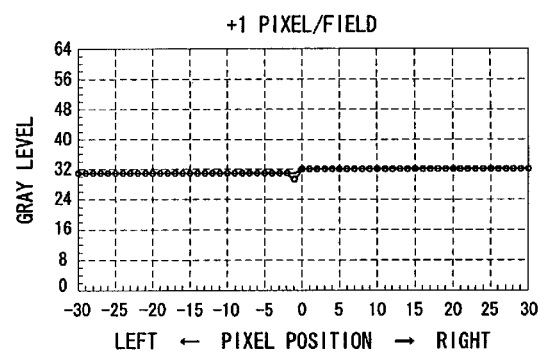
Figure 11:
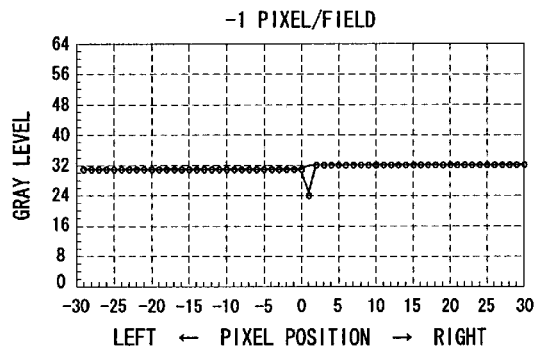
Figure 12A:
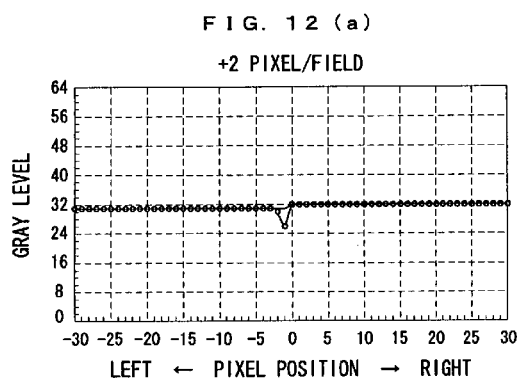
FIGS. 12(a) through 12(d) are graphs illustrating magnitudes and shapes of a motion picture pseudo contour produced when the step-like picture of FIG. 8 moves, depending on respective speeds of the motion of the picture that are different from those of FIGS. 11(a) through 11(c).
Figure 12B:
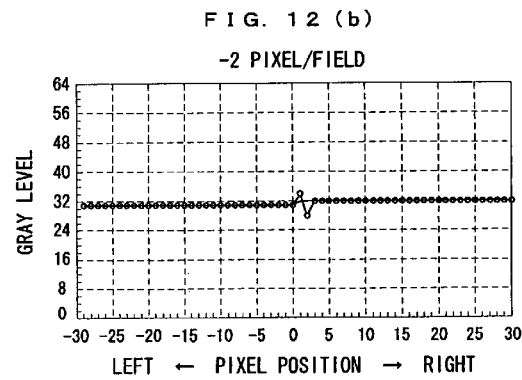
Figure 12C:
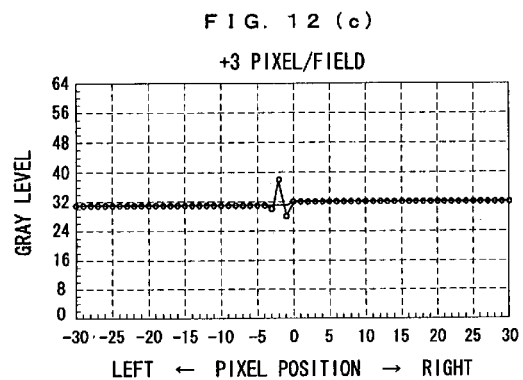
Figure 12D:
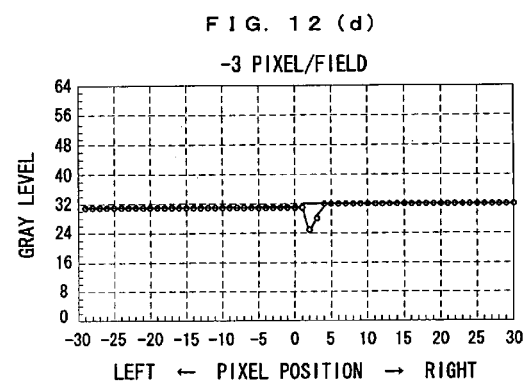

The result of the foregoing simulation is shown in FIGS. 11(*a*) through 11(*c*), 12(*a*) through 12(*d*), and 13(*a*) through 13(*d*).

As obvious from these figures, it was found that a greater luminance turbulence occurs as the motion speed became higher. A range of the turbulence, that is, a range of pixels undergoing the gray level turbulence due to the generation of the motion picture pseudo contour, corresponds to the number of pixels indicative of the motion speed (the number of pixels/field), and the motion picture pseudo contour generated has a width equivalent to the foregoing number of the pixels.

Furthermore, it was found that the foregoing phenomenon also emerges with a great luminance turbulence sometimes, with respect to not the combination of the gray level value A of a pixel with the gray level value B of a pixel adjacent to the foregoing pixel, but another combination (gray level shift).

Incidentally, the shape of the motion picture pseudo contour (luminance turbulence) varies depending on the signal pattern applied to a pixel. For example, in the case where a gray level with a value A=32 and a gray level with a value B=40 are adjacently displayed according to the first redundancy signal pattern 1, only an ON/OFF state of a sub-field period SF3 with a emission period ratio of "4" changes, while ON/OFF states of the other sub-field periods SF1, SF2, and SF4 do not change. In this case, when the picture is moved in a direction from the gray level value A=32 side to the gray level value B=40 side at a horizontal motion speed of +5 pixels/field, a step-like motion picture pseudo contour is produced as shown in FIG. 14(a), but it is relatively unremarked.

On the other hand, in the case where a gray level with a value A=28 and a gray level with a value B=36 are adjacently displayed according to the first redundancy signal pattern 1, ON/OFF states of sub-field periods SF2 and SF4 with a emission period ratio of "8" change. In this case, when the picture is moved at the same horizontal motion speed, a positive/negative spike-like motion picture pseudo contour is produced as shown in FIG. 14(b), and it is extremely remarkable.

Furthermore, in the case where simulation is conducted with use of the first redundancy signal pattern 2 in the same conditions as those in the case of FIGS. 14(a) and 14(b), motion picture pseudo contours as shown in FIGS. 15(a) and 15(b) are generated, respectively. As obvious from the results shown in FIGS. 14(b) and 15(b), in the case where the gray levels with values A=28 and B=36 are adjacently displayed and the horizontal motion speed is set to +5 pixels/field, the motion picture pseudo contour is less remarkable with use of the first redundancy signal pattern 2, than with use of the first redundancy signal pattern 1.

This is because, in the case where gray levels with values A=28 and B=36 are adjacently displayed according to the first redundancy signal pattern 2 shown in FIG. 6, only an ON/OFF state of a sub-field period SF3 with an emission period ratio of "4" changes, while ON/OFF states of the other sub-field periods SF1, SF2, and SF4 do not change.

Figure 16:
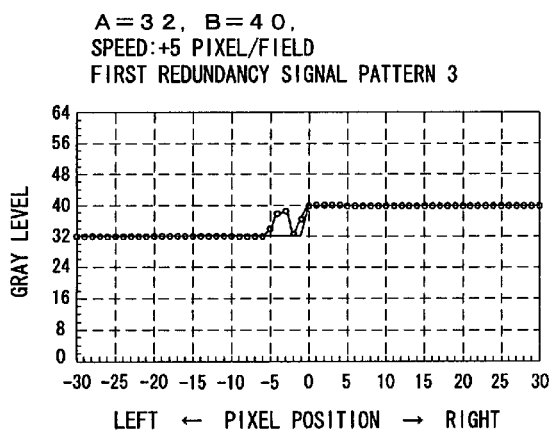
FIGS. 16(a) and 16(b) are still other graphs for explaining a gray level signal pattern used in a driving sequence, and differences in magnitudes and shapes between motion picture pseudo contours produced.
Figure 16:
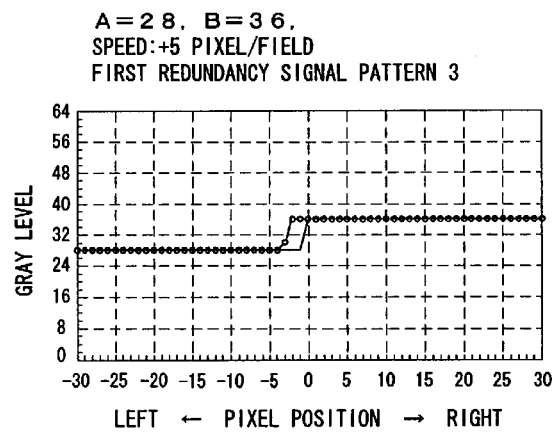

Furthermore, in the case where simulation is conducted with use of the first redundancy signal pattern 3 in the same conditions as those in the case of FIGS. 14(a) and 14(b), motion picture pseudo contours as shown in FIGS. 16(a) and 16(b) are generated, respectively. As obvious from the results shown in FIGS. 14(b) and 16(b), in the case where the gray levels with values A=28 and B=36 are adjacently displayed and the horizontal motion speed is set to +5 pixels/field, the motion picture pseudo contour is less remarkable with use of the first redundancy signal pattern 3, than with use of the first redundancy signal pattern 1.

This is because, in the case where gray levels with values A=28 and B=36 are adjacently displayed according to the first redundancy signal pattern 3 shown in FIG. 7, only an ON/OFF state of a sub-field period SF3 with an emission period ratio of "141" changes, while ON/OFF states of the other sub-field periods SF1, SF2, and SF4 do not change.

Thus, the following was found: as the redundancy signal pattern is altered, a size (magnitude) and a shape of the motion picture pseudo contour changes according to the magnitude of the gray level shift due to picture motion as well as according to the picture motion speed, and therefore, it is preferable that a redundancy signal pattern that makes a generated motion picture pseudo contour least remarkable should be appropriately selected according to the magnitude of the gray level shift due to picture motion and the motion speed. This is applied to derivation of computing formulae for finding a correction gray level signal that will be described later.

1.4 Concrete Method for Correcting Motion Picture Pseudo Contour

The following description will explain a method for correcting the motion picture pseudo contours.

Figure 17:
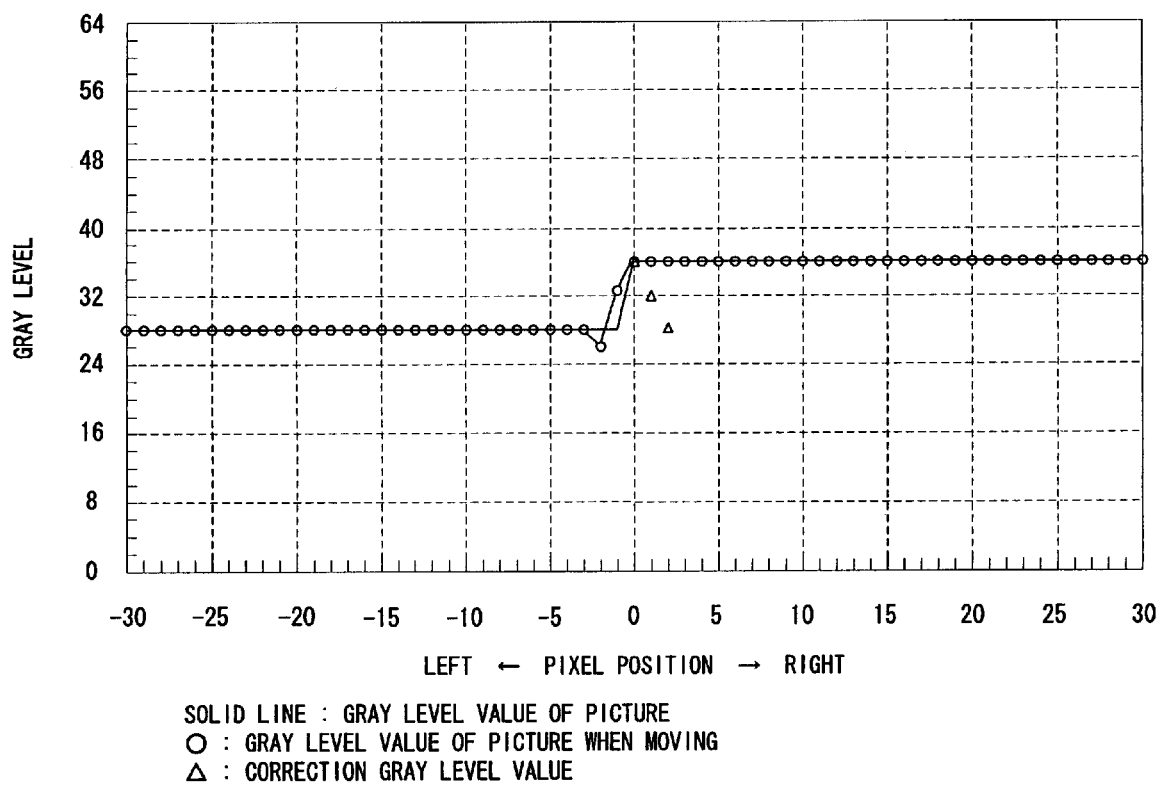
FIG. 17 is a graph illustrating gray levels of a correction gray level signal used with respect to the motion picture pseudo contour shown in FIG. 14(b), and a result of correction.

For example, to correct the motion picture pseudo contour shown in FIG. 14(b), a correction gray level signal that makes the motion picture pseudo contour unremarked, as the signal indicated with A shown in FIG. 17, may be appropriately selected out of the first redundancy signal patterns 1 through 3 and outputted beforehand to an original signal of a pixel that can be specified according to the motion speed.

More specifically, as shown in FIG. 17, assume that gray levels with values A=28 and B=36 are adjacently displayed according to the first redundancy signal pattern 1 and the picture is moved in a direction from the A=28 side to the B=36 side at a horizontal motion speed of +5 pixels/field. In this case, a signal with the gray level value B=36 of the first redundancy signal pattern 2 is applied as a correction gray level signal to an original signal of a pixel at a coordinate 0, that is, the first pixel that has the gray level value B=36, then, a signal with the gray level value B=36 of the first redundancy signal pattern 2 is applied as a correction gray level signal to an original signal of a pixel at a coordinate 1 that is adjacent to the foregoing pixel, and further, a signal with the gray level value B=28 of the first redundancy signal pattern 2 is applied as a correction gray level signal to an original signal of a pixel at a coordinate 2 that is adjacent to the foregoing pixel. Respective gray level values of these correction gray level signals and respective coordinates at which these correction gray level signals are outputted are indicated with marks A in the figure.

Thus, by applying a correction signal to original signals of pixels with the gray level value B that are arranged in a row next to the pixel with the gray level value A in the picture motion direction, the gray level turbulence of the motion picture pseudo contour outstanding in FIG. 14(b) becomes hardly remarkable in FIG. 17 where the gray level extremely approaches to a gray level of an original picture, as obvious when FIGS. 14(b) and 17 are compared with each other.

Here, the aforementioned redundancy signal pattern will be described. In the foregoing description the foregoing concrete example in which three redundancies are available as the signal patterns is explained, but the number of the redundancies is not limited to three. More specifically, among not less than four redundancy signal patterns, the first redundancy signal patterns 1 through 3 were selected according to certain references. In the selection, gray level shift causing a motion picture pseudo contour and shape of the motion picture pseudo contour are taken into consideration.

To be more specific, when the signal pattern changes, the gray level shift (combination of gray levels of a pixel and an adjacent pixel) that could generate a motion picture pseudo contour causing an intensive interference changes, as well as another motion picture pseudo contour with a different magnitude and/or in a different shape is generated, even with respect to the same gray level shift. Therefore, a redundancy signal pattern may be selected so that the gray level shift causing the motion picture pseudo contour, that is, the combination of gray levels before and after the motion of the picture should remain the same, and that the shape of the motion picture pseudo contour should change.

The following description will further explain how to select the correction gray level signal.

For example, in the case where the gray levels A=35 and B=40 are adjacently displayed according to the first redundancy signal pattern 1 and the picture is moved from the gray level A=35 side to the gray level B=40 side at a horizontal motion speed that is varied in a range from +1 to +15 pixels/field, as shown in FIG. 18, a signal corresponding to the gray level of 32 of the first redundancy signal pattern 1 is applied as the correction gray level signal to an original signal of a pixel specified (in this case, a pixel at which an offset occurs to the gray level turbulence) according to the motion speed. By so doing, the shape of the gray level turbulence due to the motion picture pseudo contour can be made to approach the shape of the gray level shift of the original picture, thereby resulting in that the motion picture pseudo contour can be made unnoticeable.

According to FIG. 18, it can be found that the correction gray level signal may be outputted to several pixels arranged in row in the same direction as the motion direction, the several pixels starting with the pixel having the gray level of B=40, that is next to the pixel with the gray level A=35 as the pixel at the starting point. Furthermore, as the motion speed is heightened, the number of pixels provided with the correction gray level signals may be increased.

More specifically, in the case where the motion speed is +5 pixels/field, a signal pattern for the pixel with the gray level value A=35 is determined according to the first redundancy signal pattern 1, and a signal pattern with the gray level value 32 of the first redundancy signal pattern 1 is outputted as the correction gray level signal to two pixels, one with the gray level value B=40 and the other one adjacent thereto in the motion direction, i.e., on the right side. Consequently, the motion picture pseudo contour can be eliminated. In the case of the motion speed is 0, this means that the picture is a static picture, to which no motion picture pseudo contour occurs, and therefore, a correction gray level signal need not be outputted. Furthermore, in the case where a correction gray level value to be outputted coincides with a gray level value before correction, the correction gray level signal need not be outputted, either.

However, as pixels whose original signals are to be fed with a correction gray level signal increase in number, the interference due to the gray level turbulence decreases, whereas effects of the original picture may possibly be greatly impaired. Furthermore, in the case where a correction gray level signal is outputted to an extremely smaller number of pixels than the number of pixels that require the correction gray level signal, it becomes impossible to reduce interference so that the interference should fall in a tolerable range.

Considering that the motion picture pseudo contour need not be completely eliminated in the case where the motion speed is higher than a certain level since generally to recognize details of a picture becomes difficult when the motion speed is high, it is adequate that the number of pixels whose original signals are fed with correction gray level signals should be 1 to 4. This results in achieving the following effect: as pixels to be fed with correction gray level signals decrease in number, circuitries associated with the same can be simplified.

Thus, when information about a gray level value A and a gray level value B of adjacent pixels and a motion speed of a picture (motion vector) according to the driving sequence is determined, a motion picture pseudo contour of a picture can be corrected with high precision in the case of any gray level shift.

1.5 Formularization of Correcting Formulae

The following description will explain these correction sequences.

In the example of the driving sequence in accordance with the present embodiment, the gray level shift, that is, the combination of gray levels varies in 64×64=4096 ways.

Therefore, if one output circuit is allocated to one gray level shift, the output circuits becomes enormous in number. Therefore, correction gray level signals similar to each other are preferably formularized or patternized, for more efficient generation of the correction gray level signals and simplification of the circuitry.

For example, in the case of a step-like gray level shift from a gray level value A=35 to a gray level value B=40 as shown in FIG. 18, a deviation of a gray level value of a correction gray level signal from a gray level value (B=40) of the first pixel fed with the correction gray level signal, that is, a pixel adjacent to a pixel set at the position of the origin is obtained, and the deviation is expressed as a parameter, as shown in FIG. 19. This is preferable since a more simplified formula can be obtained.

More specifically, as derived from FIG. 19, an n'th output variable $G(\Delta g, n)$ having as arguments a pixel distance n from the pixel with the gray level value A (in FIG. 19, A=35) as the origin and an output correction gray level deviation $\Delta g$ (shown to be −8(1) in FIG. 19) can be defined as follows:

$$G(\Delta g, n) = f(A, B, V_A) \quad (1)$$

where f is a function logically expressed with a gray level A of a focused pixel, a gray level B of a pixel adjacent to the focused pixel in a motion direction, and a motion speed $V_A$ of the focused pixel, as arguments.

Furthermore, a maximum number Nmax of pixels whose original signals are to be fed with the correction gray level signal can be expressed as:

$$Nmax = h(A, B, V_A) \quad (2)$$

Since the speed of the focused pixel and that of the adjacent pixel are substantially equal, the relationship of $V_A = V_B$ may be utilized.

The correction gray level signal outputted is converted according to the redundancy signal pattern series of the gray levels, and a gray level value Gn viewed from the origin position can be given as the following formula using the foregoing output variable $G(\Delta g, n)$:

$$Gn = B + G(\Delta g, n) \quad (3)$$

Relatively, it may be expressed as follows, referring to the gray level of the focused pixel:

$$Gn = A + G(\Delta g, n) \quad (4)$$

By the formularization as described above, 4096 gray level shifts can be roughly classified into two kinds, one for gray level shifts that do not require correction, and the other one for gray level shifts such that the correction gray level signal can be expressed with a simple logical formula.

Here, in the case where the gray level shifts requiring correction are further classified according to the logical formula of the correction gray level signal, or, to state differently, the correcting formula, the correcting formula can be made common according to the magnitude of the gray level shift. As a result, the number of the correction patterns actually provided is remarkably decreased, and therefore the circuitry can be more simplified.

Thus, by making the correcting formula common, the correction of the motion picture pseudo contour can be carried out with high precision.

Instead of embodying the correcting formula into circuitry, the following arrangement may be applied in the case where a memory medium used in an image display device has a sufficient memory capacity: without a computing circuit being used for determining a correction gray level signal, computation results derived from a predetermined correcting formula are stored in the memory medium beforehand, and any one among the computation results is outputted according to an input. Even in the case where the driving sequence is changed, such an arrangement enables correction pattern processing operations with respect to different driving sequences only by changing memory data according to a predetermined format, not requiring changes in circuitry.

Incidentally, the present embodiment is explained by taking the case of 64 gray levels as an example, but in the case where another driving sequence that differs in the number of gray levels from the foregoing case is made default, the simplification of the correction circuit and the reduction of interference of the motion picture pseudo contour can be achieved by carrying out the same as described above.

1.6 Concrete Examples of Correction Patterns

The following description will concretely explain formularization of the aforementioned correcting formula.

As described above, in the case where the first redundancy signal pattern 1 shown in FIG. 5 is applied to the driving sequence realized by combining the time division gray-scale display method that divides the display period of one field into four sub-fields at a time ratio of 1:8:4:8 and the pixel division display method that divides one pixel into two sub-pixels at an area ratio of 2:1, correction patterns obtained from combinations of gray levels of adjacent pixels within the same field or the same frame are expressed in the table form as shown in FIGS. 20 through 23.

Here, each of numerals on the ordinate of FIGS. 20 through 23 is indicative of the gray level value A of a focused pixel before a gray level shift upon motion of a picture, and each of numerals on the abscissa is indicative of a gray level value B of a pixel adjacent after the gray level shift upon the motion of the picture. The combinations between the gray level values A and B are 4096 throughout FIGS. 20 to 23.

Incidentally, for conveniences' sake, FIG. 20 illustrates correspondence of combinations of gray levels A=0 to 31 and B=0 to 31 to correction patterns. FIG. 21 illustrates correspondences of combinations of gray levels A=0 to 31 and B=32 to 63 to correction patterns. FIG. 22 illustrates correspondences of combinations of gray levels A=32 to 63 and B=0 to 31 to correction patterns. FIG. 23 illustrates correspondences of combinations of gray levels A=32 to 63 and B=32 to 63 to correction patterns.

Motion picture pseudo contour correction patterns with respect to gray level shifts from a gray level value A of a focused pixel to a gray level value B of a pixel adjacent to the focused pixel upon motion of a picture are classified into 18 types, that is, N, E(1), C(Jh), D(Jh), F(Jh), F(Jh)*, F(Jh)**, f(Jh), f(Jh)*, f(Jh)** (where Jh is an argument referring to a referential number of a redundancy signal pattern, that argument herein takes 2 or 3). Among these correction patterns, as shown in FIGS. 20 through 23, correction patterns that make the motion picture pseudo contour most unnoticeable and that can be made common regarding the magnitudes of the gray level shifts are selected according to the gray level shifts, respectively, in the first redundancy signal patterns 1 through 3, and are appropriately allotted.

Incidentally, logical formulae for selecting correction gray level signals from the redundancy patterns correspond to the correction patterns, respectively, as will be described later with reference to FIG. 24.

Here, the correction pattern N is a pattern for non-correction, and allotment of the correction pattern N to a gray level shift means that with such a gray level shift a motion picture pseudo contour does not occur at all or a motion picture pseudo contour generated is substantially hardly noticeable. Actually, FIGS. 20 through 23 show that the correction pattern N is allotted to, among the combinations of the gray level values A and B, the combinations causing no or small gray level shift, that is, those shown along diagonals of these figures.

Furthermore, the correction pattern E(1) is to correcting a motion picture pseudo contour with a small gray level turbulence, that is, a motion picture pseudo contour with a small visual emission error, and is allotted to the gray level shifts shown, in these figures, in the vicinity of those to which the correction pattern N is allotted. In the case of the correction pattern for correcting a motion picture pseudo contour for correcting a motion picture pseudo contour with a small visual emission error, however, the correction pattern E(1) may be replaced with the correction pattern N when the motion speed is low.

On the other hand, the correction patterns other than the correction patterns N and E(1), that is, those having the argument Jh, are allotted to gray level shifts that cause motion picture pseudo contour with great gray level turbulence, that is, motion picture pseudo contours with great visual emission errors.

Thus, only circuits for executing 17 logical operations for the correction patterns except for the correction pattern N are required to be provided with respect to the 4096 combinations of the gray level values A and B. This is one of the advantages of the present invention.

1.7 Concrete Method for Determining Correction Gray Level Signal

The following description will concretely explain how to actually determine the correction gray level signals according to FIGS. 20 through 24, while referring to FIG. 17.

In the example shown in FIG. 17, the gray levels with values A=28 and B=36 are adjacently displayed according to the first redundancy signal pattern 1 and the picture is moved in a direction from the A=28 side to the B=36 side at a horizontal motion speed of +5 pixels/field.

First of all, the shift from the gray level A to the gray level B (hereinafter referred to as gray level shift A-B) between the focused pixel and the adjacent pixel is a shift from the gray level with a value 28 to the gray level with a value 36 (hereinafter referred to as gray level shift 28–36), and referring to FIG. 21, the correction pattern allotted to the gray level shift 28–36 is f(2). Therefore, a computation operation according to a logical formula corresponding to f(Jh) that is shown in FIG. 24 is executed.

The logical operation begins with determination of the number of pixels whose original signals are to be fed with the correction gray level signals, according to the motion speed. This logical operation is executed according to the logical formula Nmax(V) shown in FIG. 24.

$M=|(B/4)-(A/4)|=|36/4-28/4|=2$ $K=|4(B/16)-(A/4)|=|4(36/16)-(28/4)|=1$ $J=M-K=1$

Incidentally, in the division calculation, an integer result is derived by dropping a fraction.

Subsequently, { } in the logical formula of Nmax(V) is a logical operation for determining True=1 or False=0 depending on whether the conditions described in { } are satisfied or not, respectively. In the present case in which J=1 and the motion speed V=5, the following is determined:

$$Nmax(6)=1+\text{True}+\text{False}+\text{True}+\text{False}=3$$

Therefore, the positions of the pixels whose original signals are to be fed with the correction gray level signals are n=1, 2, 3, and thus, it is determined that three pixels are to be corrected.

Subsequently, the correction gray level signals to be applied to the original signals of the pixels at the positions n are determined according to the logical formulae T and Gn.

$$T=(B-A)/|B-A|=(36-28)/|36-28|=1$$

$$G_1=B-4T[J-1-\{V=1\}]=36-4\cdot 1\cdot[1-1-\text{False}]=36$$

$$G_2=G_1-4T=36-4=32$$

$$G_3=G_2-4T=32-4=28$$

Next, the argument Jh to specify the redundancy signal pattern is determined. Since T=1 as described above, the following is derived:

$$Jh=1+\text{True}+2\cdot\text{False}=2$$

Consequently, a signal pattern of the first redundancy signal pattern 2 allotted to the gray level value 36 is applied as the correction gray level signal to an original signal of an adjacent pixel (n=1) with the gray level value B=36, a signal pattern of the first redundancy signal pattern 2 allotted to the gray level value 32 is applied as the correction gray level signal to an original signal of a pixel (n=2) with the gray level value B=36 that is further adjacent on the motion direction side to the foregoing adjacent pixel, and a signal pattern of the first redundancy signal pattern 2 allotted to the gray level value 28 is applied as the correction gray level signal to an original signal of a pixel (n=3) with the gray level value B=36 that is further adjacent on the motion direction side to the foregoing pixel.

The following description will explain another example in which a gray level with a value A=15 and a gray level with a value B=16 are adjacently displayed according to the first redundancy signal pattern 1 and the picture is moved in a direction from the A=15 side to the B=16 side at a horizontal motion speed of +6 pixels/field.

First of all, since the gray level shift A-B between a focused pixel and a pixel adjacent to the focused pixel is a gray level shift 15–16, the correction pattern allotted to the gray level shift 15–16 is C(2), according to FIG. 20. Therefore, a computing operation according to a logical formula corresponding to C(Jh) that is shown in FIG. 24 is executed.

The logical operation begins with determination of the number of pixels whose original signals are to be fed with the correction gray level signals, according to the motion speed. This logical operation is executed according to the logical formula Nmax(V) shown in FIG. 24.

$$M=|(B/4)-(A/4)|=|16/4-15/4|=1$$

$$K=|4(B/16)-(A/4)|=|4(16/16)-(15/4)|=1$$

$$J=M-K=0$$

Therefore, since J=0 and the motion speed V=6, the following is determined:

$$Nmax(6)=1+\text{True}+\text{False}+\text{True}+\text{False}=3$$

Therefore, the positions of the pixels whose original signals are to be fed with the correction gray level signals are n=1, 2, 3, and thus, it is determined that three pixels are to be corrected.

Subsequently, the correction gray level signals to be applied to the original signals of the pixels at the positions n are determined according to the logical formulae T and Gn.

$$T=(B-A)/|B-A|=(16-15)/|16-15|=1$$

$$G_1=16-4\cdot 1\cdot[1-2+0+2\cdot\text{False}+0]=20$$

$$G_2=G_1-4\cdot 1\cdot[2-0+\text{False}-\text{False}-\text{False}]=12$$

$$G_3=G_2-4\cdot 1=8$$

Here, the argument Jh is 2, as is in the foregoing example. Therefore, consequently, a signal pattern of the first redundancy signal pattern 2 allotted to the gray level value 20 is applied as the correction gray level signal to an original signal of an adjacent pixel with the gray level value B=16, a signal pattern of the first redundancy signal pattern 2 allotted to the gray level value 12 is applied as the correction gray level signal to an original signal of a pixel further adjacent on the motion direction side to the foregoing adjacent pixel, that is, a pixel at the second position from the focused pixel in the motion direction, and a signal pattern of the first redundancy signal pattern 2 allotted to the gray level value 8 is applied as the correction gray level signal to an original signal of a pixel at the third position from the focused pixel in the motion direction.

Incidentally, the logical formula Nmax(V) for determining the number of pixels whose original signals are to be fed with correction gray level signals is provided so that the maximum result is 4, that is, that the foregoing number of pixels to be corrected is in the range of 1 to 4. This is because, in the case of a natural picture, the picture per se is changed too much when many pixels are corrected, as described before. In other words, the number of pixels to be corrected increases as the motion speed of an image increases, but with a motion speed higher than a certain level, complete correction makes the picture rather unnatural in some cases.

The reason why the maximum of Nmax(V) is set to 4 is that it has been discovered that correction is required to be executed with respect to at least three pixels, irrespective of the motion speed, so as to make a motion picture pseudo contour unnoticeable, in the case of a gray level shift causing bipolar gray level turbulence that is most difficult to correct as shown in FIGS. 13(a) through 13(d). Therefore, by setting the number of pixels to be corrected to at most 4, that is, 3 as the number ensuring the least correction plus 1 to spare, it is possible to execute correction to make the motion picture pseudo contour unnoticeable without impairing effects of the original picture.

The correction method of the present invention, however, is not limited to the foregoing arrangement in which the maximum of Nmax(V) is 4, and the maximum of Nmax(V) may be raised to not less than 5 as the resolution of the display is enhanced.

Note that the aforementioned gray level shift causing the bipolar gray level turbulence is, for example, the gray level shifts 15–16, 31–32, 47–48, or the like, among the gray level shifts A-B.

Furthermore, apart from the bipolar gray level turbulence, there is also a gray level shift causing a gray level turbulence offsetted to either a positive polarity or a negative polarity, as shown in FIG. 14(a). In this case, as explained with reference to FIG. 18, correction may be executed with respect to at most four pixels, according to the motion speed, among the pixels undergoing the offset.

Second Embodiment

The following description will explain another embodiment of a motion picture pseudo contour correcting method in accordance with the present invention, while referring to FIGS. 25 through 34.

2.1 Driving Sequence

The following description will explain an embodiment of a driving sequence in which a time ratio for division of a display period of one field is changed to 8:4:1:8 while one pixel remains divided into two sub-pixels at an area ratio of 2:1.

In this case as well, second redundancy signal patterns 1 through 3 having three redundancies, respectively, can be produced as shown in FIGS. 25 through 27, as the signal patterns of the 64-level gray scale display.

Comparing the present case with the time division ratio of 8:4:1:8 with the case previously described with the time division ratio of 1:8:4:8, these two cases differ in the gray level turbulence, because of difference between their light emission centers.

More specifically, in the case of 1:8:4:8, since there is a time lapse separating the least significant bit (period ratio: 1) from the second least significant bit (period ratio: 4), a motion picture pseudo contour occurs in the case where a change in the signal pattern between the least significant bit and the second least significant bit is related to gray level shift. On the other hand, in the case of 8:4:1:8, the least significant bit (period ratio: 1) is adjacent to the second least significant bit (period ratio: 4) in terms of time, and therefore, a motion picture pseudo contour, smaller as compared with the case of 1:8:4:8, occurs in the case where a change in the signal pattern between the least significant bit to the second least significant bit is related to gray level shift.

In the first redundancy signal patterns 1 through 3 shown in FIGS. 5 through 7 and the second redundancy signal patterns 1 through 3 shown in FIGS. 25 through 27, both the signal pattern of the least significant bit (period ratio: 1) and the signal pattern of the second least significant bit (period ratio: 4) cyclically change in every four gray levels. Therefore, from the foregoing comparison result, the magnitude of the motion picture pseudo contour occurring with the cyclical change in every four gray levels becomes greater in the case of the time division ratio of 1:8:4:8 than in the case of 8:4:1:8. In other words, in the case of 1:8:4:8, the motion picture pseudo contour at every four gray levels is more remarkable than in the case of 8:4:1:8. This will be concretely explained later.

Incidentally, in the case where the change in the signal pattern between the most significant bit (period ratio: 8) and any one of less significant bits is related to gray level shift, there is substantially no remarkable difference between the driving sequences.

Figure 28:
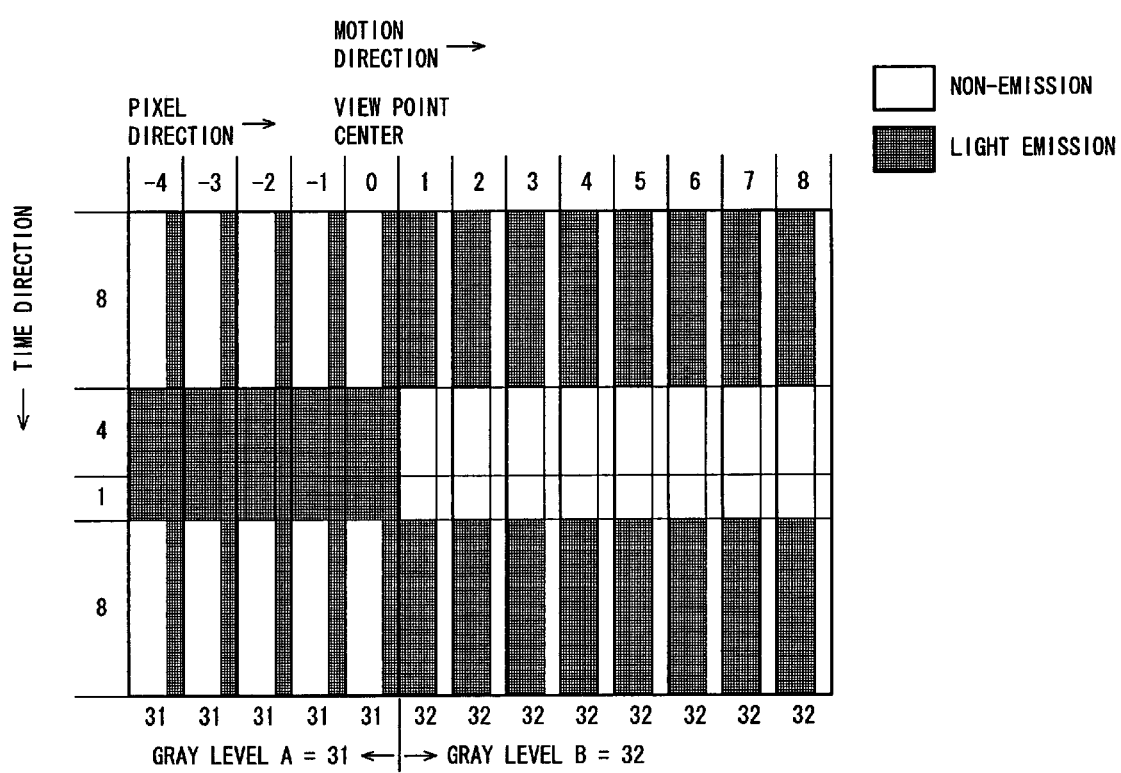
FIG. 28 is an explanatory view schematically illustrating another example of display timings for a step-like picture in which regions with different gray levels are adjoined.

Next, for instance, display timings in the case where a step-like picture having a picture with the gray level value A=31 and a picture with the gray level value B=32 is displayed by applying the driving sequence according to the second redundancy signal pattern 1 are shown in FIG. 28. The abscissa in FIG. 28 is a spatial axis with a position of a pixel at the view point center being 0: values −4 to 8 are indicative of positions of pixels adjacent to the view point center, on its left and right sides. The ordinate is a time axis, indicating that display periods at a ratio of 8:4:1:8 are set in one field (=1/60 second).

Incidentally, addressing periods included the respective sub-fields are omitted in the figure, for conveniences' sake.

Besides, FIG. 28 illustrates, not display timings of RGB color display, but simplified display timings for monochrome display.

FIG. 29 illustrates visual information in the vicinity of the view point center in the case where, for example, in FIG. 28, the picture with the gray level value A=31 is moved horizontally from the left side to the right side of the display (i.e., in the positive direction of the spatial axis) at a motion speed of 2 pixels/field. In this case, a parallelogram is indicative of a region of visual information at each pixel, and among the parallelograms, a sum of areas of emission regions in a parallelogram at the pixel position of −1 is particularly different from a sum of areas of emission regions at any other pixel position. Thus, it is found that visual emission errors are recognized at the pixel position of −1.

Incidentally, a sum of areas of emission regions at the view point center, that is, at the pixel position of 0, is not particularly different from a sum of areas of emission regions at any of the other pixel positions of not less than 1. Therefore, occurrence of visual emission errors at the pixel position of 0 decreases, as compared with the case shown in FIG. 10.

Figure 52:
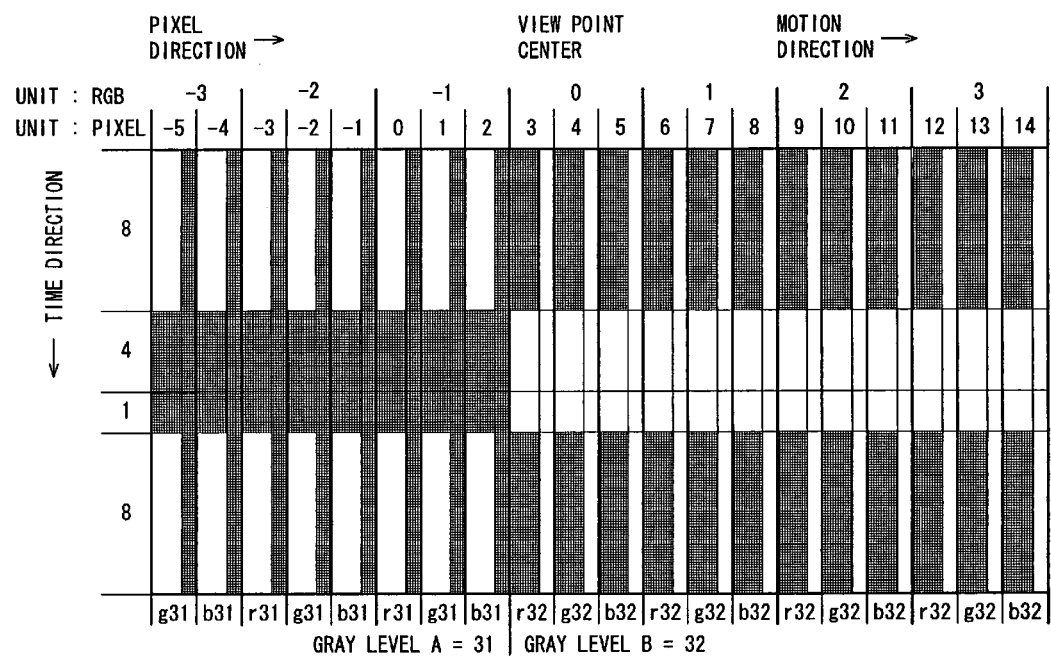
FIG. 52 is an explanatory view schematically illustrating display timings in RGB color display case corresponding to the case of FIG. 8, when a driving sequence adopting a time division ratio different from that of FIG. 50 is applied.
Figure 53:
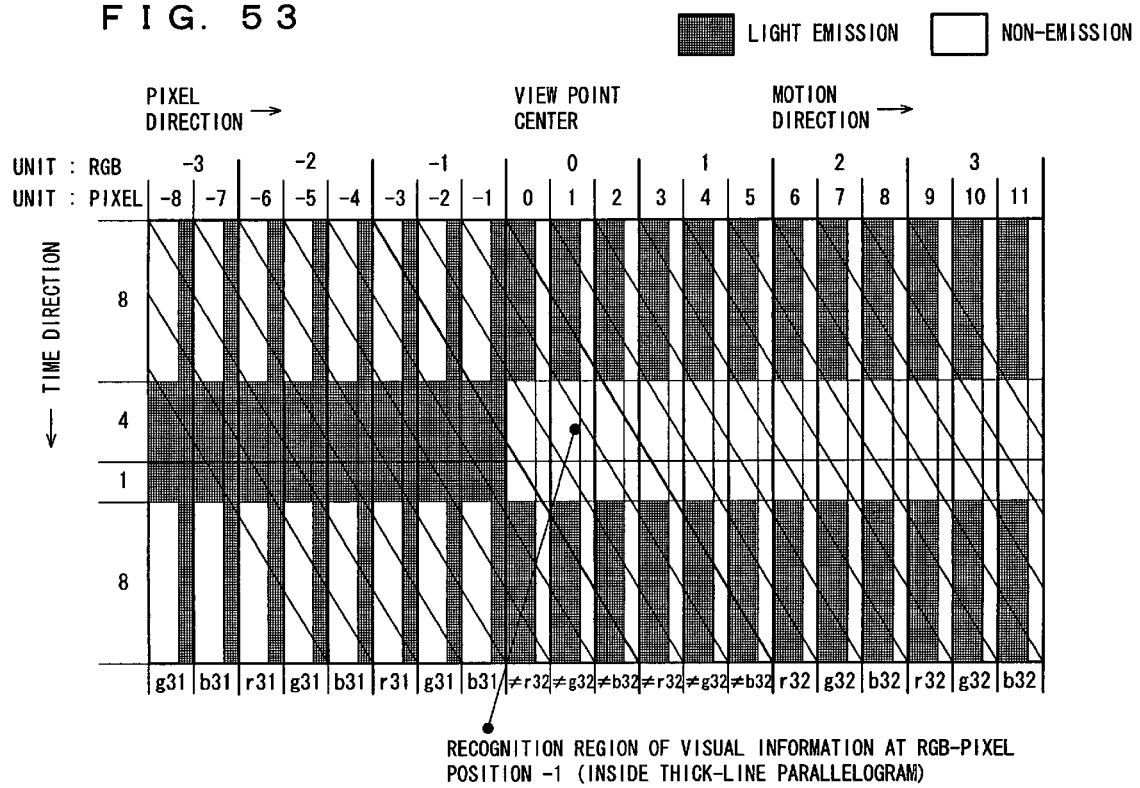
FIG. 53 is an explanatory view for explaining visual gray level information in the case of FIG. 52, the visual gray level information corresponding to that of FIG. 51.

On the other hand, the display timings in the case of the RGB color display, corresponding to FIG. 28, are shown in FIG. 52, and visual gray level information in the foregoing case, corresponding to FIG. 29, is shown in FIG. 53. In FIGS. 52 and 53, each pixel in FIG. 28 is developed into R, G, B pixels that are adjacent to each other. In this case as well, like in the explanation with reference to FIG. 10, an overlapped area of a B (blue) pixel among the parallelograms shown in FIG. 53 is taken as a representative value, to actually calculate a motion picture pseudo contour generated upon eye tracking.

2.2 Concrete Examples of Correction Patterns

The following description will explain concrete examples of correction patterns in accordance with the present embodiment.

In the case where the second redundancy signal pattern 1 shown in FIG. 25 is applied to the driving sequence realized by combining the time division gray-scale display method that divides the display period of one field into four sub-fields at a time ratio of 8:4:1:8 and the pixel division display method that divides one pixel into two sub-pixels at an area ratio of 2:1, correction patterns obtained from combinations of gray levels of adjacent pixels within the same field or the same frame are expressed in the table form as shown in FIGS. 30 through 33.

Here, each of numerals on the ordinate of FIGS. 30 through 33 is indicative of the gray level value A of a focused pixel before a gray level shift upon motion of a picture, and each of numerals on the abscissa is indicative of a gray level value B of a pixel adjacent after the gray level shift upon the motion of the picture. The combinations between the gray level values A and B are 4096 in number throughout FIGS. 30 to 33.

Incidentally, for conveniences' sake, FIG. 30 illustrates combinations between gray levels A=0 to 31 and B=0 to 31 and correction patterns. FIG. 31 illustrates combinations between gray levels A=0 to 31 and B=32 to 63 and correction patterns. FIG. 32 illustrates combinations between gray levels A=32 to 63 and B=0 to 31 and correction patterns. FIG. 33 illustrates combinations between gray levels A=32 to 63 and B=32 to 63 and correction patterns.

Motion picture pseudo contour correction patterns with respect to gray level shifts from a gray level value A of a focused pixel to a gray level value B of a pixel adjacent to the focused pixel upon motion of a picture are classified into 5 types, that is, N, C1, D1, $E_{jh}$, and $F_{Jh}$ (where Jh is an argument referring to a referential number of a redundancy signal pattern, that herein takes 2 or 3). Among these correction patterns, as shown in FIGS. 30 through 33, correction patterns that make the motion picture pseudo contour most unnoticeable and that can be made common regarding the magnitudes of the gray level shifts are selected according to the gray level shifts, respectively, in the first redundancy signal patterns 1 through 3, and are appropriately allotted.

Incidentally, logical formulae for correcting a motion picture pseudo contour correspond to the correction patterns, respectively, as will be described later with reference to FIG. 34.

Here, the correction pattern N is a pattern for non-correction, as is in the first embodiment. However, the classification types of the correction patterns of the present embodiment are considerably decreased as compared with the first embodiment, while the combinations of gray levels to which the correction pattern N is allotted are considerably increased as compared with the first embodiment. This is because, as described above, gray level turbulence occurring at every 4 gray levels among the 64 gray levels is originally less in the case of the method with the time division ratio of 8:4:1:8 as compared with the case of the method with the time division ratio of 1:8:4:8, and therefore, the tolerance for gray level turbulence can be relatively widened.

Furthermore, the correction patterns C1 and D1 are patterns for correcting motion picture pseudo contours with small gray level turbulence, that is, in other words, motion picture pseudo contours with less intensive visual emission errors. In the case of such correction patterns for correcting motion picture pseudo contours with less intensive visual emission errors, they may be replaced with the patterns N when the motion speed appears to be low.

On the other hand, the correction patterns other than the correction patterns N, C1, and D1, that is the correction patterns having the arguments Jh (except C1 and D1) are allotted to motion picture pseudo contours having great gray level turbulence, that is, in other words, gray level shifts causing motion picture pseudo contours with more intensive visual emission errors.

As described above, in the present embodiment, only circuits for executing 6 logical operations for the correction patterns except for the correction pattern N are required to be provided with respect to the 4096 combinations of the gray level values A and B. Therefore, the present embodiment is superior to the first embodiment in the aspects of simplification of the circuit arrangement, and improvement of calculation speed resulting from the simplification of the circuit arrangement.

2.3 Concrete Method for Determining Correction Gray Level Signals

The following description will concretely explain a method for determining actual correction gray level signals based on FIGS. 30 through 34.

An example is taken for explanation, in which a gray level with a value A=15 and a gray level with a value B=16 are adjacently displayed according to the second redundancy signal pattern 1 and the picture is moved in a direction from the A=15 side to the B=16 side at a horizontal motion speed of +6 pixels/field.

First of all, since the gray level shift A-B between a focused pixel and a pixel adjacent to the focused pixel is a gray level shift 15–16, the correction pattern allotted to the gray level shift 15–16 is F2, according to FIG. 30. Therefore, a computing operation according to a logical formula corresponding to $F_{jh}$ that is shown in FIG. 34 is executed.

The logical operation begins with determination of the number of pixels whose original signals are to be fed with the correction gray level signals, according to the motion speed. This logical operation is executed according to the logical formula Nmax(V) shown in FIG. 34. Since the motion speed V=6, the following is determined:

Nmax(6)=1+True+True+False=3

Therefore, the positions of the pixels whose original signals are to be fed with the correction gray level signals are n=1, 2, 3, and thus, it is determined that three pixels are to be corrected.

Subsequently, the correction gray level signals to be applied to the original signals of the pixels at the positions n are determined according to the logical formulae T and Gn.

$T=(B-A)/|B-A|=(16-15)/|16-15|=1$ $G_1=15-12\cdot1\cdot\text{False}+4\cdot1\text{False}+8\cdot1\cdot\text{True}=23$ $G_2=15-4\cdot1\cdot\text{False}=15$ $G_3=G_2=15$ Here, since the argument Jh is 2. Therefore, consequently, a signal pattern of the second redundancy signal pattern 2 allotted to the gray level value 23 is applied as the correction gray level signal to an original signal of an adjacent pixel with the gray level value B=16, a signal pattern of the second redundancy signal pattern 2 allotted to the gray level value 15 is applied as the correction gray level signal to an original signal of a pixel further adjacent on the motion direction side to the foregoing adjacent pixel, that is, a pixel at the second position from the focused pixel in the motion direction, and a signal pattern of the second redundancy signal pattern 2 allotted to the gray level value 15 is applied as the correction gray level signal to an original signal of a pixel at the third position from the focused pixel in the motion direction.

Third Embodiment

The following description will explain an embodiment of an image display device employing the motion picture pseudo contour in accordance with the present invention, while referring to FIGS. 35 through 37.

An image display device in accordance with the present embodiment is provided with a pseudo contour correcting formula classifier 10, a motion detecting section 20, and a correction gray level inserting unit 30, as principal components involved in correction of a motion picture pseudo contour, as shown in FIG. 35.

First of all, outlines of arrangements and functions of the foregoing components are described below, while detailed operations of the same will be described later.

The foregoing pseudo contour correcting formula classifier 10 holds table data that provide correspondences of gray level shifts to correction patterns as shown in FIGS. 20 through 23 and 30 through 33. In the table data, however, the correction patterns are classified as correcting formula groups, as shown in FIGS. 36 and 37. For instance, F(2) and F(3) shown in FIGS. 20 through 23 are uniformly expressed with a symbol F(Jh), while E2 and E3 shown in FIGS. 30 through 33 are uniformly expressed with a symbol $E_{Jh}$. Therefore, regarding each focused pixel, the pseudo contour correcting formula classifier 10 checks a gray level shift occurring between a focused pixel and a pixel adjacent to the focused pixel in the same frame or field of the original signal Po of the picture, and detects the gray level shift as gray level information regarding each pixel. In other words, the pseudo contour correcting formula classifier 10 functions as a gray level information detector. Furthermore, the pseudo contour correcting formula classifier 10 also selects a correcting formula group necessary with respect to a detected gray level shift.

More specifically, the pseudo contour correcting formula classifier 10 is supplied with an original signal Po of a picture directly or through a low-pass filter (LPF) 11. The pseudo contour correcting formula classifier 10 converts the selected correcting formula group to any one of the numerals 0 through 9 according to correspondence therebetween as shown in FIGS. 36 and 37, and supplies the same as a correcting formula classification value Pe to the correction gray level inserting unit 30, while supplying the detected gray shift as gray level information to the correction gray level inserting unit 30.

On the other hand, a motion detecting section 20 compares picture data of successive frames, and detects a motion vector indicative of a motion speed of a picture (direction and speed), that is, motion information, regarding each pixel. Therefore, the motion detecting section 20 functions as a motion information detecting section.

More concretely, the motion detecting section 20 is fed with an original signal Po of a picture directly or through a low-pass filter 21, while it is also fed with a picture signal Pp of a previous frame that has been temporarily stored in a frame memory 22. The motion detecting section 20 supplies a motion vector V detected as to each pixel to the correction gray level inserting unit 30.

Furthermore, the correction gray level inserting unit 30 (correction-use signal generating section) is provided with (i) a correction value computing circuit 31 (computing section) that executes calculation according to the logical formula corresponding to a correction pattern shown in FIG. 24 or 34, with respect to the gray level shift, the correcting formula classification value Pe, the motion vector V, and the original signal Po that are inputted to the correction value computing circuit 31, so as to output a correction gray level signal Pc, (ii) an inserting circuit 32 (signal inserting section, signal inserting means) that synthesizes the original signal Po and the correction gray level signal Pc.

Incidentally, the correction gray level inserting unit 30 is arranged so as to, upon the calculation executed by the correction value computing circuit 31, causes the correction value computing circuit 31 to execute computation regarding only pixels adjacent to each other on the motion vector V, based on the gray level shift and the motion vector V that have been inputted.

In the foregoing arrangement, the pseudo contour correcting formula classifier 10 obtains a gray level value A of a focused pixel and gray level values B of at most 8 pixels adjacent to the focused pixels in the same frame or field as that for the inputted original signal Po, and searched through the aforementioned table data, to select at most 8 correcting formula groups allotted to the gray level shifts A-B, regarding the focused pixel. Subsequently, the pseudo contour correcting formula classifier 10 converts the selected correcting formula groups to any of 0 through 9, respectively, according to the correspondence shown in FIG. 36 or 37, and then, outputs the converted results, as the correcting formula classification values Pe, to the correction gray level inserting unit 30 as to each pixel.

Thus, as to every pixel in the same frame or field as that for the original signal Po, the correction gray level inserting unit 30 obtains the gray level shifts A-B and the correcting formula classification values Pe from the pseudo contour correcting formula classifier 10.

Incidentally, the low-pass filter 11 is provided so as to enhance precision in selection of correcting formula groups by the pseudo contour correcting formula classifier 10. Therefore, with no problem regarding precision, the low-pass filter 11 may be omitted.

On the other hand, the motion detecting section 20 compares a pixel signal Pp of the previous frame that has been delayed by the frame memory 22 and the original Po, and detects a direction and a speed (pixel/field) in which and at which each pixel moves, so as to obtain a motion vector V of each pixel, that is supplied to the correction gray level inserting unit 30. The detection of the motion vector V is executed by, for example, the block matching method, in which a picture is varied by a pixel motion quantity, that is, a horizontal pixel motion quantity and a vertical pixel motion quantity, in each block region comprising a plurality of pixels.

Incidentally, signals inputted to the motion detecting section 20 are not limited to the foregoing form. Further, as a motion vector detection method, any known method such as the grading method, the phase correlation method, etc. may be suitably adopted. The motion detecting section 20 is provided with a structure that determines a motion vector of a picture that is characterized or symbolized and stored in a recording medium, or a motion vector of a motion picture utilizing data.

The low-pass filter 21 is provided so as to enhance precision in detection of a motion vector V by the motion detecting section 20. Therefore, with no problem regarding precision, the low-pass filter 21 may be omitted.

Next, the correction gray level inserting unit 30 specifies a pixel adjacent to a focused pixel in the motion vector V direction, based on the obtained gray level shift A-B and the motion vectors V, selects a correcting formula classification value Pe corresponding to the specified adjacent pixel, and causes the correction value computing circuit 31 to execute a computing operation according to the correcting formula group formularized as shown n FIG. 24 or 34, regarding the selected correcting formula classification value Pe.

Regarding each pixel, the correction value computing circuit 31 generates a correction gray level signal Pc that is capable of correction with respect to at most four pixels in row from a pixel adjacent to a focused pixel, according to the gray level shift from the focused pixel to the foregoing adjacent pixel, and a motion speed. Then, it supplies the signal to the inserting circuit 32.

The inserting circuit 32 obtains a corrected gray level signal Pf by overwriting the correction gray level signal Pc on the original signal Po, and outputs the same as a display field signal or display frame signal. By arranging such a system, it is possible to correct a motion picture pseudo contour with high precision.

As a concrete arrangement of the correction value computing circuit 31, logical circuit groups for generating a correction gray level signal Pc may be provided so as to correspond to the correcting formula classification values Pe, respectively, or in other words, the magnitudes and/or shapes of the motion picture pseudo contours.

Furthermore, the pseudo contour correcting formula classifier 10 is arranged so that correction formula classification values Pe for at most 8 adjacent pixels are determined as to each focused pixel, but it may be arranged in a different manner: for example, it may be arranged so that a motion vector V is previously supplied from the motion detecting section 20 to the pseudo contour correcting formula classifier 10, a gray level shift A-B from the focused pixel to an adjacent pixel in the motion vector V direction is detected, and thereafter only a correcting formula classification value Pe corresponding to the foregoing gray level shift A-B is obtained. In this case, the pseudo contour correcting formula classifier 10 functions as motion picture pseudo contour classifying means that detects a magnitude and/or a shape of a motion picture pseudo contour occurring to the focused pixel, and outputs a correcting formula classification value Pe as recognition information of the magnitude and/or the shape.

Such an arrangement can make a total amount of calculation smaller. Moreover, regarding a pixel whose motion vector V is 0, 0 may be outputted as the correcting formula classification value Pe. Therefore, the computing operation by the pseudo contour correcting formula classifier 10 becomes unnecessary.

The motion vector V is however unnecessary for the selection itself of a correcting formula group by the pseudo contour correction formula classifier 10. Therefore, in the arrangement shown in FIG. 38 in which the motion vector V is not fed to the pseudo contour correcting formula classifier 10, the function of selecting the correcting formula group and the function of calculating the motion vector V can be independently carried out, and they can be more easily formed into modules, in circuit arrangement.

Furthermore, in the foregoing descriptions, the pseudo contour correcting formula classifier 10 and the motion detecting section 20 are arranged so as to determine a correcting formula classification value Pe and a motion vector V regarding each pixel in each frame or field, but the arrangement is not limited to this. It may be arranged so as to output the same result, omitting the computing operation, in the case where there is no difference between frames or fields.

Fourth Embodiment

Figure 38:
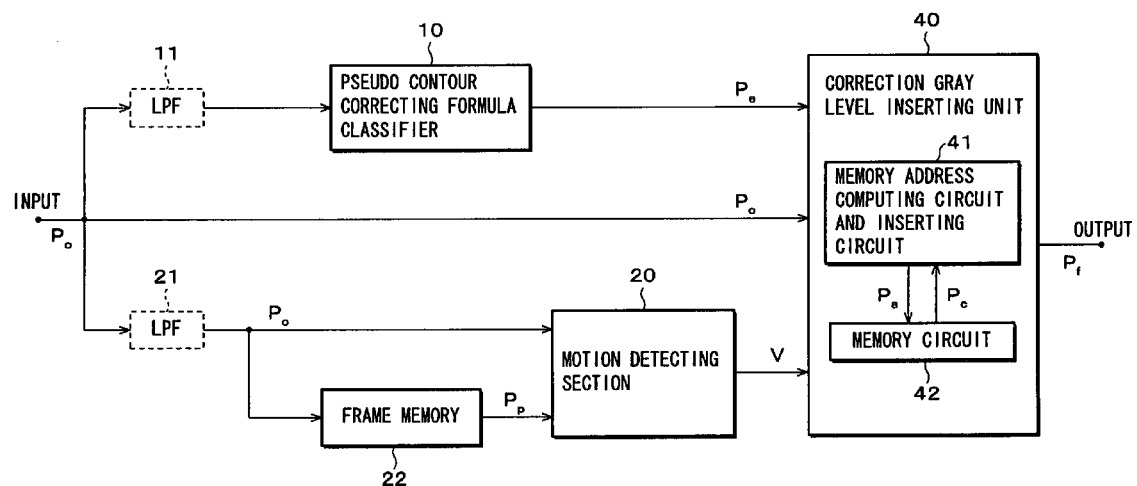
FIG. 38 is a block diagram illustrating an arrangement of another image display device executing the motion picture pseudo contour correcting method in accordance with the present invention.

The following description will explain another embodiment of an image display device utilizing the motion picture pseudo contour correcting method in accordance with the present invention, while referring to FIG. 38. Note that the members having the same structure (function) as those in the third embodiment will be designated by the same reference numerals and their description will be omitted.

An image display device in accordance with the present embodiment is different from that of the third embodiment, in the arrangement of a correction gray level inserting unit 40, as clear from comparison between FIGS. 35 and 38.

More specifically, the correction gray level inserting unit 40 is provided with a memory circuit (memory section, memory medium) 42 in that results of computations executed by the correction value computing circuit 31 are previously stored, and a memory address computing circuit and inserting circuit (signal inserting section, signal inserting means) 41 that has a function of calculating an address for recalling a desired computation result from the memory circuit 42 in addition to the same function as that of the aforementioned inserting circuit 32.

Therefore, the memory circuit 42 previously stores results of computations, based on the gray level shift and the motion speed, according to logical formulae of a correcting formula group that are formularized according to the magnitudes and/or the shapes of motion picture pseudo contours, respectively; i.e., correction gray level values.

As to a structure of data of the correction gray level values in the memory circuit 42, any one of various forms can be selected, for example:

(1) a block-type data structure in which correction gray level values are grouped according to the magnitude and/or shape of a motion picture pseudo contour that is determined by a gray level shift and a motion speed of a picture; each block includes correction gray level values obtained according to the gray level shift and the motion speed, and (2) a block-type data structure in which correction gray level values are grouped according to the magnitude and/or shape of a motion picture pseudo contour that is determined by a gray level shift; each block includes correction gray level values obtained according to the motion speed.

In the foregoing arrangement, based on a gray level shift, a correction formula classification value Pe, and a motion vector V obtained from the pseudo contour correcting formula classifier 10, the correction gray level inserting unit 40 specifies a pixel adjacent to a focused pixel in the motion vector V direction, and selects a correcting formula classification value Pe corresponding to the specified adjacent pixel. Subsequently, the correction gray level inserting section 40 causes the memory address computing circuit and inserting circuit 41 to execute computation to determine an address Pa for designating a magnitude of a gray level shift and a motion speed, regarding the selected correcting formula classification value Pe.

The memory address computing circuit and inserting circuit 41 feeds the obtained address Pa to the memory circuit 42, then obtains, from the memory circuit 42, a correction gray level signal Pc that can correct at most 4 pixels in row from the adjacent pixel to the focused pixel. Further, the memory address computing circuit and inserting circuit 41 obtains a corrected gray level signal Pf by overwriting the correction gray level signal Pc on the original signal Po, and outputs the same as a display field signal or display frame signal.

By arranging such a system, only computation for obtaining an address on the memory circuit is executed in the calculating process. Therefore, as compared with the third embodiment, a complicated computing circuit for obtaining a corrected gray level signal Pf is unnecessary, and a corrected gray level signal Pf can be outputted more quickly from the correction gray level inserting unit 40. Further, a change to the driving sequence only entails a process for changing the memory data in accordance with a predetermined format, and a motion picture pseudo contour correcting process can be executed by a different driving sequence, without changing the circuitry.

Here again, the low-pass filters 11 and 21 respectively provided before the pseudo contour correcting formula classifier 10 and the motion detecting section 20 are intended to enhance precision in selection of correcting formula groups and precision in motion detection, respectively. Therefore, they may be omitted in the case where there is not a particular problem in precision.

Incidentally, the foregoing memory circuit 42 may be incorporated in the correction gray level inserting unit 40, or it may be a portable memory medium that is attached from outside to the image display device. The memory circuit 42 may be read-only, or may be overwritable at any time.

Furthermore, needless to say, the foregoing descriptions of embodiments have meaning not in independence thereof, but appropriate ones of their methods and structures may be freely combined, so as to achieve the object of the present invention to the maximum extent.

EXAMPLES

Example 1

First of all, the following description will explain an example of correction with respect to a motion picture pseudo contour that occurred in the case where a half-tone was displayed in the following arrangement: in addition to the arrangement in accordance with the third or fourth embodiment, an image display device having an image display panel whose each pixel was divided at an area ratio of 2:1 was used, and the pixel division display method and the time division display method that divides one field into sub-fields at a time ratio of 1:8:4:8 were adopted in combination.

As the redundancy signal pattern, the first redundancy signal pattern shown in FIGS. 5 through 7 was employed, and hence, a correction gray level signal Pc was obtained according to the correction patterns in FIGS. 20 through 24 and the logical formulae corresponding thereto.

Figure 39:
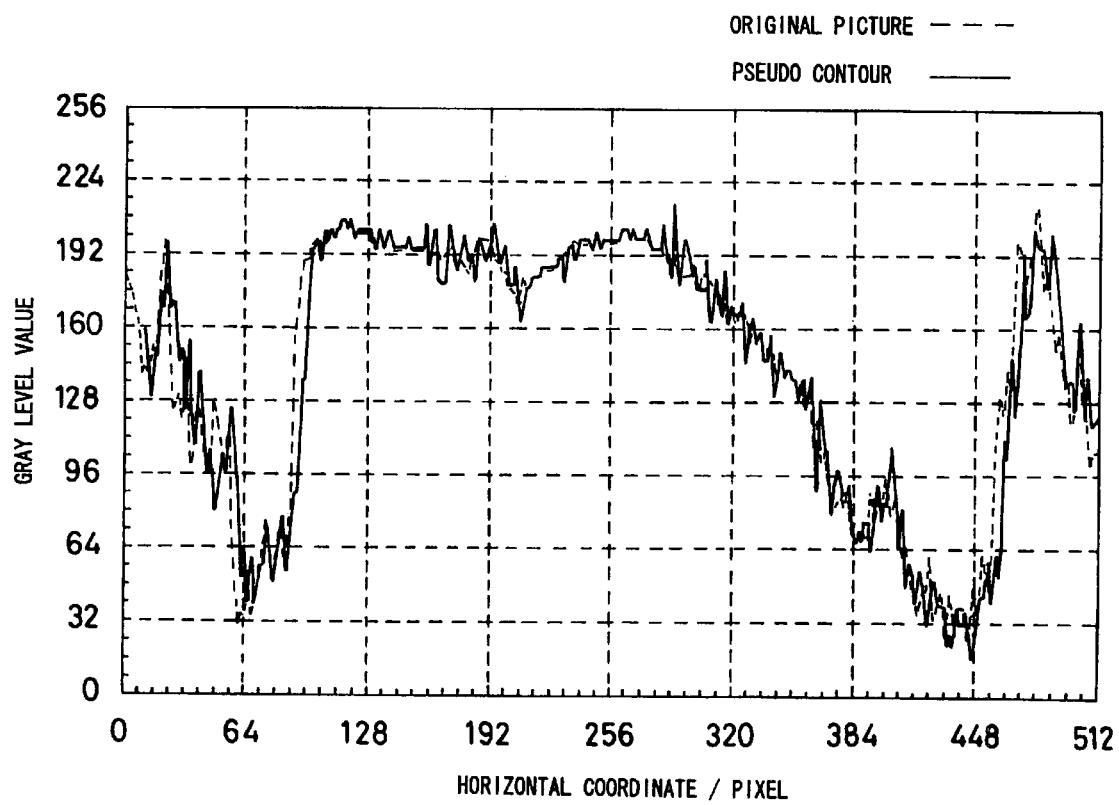
FIG. 39 is a graph showing gray level values as a result of correction with respect to one line of a picture of a common human face in the case where the picture is moved from right to left on the display screen, the graph also showing gray level values of an original picture and those of a motion picture pseudo contour.

As a concrete picture, a picture of a common human face was actually moved from right to left on the display screen at a horizontal speed of −11 pixels/field. A result of correction with respect to one line of the picture in this case is shown in FIG. 39. In the figure, a broken line indicates a gray level value of an original picture (original signal Po) at a pixel position (0 to 512), while a solid line indicates a gray level value of the corrected motion picture, that is, the gray level value of a corrected gray level signal Pf.

Incidentally, in the original picture, data for 24-bit color display (256 gray levels for red×256 gray levels for green×256 gray levels for blue) were used, and a computing process was applied to the motion picture pseudo contour after data of the original picture were converted into 64-gray-level expression. To convert the original picture data into 64-gray-level expression, the least and second least significant bits of the 8-bit data of each of R, G, and B may be made 0 so as to be masked. This results in that a gray level value 128 of the 256 gray levels is made to correspond to a gray level value 36 of the 64 gray levels, while a gray level width 1 among the 64 gray levels is made to correspond to a gray level width 4 among the 256 gray levels.

As described above, to more easily understand comparison between a corrected gray level signal Pf for a motion picture pseudo contour processed in a state of 64 gray levels and a original signal for 256-gray-level display, the foregoing two signals are shown in FIG. 39.

Figure 40:
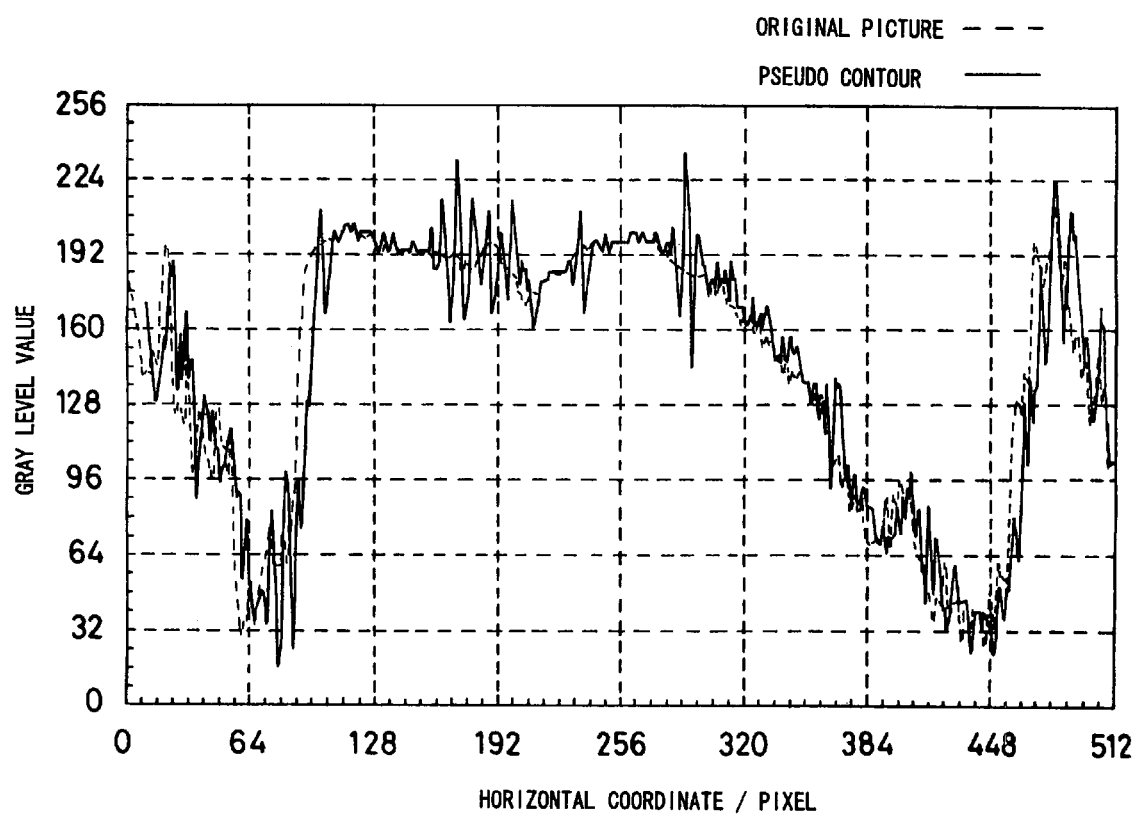
FIG. 40 is a graph, for comparison with the correction result shown in FIG. 39, showing gray level values of one line of the same picture as above in the case where the picture is moved in the same manner as above without correction of a motion picture pseudo contour, the graph also showing gray level values of the original picture and those of the motion-picture pseudo contour.

On the other hand, to be compared with the result of correction shown in FIG. 39, gray level values of one line of the same picture as above in the case where only the first redundancy signal pattern 1 was used, the picture was moved at the same motion speed, and correction of a motion picture pseudo contour was not executed are shown in FIG. 40, with a broken line indicating an original picture and a solid line indicating a motion picture pseudo contour. Note that the foregoing pseudo contour picture should be more correctly expressed as "eye tracking picture", and the pseudo contour indicates "portions of errors per se having peaks that do not appear in an original picture and therefore should not exist". Here, however, to discuss whether or not the motion picture pseudo contour is suppressed by comparing FIGS. 39 and 40, the picture in the case of FIG. 40 is referred to as "pseudo contour picture".

Comparing FIGS. 39 and 40, it can be seen that in FIG. 40, a motion picture pseudo contour having gray levels remarkably deviated from gray levels of the original picture indicated with the broken line occurred, resulting from a gray level shift crossing the vicinity of a gray level value 192 among the gray level values 0 to 255.

On the other hand, as shown in FIG. 39, it can be seen that the foregoing motion picture pseudo contour resulting from the gray level shift crossing the vicinity of the gray level value 192 could be eliminated or drastically suppressed. Incidentally, in the vicinity of a horizontal coordinate 24 and the vicinity of a horizontal coordinates 464 to 498, the original picture was a picture dispersed in a spike-like form, and a picture of the motion picture pseudo contour was in an identical form. Therefore, it can be seen that in this case the motion picture pseudo contour was substantially identical to the original picture (the motion picture pseudo contour had some gray level errors, though they were hardly recognized).

Example 2

Figure 41:
FIG. 41 is a view illustrating a result of correction of a motion picture pseudo contour in the case where a ramp-waveform picture having horizontal gray level shifts is moved from left to right on the display screen.

Regarding Example 1, effects of correction in the case where only the picture and the motion speed were changed were examined. More specifically, the picture of a human face was changed to a ramp-waveform picture having horizontal gray level shifts, and the picture was moved from left to right in the display screen at a horizontal speed of +5 pixels/field. The result is shown in FIG. 41. The result in the case where the motion picture pseudo contour was not corrected is shown in FIG. 42.

In FIG. 42, two types of errors can be recognized in the gray level shifts that should have been smooth. More specifically, in the case of a gray level shift from a gray level value 0 to a gray level value 63, gray level errors occurred in a step-like form at every four gray levels, one error being relatively broad with a width of approximately 5 pixels, and as shown in FIG. 42 with arrows, intensive positive and negative gray level errors occurred at every 16 gray levels. Thus, it is understood that without correction, an extremely remarkable motion picture pseudo contour occurred.

Conversely, according to FIG. 41, it can be seen that the motion picture pseudo contour could be suppressed to an unnoticeable level, though line-like portions $P_{Err}$ indicating small gray level errors were dispersed uniformly.

Example 3

Effects of correction were examined under the same conditions as those in Example 1 except that the time division display method was changed to the time division display method that divides one field into sub-fields at a time ratio of 8:4:1:8, and that the second redundancy signal patterns 1 through 3 are used in FIGS. 25 through 27.

Figure 43:
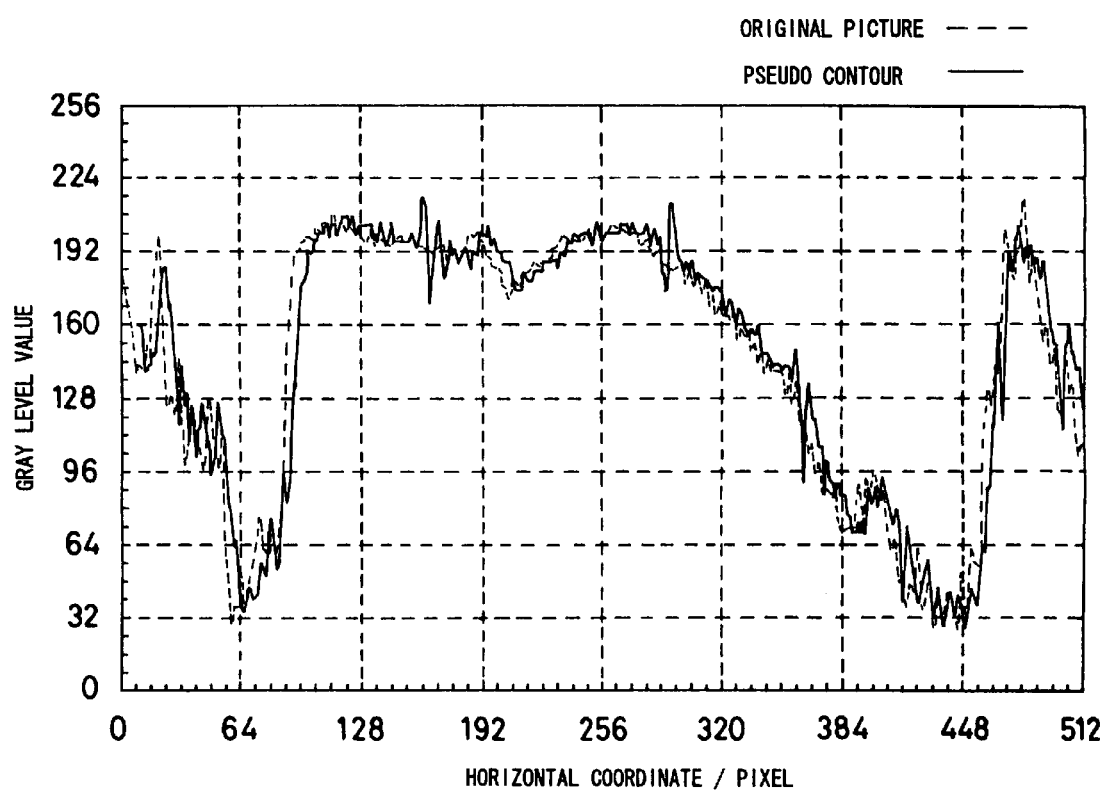
FIG. 43 is a graph showing gray level values as a result of correction with respect to one line of the same picture as that for FIG. 39 in the case where the picture is moved from right to left on the display screen by a driving sequence adopting a time division ratio different from that in the case of FIG. 39, the graph also showing gray level values of an original picture and those of a motion picture pseudo contour.

More specifically, a result of correction with respect to one line of the same picture of the human face as that in Example 1 is shown in FIG. 43, which was obtained in the case where the picture was moved from right to left on the display screen at a horizontal speed of −11 pixels/field.

Figure 44:
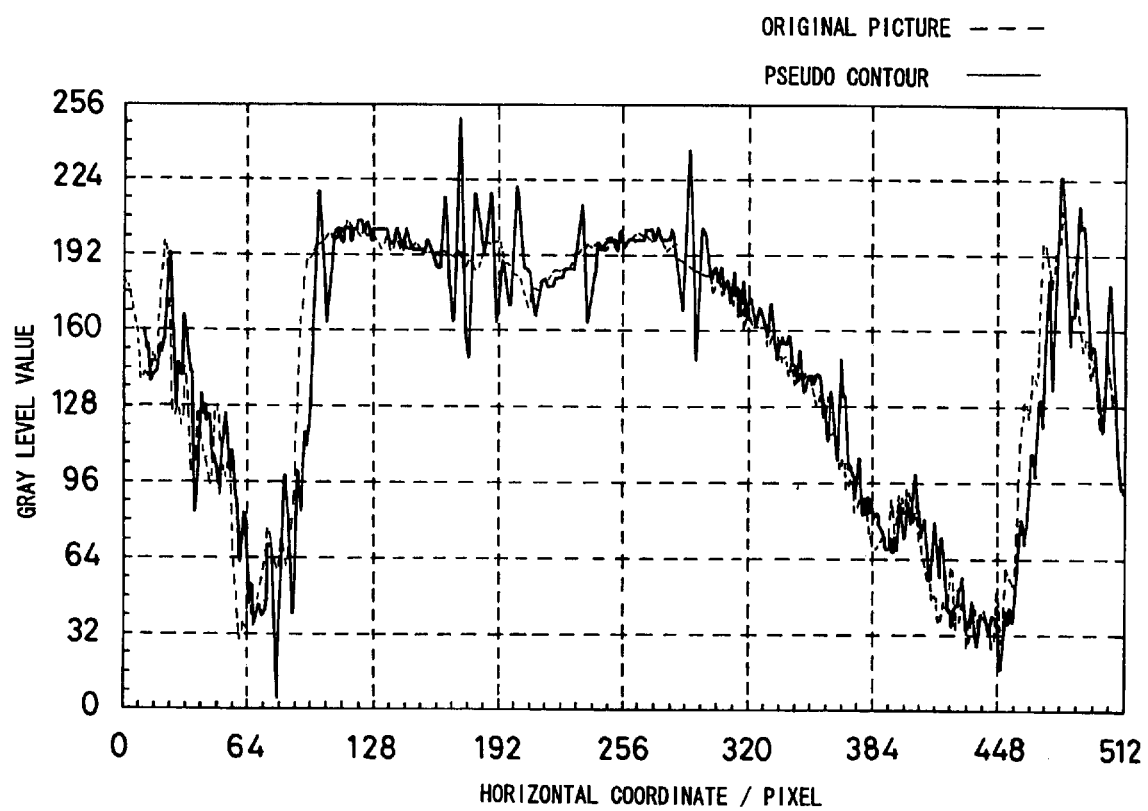
FIG. 44 is a graph, for comparison with the correction result shown in FIG. 43, showing gray level values of one line of the same picture as above in the case where the picture is moved in the same manner as above without correction of a motion picture pseudo contour, the graph also showing gray level values of the original picture and those of the motion picture pseudo contour.

On the other hand, to be compared with the result of correction shown in FIG. 43, gray level values of one line of the same picture as above are shown in FIG. 44, which were obtained in the case where only the second redundancy signal pattern 1 was used, the picture was moved at the same motion speed, and correction of a motion picture pseudo contour was not executed.

Comparing FIGS. 43 and 44, it can be seen that in FIG. 44, a motion picture pseudo contour having gray levels remarkably deviated from gray levels of the original picture indicated with the broken line occurred, resulting from a gray level shift crossing the vicinity of a gray level value 192 among the gray level values 0 to 255.

On the other hand, as shown in FIG. 43, it can be seen that the foregoing motion picture pseudo contour resulting from the gray level shift crossing the vicinity of the gray level value 192 could be drastically suppressed.

Example 4

Figure 45:
FIG. 45 is a view illustrating a result of correction with respect to a ramp-waveform picture having horizontal gray level shifts in the case where the picture is moved from left to right on the display screen by a driving sequence adopting a time division ratio different from that in the case of FIG. 41.

Regarding Example 3, effects of correction in the case where only the picture and the motion speed were changed were examined. More specifically, the picture of a human face was changed to a picture with a ramp waveform having horizontal gray level shifts that was used in Example 2, and the picture was moved from left to right in the display screen at a horizontal speed of +5 pixels/field. The result is shown in FIG. 45. The result in the case where the motion picture pseudo contour was not corrected is shown in FIG. 46.

Figure 46:
FIG. 46 is a view illustrating a display result in the case where the same picture as above is moved in the same manner as above without correction of a motion picture pseudo contour, for comparison with the correction result shown in FIG. 45.

In FIG. 46, in the case of a gray level shift from a gray level value 0 to a gray level value 63, gray level errors occurred in a step-like form at every four gray levels, one error being relatively narrow with a width of approximately 2 pixels, and intensive positive and negative gray level errors occurred at every 16 gray levels. Where these intensive gray level errors occur, changes from a bright state to a dark state (or vice versa) are seen as double lines. Thus, it is understood that without correction, an extremely remarkable motion picture pseudo contour occurred.

Conversely, according to FIG. 45, it can be seen that the motion picture pseudo contour that stands out in FIG. 46 could be suppressed to an unnoticeable level, though a noticeable gray level error remained with respect to a gray level shift crossing the vicinity of a gray level value 32.

Here, comparing FIGS. 41 and 45, the time division display method at a time ratio of 8:4:1:8 shown in FIG. 45 appears rather effective than the time division display method at a time ratio of 1:8:4:8 shown in FIG. 41.

As described above, however, since intensive gray level errors remain with respect to a gray level shift crossing the vicinity of the gray level value 32 in the case of the time division display method at 8:4:1:8 shown in FIG. 45, such gray level errors are noticeable in usual pictures which are mostly in halftones. In a part such as a face of a human particularly, which tends to undergo the foregoing gray level shift, there is possibility that a noticeable motion picture pseudo contour would occur to a face of a human.

Conversely, in the case of the time division display method at 1:8:4:8 shown in FIG. 41, slight gray level errors, if any, become hardly noticeable in natural pictures, since the errors are dispersed uniformly.

From the foregoing viewpoint, either the 8:4:1:8 method in which the correcting circuitry is simpler as described before or the 1:8:4:8 method in which the picture obtained is more natural may be selected according to an object.

Example 5

Regarding the driving method in accordance with Example 1, effects of correction in the case where the number of pixels whose original signals Po were fed with correction gray level signals Pc is changed were examined.

Figure 47:
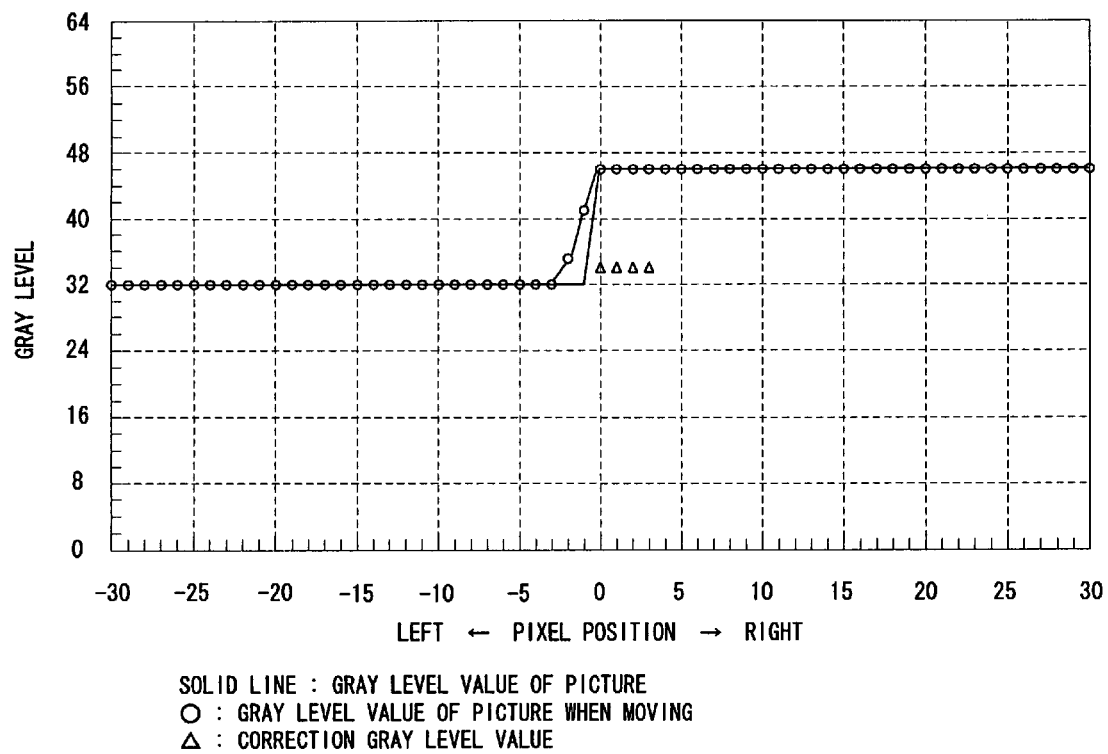
FIG. 47 is a graph showing gray level values as a result of correction with respect to pictures with different gray level values that are displayed adjacently on the screen and are moved from right to left in the screen, in the case where the number of pixels to be fed with correction gray level signals is set to at most 4.

A result of correction is shown in FIG. 47 that was obtained when the number of pixels supplied with a correction gray level signal Pc was set to at most 4 in the case where a picture with a gray level value A=32 and a picture with a gray level value B=46 are adjacently displayed and the picture is moved in a direction from the A=32 side to the B=46 side at a horizontal motion speed of +10 pixels/field.

Figure 48:
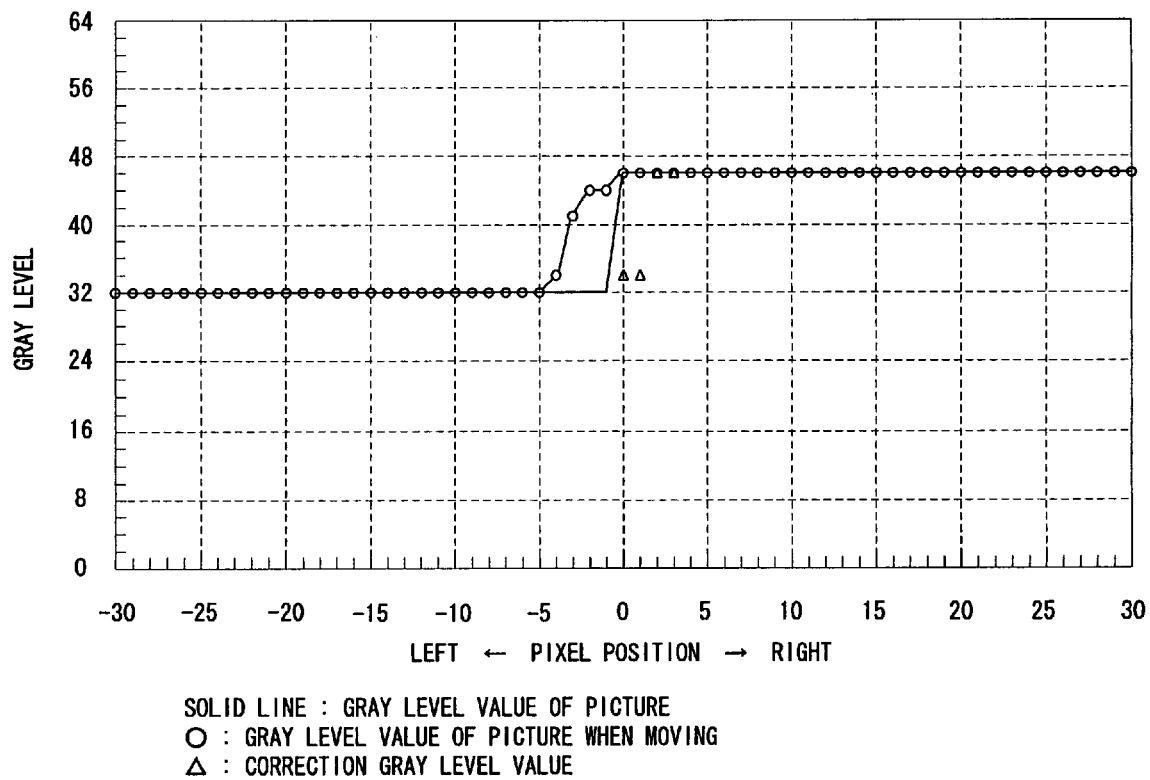
FIG. 48 is a graph, for comparison with the correction result shown in FIG. 47, showing gray level values in the case where the number of pixels to be fed with correction gray level signals is set to at most 2.
Figure 49:
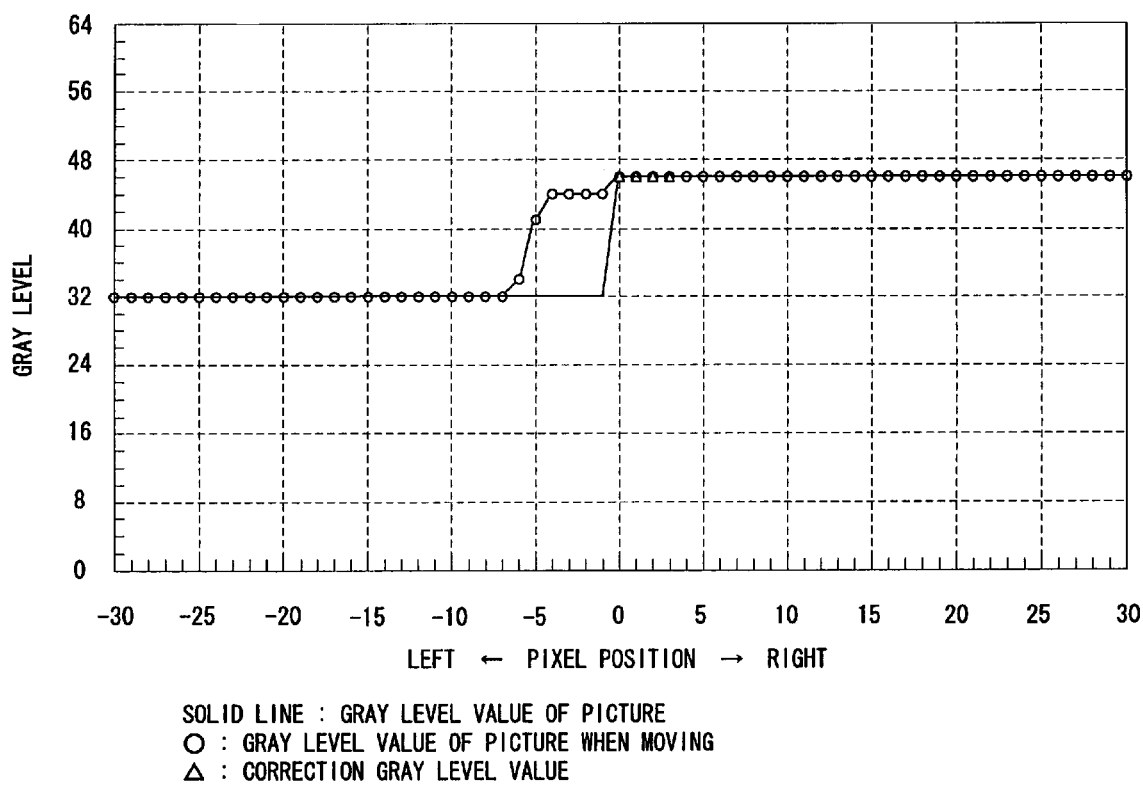
FIG. 49 is a graph illustrating, for comparison with the correction result shown in FIG. 47, showing gray level values in the case where no correction gray level signals is supplied.

To be compared with the result of correction shown in FIG. 47, a result of correction in the case where the number of pixels supplied with the correction gray level signal Pc was set to at most 2 is shown in FIG. 48, and how a motion picture pseudo contour occurred in the case where the correction gray level signal Pc was not applied at all is shown in FIG. 49.

According to FIG. 47, the motion picture pseudo contour considerably approximated to the original signals as compared with the cases shown in FIGS. 48 and 49, which shows that the motion picture pseudo contour was greatly suppressed. In actual visual test, an effect that blur of a contour at a gray level shifted was very slight.

Conversely, in the case of FIG. 48, blur of a contour where the gray level at a gray level shift was decreased as compared with the case of FIG. 49, but the effect was not as great as in the case of FIG. 47. In other words, the following was found: in the case where the number of pixels supplied with the correction gray level signal Pc was at most 2, sufficient correction could not be executed in the case of the foregoing motion speed, and blur of a contour remained.

Example 6

So far has been explained how the correction gray level signals are determined in the case where a picture moves from a focused pixel in a horizontal direction of a screen. The present example, however, relates to a method for determining correction gray level signals in the case where a picture moves from a focused pixel in a diagonal direction of a screen.

Figure 54A:
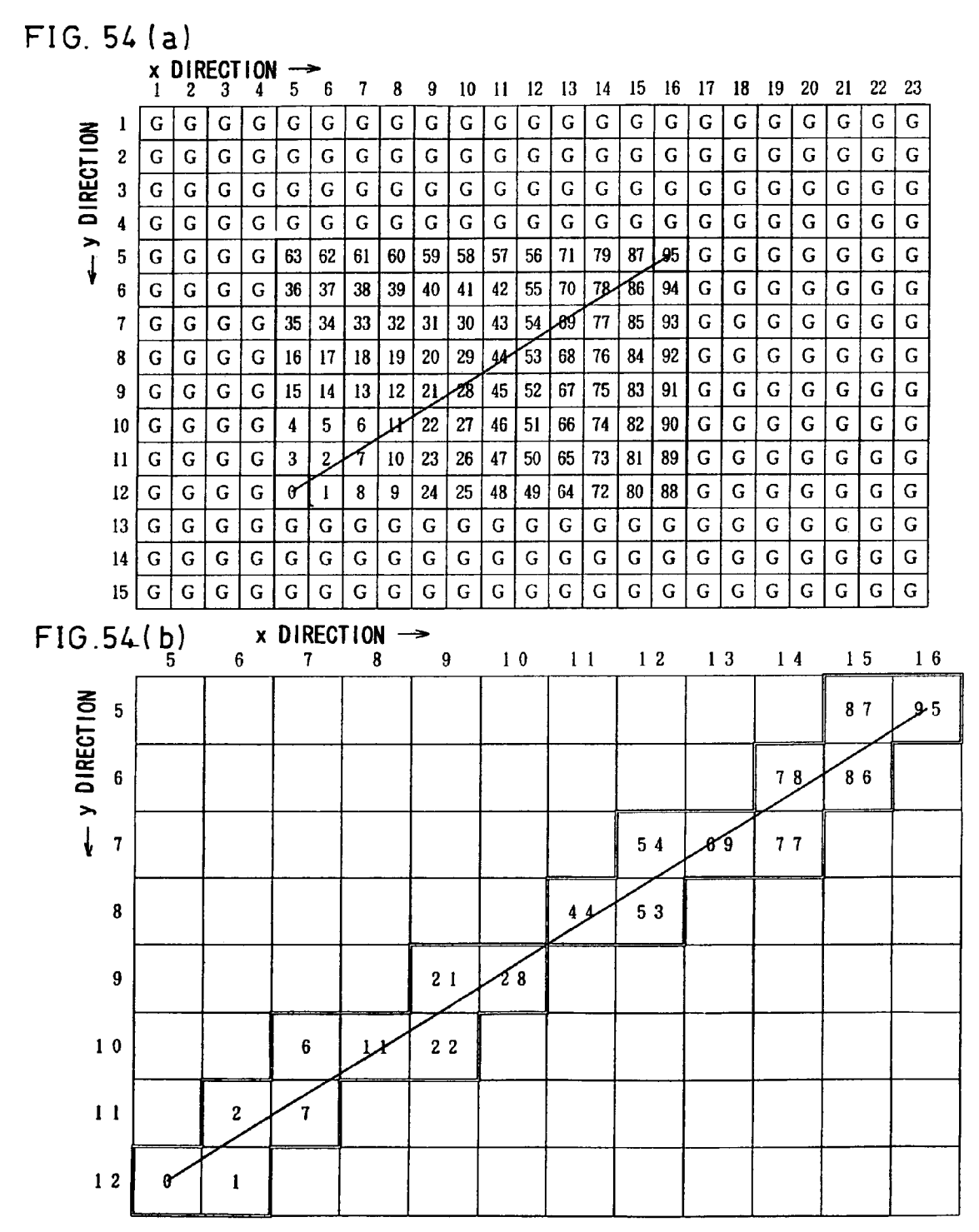

FIG. 54($a$) illustrates a two-dimensional pixel arrangement, numerals 1 through 23 along a horizontal axis are indicative of coordinates in an x direction, while numerals 1 through 15 along a vertical axis are indicative of coordinates in a y direction. At each crossing point of the x coordinates and the y coordinates, one pixel is provided.

Let a pixel at coordinates (x, y)=(5, 12) in FIG. 54($a$) be a focused pixel (a pixel with a numeral 0), and let a motion vector at the focused pixel be directed to coordinates (16, 5). In other words, an arrow drawn from the focused pixel toward an end pixel (a pixel with a numeral 95) located at the coordinates (16, 5) is indicative of a motion vector of the focused pixel. The numerals 0 through 95 in a thick rectangular frame in which a line connecting the focused pixel and the end pixel is its diagonal are indicative of respective numerals allotted to the pixels.

Incidentally, a horizontal component h of the motion vector of the present example is 11 pixels/field, while a vertical component v thereof is −7 pixels/field.

Here, prospective pixels to be fed with correction gray level signals are those in contact with a vector line (thin line drawn from the coordinates (5, 12) and the coordinates (16, 5)) of the motion vector. The pixels strongly affected by the motion vector (hereinafter referred to as prospective corrected pixels) are extracted and shown in FIG. 54($b$).

The following description will explain a method for selecting pixels to be fed with correction gray level signals out of the prospective corrected pixels.

First of all, checking the prospective corrected pixels in the x direction, two prospective corrected pixels are extracted with respect to each of several x coordinates. For instance, pixels numbered "1" and "2" are extracted at the x coordinate 6, pixels numbered "6" and "7" are extracted at the x coordinate 7, and pixels numbered "21" and "22" are extracted at the x coordinate 9.

To select one prospective corrected pixel with respect to one coordinate, a prospective corrected pixel on which lies a portion of the vector line with a greater x direction (horizontal direction) component is selected. In other words, a prospective corrected pixel contributing more to the x direction (horizontal direction) of the motion vector is selected. For instance, in the case of pixels numbered "86" and "87" at the x coordinate 15, an x direction component of a vector line lying on the pixel numbered "86" is greater than that on the pixel numbered "87". Therefore, the pixel numbered "86" is selected with respect to the x coordinate 15. 11 prospect corrected pixels thus selected regarding the horizontal contribution component (x direction) are shown in FIG. 55(a).

On the other hand, regarding the y direction (vertical direction), any one may be selected out of several selecting methods described below, considering correcting precision, costs, facilitation of design of circuit arrangement for generating the correction gray level signals, etc.

A first selecting method is based on the fact that correction in the vertical direction need not be as strict as correction in the horizontal direction, considering characteristics of human sense of sight. More specifically, in the case where two prospective corrected pixels are extracted with respect to the same y coordinate, like in the above-described case of the x direction, a prospective corrected pixel having an x coordinate closer to the focused pixel is selected.

For instance, in the case where the pixels numbered "2" and "7" at the y coordinate 11, the pixel numbered "2" is selected with respect to the y coordinate 11 since it has an x coordinate closer to the focused pixel. In the cases of the pixels numbered "54", "69", and "77" at the y coordinate 7, the pixel numbered "54" is selected with respect to the y coordinate 7 since it has an x coordinate closer to the focused pixel. 7 prospect pixels thus selected regarding vertical contribution components (y direction) are shown in FIG. 55(b).

A second selecting method is based on a further arranged concept of the first selecting method, in which a prospective corrected pixel is not selected regarding the y direction in the case where an x direction component of the motion vector thereat is equal to, or greater than, its y direction component thereof. In this case, regarding only x direction, prospective corrected t: z pixels are selected in the aforementioned manner.

A third selecting method attaches great importance to precision in the vertical direction as well, and satisfies the highest correcting precision. More specifically, like in the above-described case of the x direction, a prospective corrected pixel on which lies a portion of the vector line with a greater y direction (vertical direction) component is selected. In other words, a prospective corrected pixel contributing more to the y direction (vertical direction) of the motion vector is selected. 7 pixels in the y direction selected by this method are those numbered "0", "2", "11", "28", "44", "69", "78", and "95" in the order from the focused pixel.

Note that any one of the foregoing selecting methods may be combined with a method that, in the case where a difference between horizontal and vertical components of the motion vector, renders priority to correction of the greater component and applies no correction to the smaller component.

Next, pixels to be fed with correction gray level signals are determined, out of the prospective corrected pixels selected regarding the x and y directions. This determining method is, as explained before, such that pixels to be fed with correction gray level signals as well as correction gray level signals to be outputted are determined by computation with use of correcting formulae according to gray level shifts from the focused pixel to the adjacent pixels as well as horizontal or vertical components of a motion speed.

States in which pixels to be fed with correction gray level signals are thus determined regarding the horizontal contribution components and the vertical contribution components are shown in FIGS. 56(a) and 56(b), respectively. FIG. 56(a) indicates, with "2", "7", and "11'", that among 11 prospective corrected pixels regarding the horizontal contribution component shown in FIG. 55(a), the pixels numbered "2", "7", and "11" are to be supplied with correction gray level signals. More specifically, when the pixel numbered "0" is a focused pixel and the pixel numbered "2" is an adjacent pixel in the x direction, computation with use of correction formulae according to their gray level shifts and their horizontal components of the motion speed determines correction of at most 4 pixels, that is, correction of the pixels numbered "2", "7", and "11".

Furthermore, FIG. 56(b) indicates, with "2'"", "6'"", and "21'"", that among 7 prospective corrected pixels regarding the vertical contribution component shown in FIG. 55(b), the pixels numbered "2", "6", and "21" are to be supplied with correction gray level signals. More specifically, when the pixel numbered "0" is a focused pixel and the pixel numbered "2" is an adjacent pixel in the y direction, computation with use of correction formulae according to their gray level shifts and their vertical components of the motion speed determines correction of at most 4 pixels, that is, correction of the pixels numbered "2", "6", and "21".

In this case, if the horizontal component and the vertical component of the motion speed differ from each other, a correction gray level signal outputted to one pixel regarding the x direction could possibly be inconsistent with that outputted to the same pixel regarding the y direction. For instance, in the foregoing example, a correction gray level signal as to the x direction could possibly differs from that as to the y direction. In such a case, a rule may be predetermined with regard to which should be given priority, such that priority is given to output of a correction gray level signal in the x direction that is more significant to the sense of sight characteristics.

Figure 57:
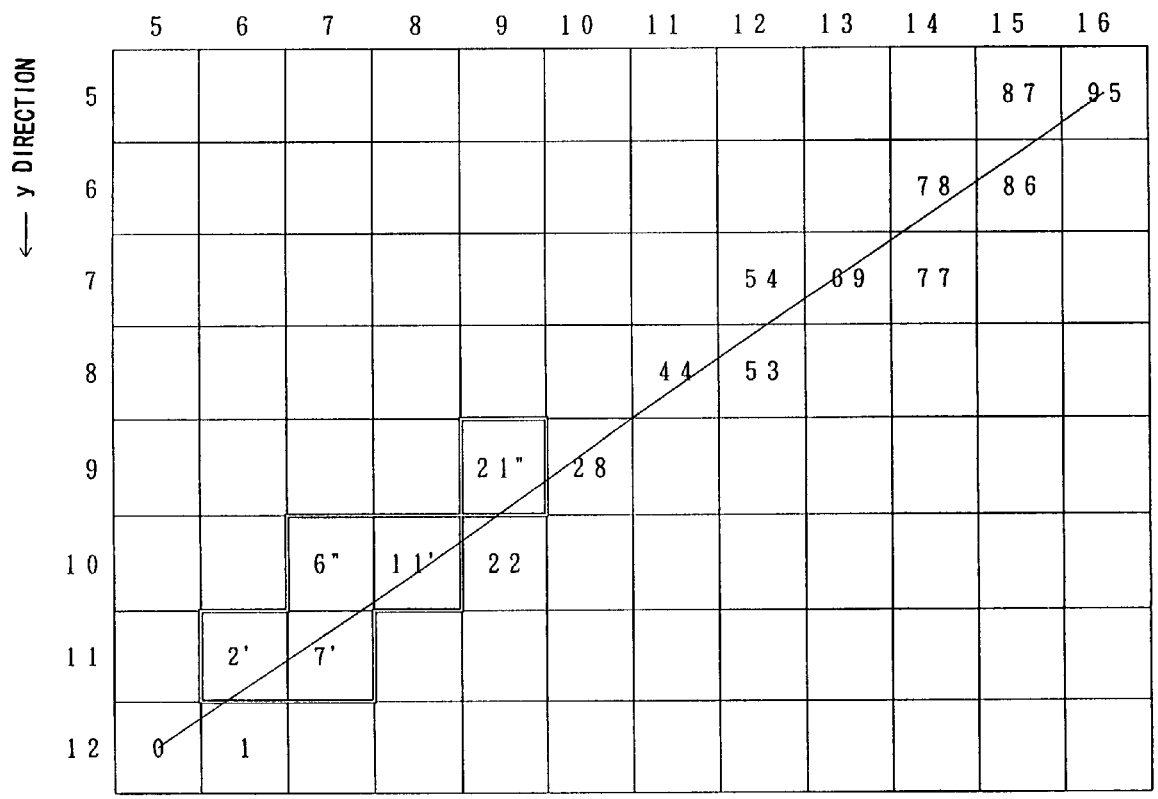
FIG. 57 is an explanatory view illustrating pixels to be fed with correction gray level signals, applied to FIG. 54(b).

Pixels to be fed with these correction gray level signals, applied to FIG. 54(b), are as shown in FIG. 57. In this example, a correction gray level signal determined as to the x direction is outputted to the pixel numbered "2". From FIG. 57, it can be seen that correction gray level signals are fed to 5 pixels arranged in the motion vector direction. This is because the motion vector is divided into an x direction component and a y direction component, regarding each of which at most 4 pixels are selected so as to be fed with correction gray level signals. Since thus the number of pixels to be fed with correction gray level signals exceeds 4 as to the motion vector direction, the correction precision can be improved.

Figure 58:
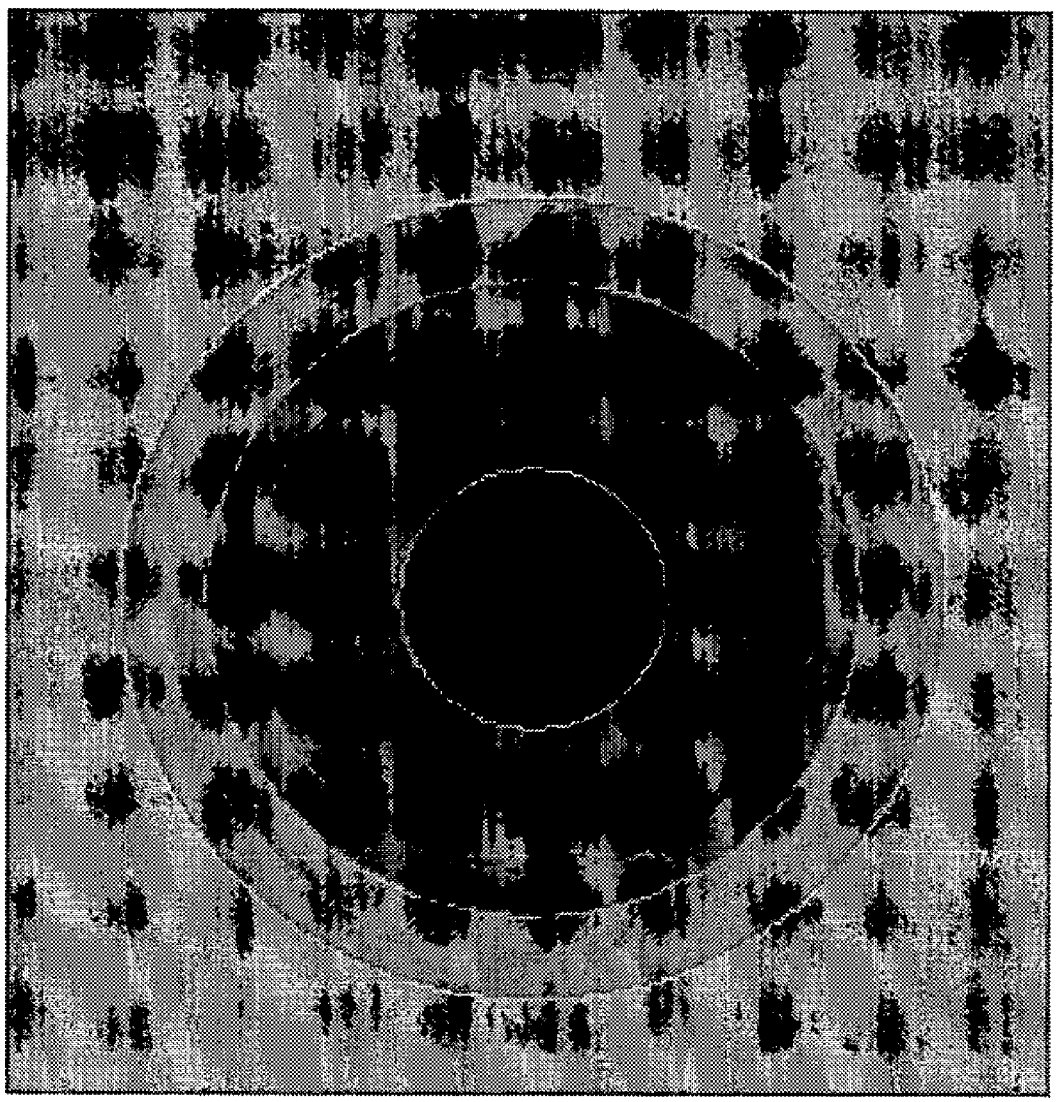
FIG. 58 is a test picture used in checking an effect of a motion picture pseudo contour correcting method shown in FIGS. 54(a) and 54(b) through 57.

Next, effects of the motion picture pseudo contour correction in accordance with the foregoing manner were examined. More specifically, a test picture (still picture) in centrifugal gradation shown in FIG. 58 was displayed by a gray-scale display method adopting the pixel division method at a pixel division ratio of 2:1 and the time division method at a time division ratio of 1:8:4:8 in combination, and by employing the first redundancy signal pattern 1. Gray level values of the test picture were, in an order from center to outside, 12, 16, 32, 36, 40, 44, and 48 among the gray level values of 0 to 63.

A speed component of +5 pixels/field in the horizontal direction and −5 pixels/field in the vertical direction was given, so as to move the test picture obliquely upward at an angle of 45° to the right in the screen.

Figure 59:
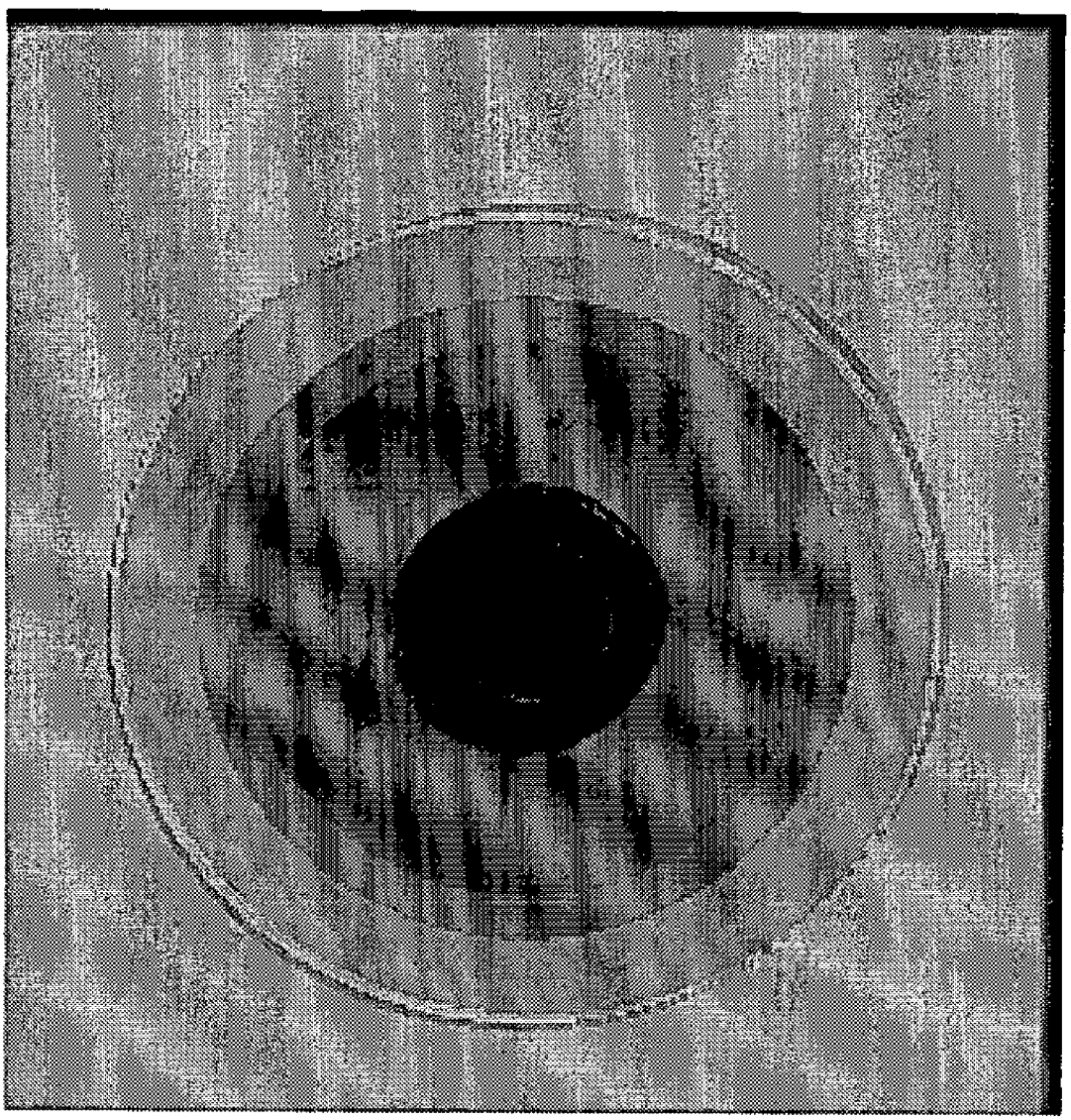
FIG. 59 is a view illustrating a motion picture pseudo contour generated when the test picture shown in FIG. 58 is moved in a diagonal direction of the display screen.

FIG. 59 shows a test picture not subjected to the motion picture pseudo contour correction. According to FIG. 59, intensive motion picture pseudo contours were recognized in the vicinity of a boundary between gray level values 12 and 16, the vicinity of a boundary between gray level values 16 and 32, and the vicinity of a boundary between gray level values 44 and 48.

Figure 60:
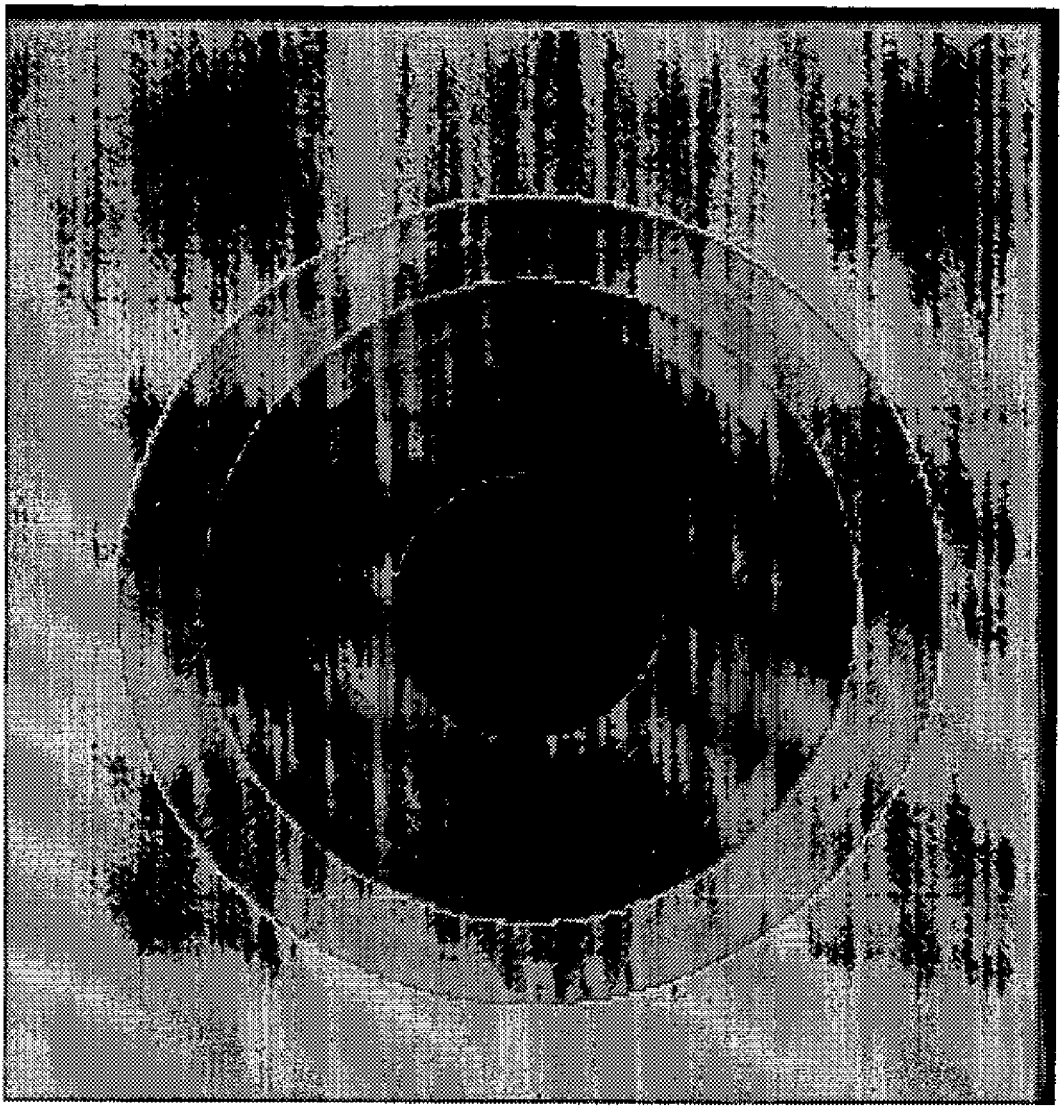
FIG. 60 is a view illustrating a result of correction of the motion picture pseudo contour generated as shown in FIG. 59 by the motion picture pseudo contour correcting method shown in FIGS. 54(a) and 54(b) through 57.

FIG. 60 shows a test picture subjected to the motion picture pseudo contour correction. According to FIG. 60, no intensive motion picture pseudo contour like that shown in FIG. 59 was not recognized, and it can be seen that the motion picture pseudo contour was corrected with high precision.

Incidentally, dark lines appear at an upper end and a right end of FIGS. 59 and 60 were produced due to lack of data for calculation, and had nothing to do with the effect of the present embodiment.

It is also possible to manufacture a motion picture pseudo contour correction signal generating circuit that realizes the motion picture pseudo contour correcting method in accordance with the present invention that has been described. The motion picture pseudo contour correction signal generating circuit is applicable to a display device including a device for detecting motion information of a picture, in which each frame or field is divided into N ($\geq 2$) sub fields for image display, and each pixel is composed of M ($\geq 2$) sub-pixels, and is characterized in that a motion picture pseudo contour correction-use gray level signal in accordance with a gray level information of a focused pixel, gray level information of pixels adjacent to the focused pixel, and motion information of a picture is supplied to an original signal.

The motion picture pseudo contour correction-signal generating circuit is preferably arranged so as to, with use of logical circuitry, process signal information regarding gray level signals to be supplied to pixels in the motion direction, according to gray level information about a focused pixel in the same field or frame, gray level information about a pixel adjacent to the focused pixel, and picture motion information.

Furthermore, the motion picture pseudo contour correction signal generating circuits are preferably divided into groups corresponding to respective ranges of gray levels, rather than being provided so as to correspond to gray levels to be corrected. More preferably, a referential circuit for identify groups of the motion picture pseudo contour correction signal generating circuits grouped so as to correspond to respective gray level ranges.

As described above, a "motion picture pseudo contour correcting method" in accordance with the present invention may be a motion picture pseudo contour correcting method in a gray level display method that utilizes at least a time division method in which one field period or one frame period in image display is divided into a plurality of sub-fields, said motion picture pseudo contour correcting method comprising the steps of (i) generating a motion picture pseudo contour correction-use signal according to gray level information of a focused pixel of a picture in a certain field or a frame, gray level information of a pixel adjacent to the focused pixel in the same field or in the same frame, and picture motion information detected regarding the picture of the field or the frame, and (ii) outputting the motion picture pseudo contour correction-use signal with respect to an original signal of the picture of the field or the frame.

In the foregoing arrangement, the motion picture pseudo contour is a unique phenomenon that occurs with travel of the view point of the observer upon display of a motion picture by means of the image display device that executes gray-scale display applying at least the time division gray-scale display method. The inventors of the present application researched in detail how the phenomenon take places, and found a new fact that the magnitude of gray level turbulence and a range of pixels affected by the gray level turbulence in the motion picture pseudo contour that occurs vary depending on the motion of the picture and gray levels of a focused pixel and pixels adjacent to the focused pixel in a direction of the motion of the picture.

Therefore, contrary to the conventional case in which respective gray level turbulence of focused pixels in two successive frames is detected and a motion picture pseudo contour correction-use signal according to a magnitude of gray level turbulence is generated so as to correct the gray level turbulence, a motion picture pseudo contour correction-use signal is generated in the present invention according to gray level information of a focused pixel and that of adjacent pixels in the same field or frame and motion information detected as to the picture in the field or frame, so as to achieve motion picture pseudo contour correction with higher precision than conventionally.

More specifically, contrary to the conventional case in which only time-related gray level turbulence at a focused pixel is detected in generation of a motion picture pseudo contour correction-use signal, spatial gray level turbulence in the same field or frame is detected in the present invention from gray level information of the focused pixel and adjacent pixels, and gray level turbulence in the picture motion direction as time passes is also detected by combining the spatial gray level turbulence with motion information of the picture.

Therefore, according to the motion picture pseudo contour correction method of the present invention, since two factors of the spatial gray level turbulence and time-related gray level turbulence are used to detect a motion picture pseudo contour occurring, not only the magnitude of the gray level turbulence in the motion picture pseudo contour but also a range of pixels affected by the gray level turbulence can be precisely detected.

Accordingly, by outputting to an original signal the motion picture pseudo contour correction-use signal generated according to gray level information of a focused pixel and adjacent pixels in the same field or frame and motion information, gray level error generated in the field and frame can be compensated in two directions of the time direction and the spatial direction, so that motion picture pseudo contour correction can be achieved with higher direction than conventionally.

Furthermore, without adopting a method for reducing an amplitude of a motion picture pseudo contour by dividing a sub-field period with a long light emission period so as to increase the number of sub-field periods with short light emission periods as conventionally, motion picture pseudo contour correction with higher precision than conventionally can be achieved. Moreover, by further carrying out the foregoing division of a sub-field period, motion picture pseudo contour correction with further higher precision can be achieved.

Incidentally, the method in accordance with the present invention is effective not only for a motion picture generally used in television, but also particularly for a picture obtained by computation by computer. This is because it is possible to carry out motion picture pseudo contour correction in a formulary manner according to information inputted thereto, since a computer produces internal data of signals for itself.

Furthermore, to solve the aforementioned problems, the motion picture pseudo contour correcting method in accordance with the present invention may be arranged so that, to cause a pixel to display a certain gray level, a plurality of signal patterns for selection of light emission of the sub-fields are prepared, and the motion picture pseudo contour correction-use signal is selected from the plurality of patterns.

According to the foregoing arrangement, with respect to a motion picture pseudo contour in a certain shape, a signal pattern that generates a motion picture pseudo contour in a shape such that the foregoing occurring motion picture pseudo contour should be cancelled is selected, based on the newly-discovered fact that at least a shape of a motion picture pseudo contour changes when a signal pattern for selection of light emission of a sub-field is different even with the same gray level information and motion information. This enables correction of the foregoing-motion picture pseudo contour, and therefore, it is possible to generate a motion picture pseudo contour correction-use signal by a simple method in which a motion picture pseudo contour correction-use signal is selected from a plurality of patterns prepared beforehand. This facilitates simplification of the circuit arrangement for generating the motion picture pseudo contour.

Furthermore, to solve the aforementioned problems, the motion picture pseudo contour correcting method in accordance with the present invention may be arranged so that the motion picture pseudo contour correction-use signal is generated with respect to not less than one pixel selected, according to a magnitude of a motion picture pseudo contour generated, from among a plurality of pixels arranged from the focused pixel in a direction of the motion of the picture.

Concerning the foregoing arrangement, at most 8 pixels are adjacent to the focused pixel in the same field or frame, but those affected by a motion picture pseudo contour among these 8 adjacent pixels are the pixels adjacent in the picture motion direction to the focused pixel. It was also discovered that the influence of gray level turbulence is not limited to the pixels adjacent in the picture motion direction, but it is extended to a plurality of pixels continued in the picture motion direction.

Therefore, it is possible to appropriately suppress the influence of the gray level turbulence to minimum, by generating the motion picture pseudo contour correction-use signal with respect to not only one pixel selected, according to a magnitude of the motion picture pseudo contour that occurs, from among a plurality of pixels arranged in the picture motion direction from the focused pixel.

Furthermore, to solve the foregoing problems, the motion picture pseudo contour correcting method in accordance with the present invention may be arranged so that the time division method is used in combination with a pixel division method in which one pixel is composed of a plurality of sub-pixels.

According to the foregoing arrangement, the time division method and the pixel division method are used in combination in the motion picture pseudo contour correcting method in accordance with the present invention. Therefore, as compared with the case where gray-scale display by application of only the time division method, it is possible to decrease the number of time divisions required to obtain a certain number of gray levels. Consequently, it is possible to facilitate control of pixel operation timing in image display, while it is possible to provide a display device with low power consumption.

The present invention proposes a motion picture pseudo contour correcting method that has not conventionally been proposed in the time division/pixel division-type gray-scale display method having such advantages. Conventionally, since suppression of motion picture pseudo contour has been attempted by dividing a sub-field with a long light emission period so as to rather increase the number of time divisions, secondary problems occurred such as difficulty of control of operation timings and high power consumption. On the contrary, in the present invention, since a motion picture pseudo contour correction-use signal is generated with use of two factors of spacial gray level turbulence and time-related gray level turbulence while occurrence of the foregoing problems is avoided by decreasing the number of time divisions, motion picture pseudo contour correction with higher precision than conventionally can be realized.

Furthermore, the motion picture pseudo contour correcting method in accordance with the present invention may be arranged so that at most 4 pixels are selected, according to a magnitude of a motion picture pseudo contour generated, from among a plurality of pixels arranged from the focused pixel in a direction of the motion of the picture.

The reason why the number of selected pixels is set to at most 4 in the foregoing arrangement is as follows. As the number of pixels whose original signals are fed with motion picture pseudo contour correction-use signals increases, the interference due to the gray level turbulence decreases, whereas there is possibility that effects of the original picture may possibly be greatly impaired. In the case where conversely a correction gray level signal is outputted to an extremely smaller number of pixels than the number of pixels that require the correction gray level signal, it becomes impossible to reduce interference so that the interference should fall in a tolerable range.

Considering that the motion picture pseudo contour need not be completely eliminated in the case where the motion speed is higher than a certain level since generally to recognize details of a picture becomes difficult when the motion speed is high, it is adequate that the number of pixels whose original signals are fed with motion picture pseudo contour correction-use signals should be about 4. This was found as a result of repeated researches by the inventors of the present application.

Bi-polar gray level turbulence in which the gray level value falls and rises beyond the gray level value of the original signal is particularly difficult to correct, but it was also found that to correct such a motion picture pseudo contour to a substantially unnoticeable level, it is necessary to carry out correction with respect to at least three pixels, irrespective of the picture motion speed. Therefore, by setting the number of pixels to be corrected to at most 4, that is, 3 as the minimum number ensuring to make a motion picture pseudo contour plus 1 to spare, it is possible to execute correction to make the motion picture pseudo contour unnoticeable without impairing effects of the original picture.

Furthermore, in the case where the number of pixels to which the motion picture pseudo contour correction-use signals are supplied is at most four, an advantage can be achieved such that complexity can be avoided concerning the circuit arrangement for generating the motion picture pseudo contour correction-use signals.

Furthermore, to solve the aforementioned problems, the motion picture pseudo contour correcting method in accordance with the present invention may be arranged so that formulae that are used in generating the motion picture pseudo contour correction-use signal are formularized based on motion picture pseudo contour generation patterns according to respective gray level information of the focused pixel and the adjacent pixels and the motion information.

In the foregoing arrangement, the magnitude of gray level turbulence and the range of pixels affected by the gray level turbulence in the motion picture pseudo contour vary depending on the motion of the picture and the gray level values of pixels adjacent in the picture motion direction as described before. Therefore, to generate motion picture pseudo contour correction-use signals for each of pixels, an arrangement is required that is capable of obtaining motion picture pseudo contour correction-use signals corresponding to combinations of gray levels of a focused pixel and gray levels of adjacent pixels as well as according to motion of the picture. Consequently, this leads to making the circuit arrangement enormous.

On the contrary, focusing generation patterns of the motion picture pseudo contour such as the magnitude of gray level turbulence and the range of pixels affected by the gray level turbulence, it was found that the number of the patterns is considerably smaller than the number corresponding to a product of the number of gray levels of the focused pixel and the number of gray levels of the adjacent pixel as well as according to the motion of the picture.

Since the motion picture pseudo contour generation patterns can be classified according to the gray level information of the focused pixel and adjacent pixels and the motion information, it is possible to, by preparing formularized computing expressions according to motion picture pseudo contour generation patterns, patternize circuit arrangements capable of generating a motion picture pseudo contour correction-use signal according to gray level information of the focused pixel and adjacent pixels and motion information.

Furthermore, to solve the aforementioned problems, the motion picture pseudo contour correcting method in accordance with the present invention may be further arranged so that formulae that are used in generating the motion picture pseudo contour correction-use signal are grouped in a block form, according to a predetermined range of gradating gray level values in series that the focused pixel may take, and a predetermined range of gradating gray level values in series that the adjacent pixel may take.

With the foregoing arrangement, it is possible, for the same reason as that in the foregoing formularization of computing expressions, to patternize the circuit arrangement for generating the motion picture pseudo contour correction-use signal, so as to simplify the circuit arrangement.

Moreover, by grouping computing expressions in a block form, according to ranges of gray level values of the focused pixel and adjacent pixels, the formularized computing expressions can be reduced to a further smaller number of patterns according to the ranges of gray level values, as compared with the case where the computing expressions are simply formularized; in other words, they can be approximated to more convenient patterns. This allows to further simplify the circuit arrangement.

Furthermore, to solve the aforementioned problems, the motion picture pseudo contour correcting method in accordance with the present invention may be arranged so that the detected motion information of the picture is divided into components in two directions crossing on a screen, and the motion picture pseudo contour correction-use signal is generated as to at least one of the two components.

According to the foregoing arrangement, motion information of a picture is divided into components of two directions crossing on the screen in the case where a motion direction of the picture is diagonal with respect to both the horizontal and vertical directions, and this enables to specify pixels greatly contributing to motion of a picture, as to each of the two components. Therefore, by generating motion picture pseudo contour correction-use signals for the pixels specified as to the two components, correction can be carried out with respect to the both components, and consequently, motion picture pseudo contour correction with the highest precision can be realized. In the case where a motion picture pseudo contour correction-use signal is generated for either of the two components of the specified pixel, the process for generating the motion picture pseudo contour correction-use signal can be simplified while the circuit arrangement for generating the motion picture pseudo contour correction-use signal can be simplified, though the simplification is limited to an extent such that a required precision of correction should be achieved.

Furthermore, to solve the aforementioned problems, an image display device in accordance with the present invention is an image display device that executes gray-scale display by adopting at least the time division method in which one field period or one frame period in image display is divided into a plurality of sub-fields, and is arranged so as to include (i) a gray level information detecting section for detecting gray level information of a focused pixel in a picture of a certain field or frame, and gray level information of a pixel adjacent to the focused pixel in the same field or in the same frame, (ii) a motion information detection section for detecting motion information of the picture in the field or the frame, (iii) a correction-use signal generating section for generating a motion picture pseudo contour correction-use signal according to the respective detected gray level information of the focused pixel and adjacent pixel, and the detected motion information, and (iv) a signal inserting section for outputting the motion picture pseudo contour correction-use signal to an original signal of the picture of the field or the frame.

With the foregoing arrangement, based on a newly-discovered fact that the magnitude of gray level turbulence and a range of pixels affected by the gray level turbulence in the motion picture pseudo contour that occurs vary depending on the motion of the picture and gray levels of a focused pixel and pixels adjacent to the focused pixel in a direction of the motion of the picture, the correction-use signal generating section generates a motion picture pseudo contour correction-use signal according to gray level information detected by the gray level information detecting section and motion information detected by the motion information detecting section.

More specifically, the correction-use signal generating section generates a motion picture pseudo contour correction-use signal according to two factors of spatial gray level turbulence as to pixels in the same field or frame and time-related gray level turbulence that can be detected by combining the spatial gray level turbulence with motion information of a picture. Therefore, by causing the signal inserting section to feed such a motion picture pseudo contour correction-use signal to an original signal, motion picture pseudo contour correction can be achieved with high precision, as compared with the conventional device in which a motion picture pseudo contour is suppressed based on only time-related gray level turbulence.

Furthermore, to solve the aforementioned problems, another image display device in accordance with the present invention is an image display device that executes gray-scale display by adopting at least the time division method in which one field period or one frame period in image display is divided into a plurality of sub-fields, and it may be arranged so as to include (i) a gray level information detecting section for detecting gray level information of a focused pixel in a picture of a certain field or frame, and gray level information of a pixel adjacent to the focused pixel in the same field or in the same frame, (ii) a motion information detecting section for detecting motion information of the picture in the field or the frame, (iii) a memory medium in which motion picture pseudo contour correction-use gray levels are stored that have been prepared beforehand along with their correspondence to gray level information of pixels that would become the focused pixel and adjacent pixel and motion information, (iv) a signal inserting section for recalling a motion picture pseudo contour correction-use gray level value from said memory medium according to the respective detected gray level information of the focused pixel and the adjacent pixel and the detected motion information, and for outputting the recalled value as a motion picture pseudo contour correction-use signal to an original signal of the picture of the field or the frame.

According to the foregoing arrangement, motion picture pseudo contour correction-use gray level values are prepared beforehand and are stored in a memory medium. Therefore, the foregoing arrangement makes unnecessary a circuit arrangement for generating a motion picture pseudo contour correction-use signal as required. Furthermore, a time needed for computation for generation of the motion picture pseudo contour correction-use signal can be reduced to a time necessary for simple operation for designating an address in the memory medium.

Furthermore, the foregoing motion picture pseudo contour correction-use gray level value is obtained according to two factors of spatial gray level turbulence as to pixels in the same field or frame and time-related gray level turbulence that can be detected by combining the spatial gray level turbulence with motion information of a picture. Therefore, this enables motion picture pseudo contour correction with high precision.

Therefore, the present invention enables to provide an image display device capable of carrying out motion picture pseudo contour correction with high precision in a simple arrangement within a short time.

Furthermore, to solve the aforementioned problems, another image display device of the present invention is an image display device that executes gray-scale display by adopting at least the time division method in which one field period or one frame period in image display is divided into a plurality of sub-fields, and may arranged so as to include (i) motion picture pseudo contour classifying means for detecting a magnitude and/or a shape of a motion picture pseudo contour occurring to a focused pixel in a picture of a certain field or frame, and for outputting recognition information of the magnitude and/or the shape, (ii) a memory medium in which stored are motion picture pseudo contour correction-use gray level values for correcting a motion picture pseudo contour, having been calculated beforehand for each magnitude and/or each shape, and (iii) signal inserting means for recalling a motion picture pseudo contour correction-use gray level value from said memory medium according to the recognition information outputted from said motion picture pseudo contour classifying means, and for outputting the recalled value as a motion picture pseudo contour correction-use signal to an original signal of the picture of the field or the frame.

In the foregoing arrangement, the magnitude of a motion picture pseudo contour is a magnitude of gray level turbulence occurring to a focused pixel as a picture moves, while the shape of a motion picture pseudo contour is a magnitude of gray level turbulence when a spatial range of pixels that are affected by the gray level turbulence is considered. It was found that the magnitude and/or shape of such a motion picture pseudo contour vary depending on motion of a picture and gray level values of a focused pixel and pixels adjacent to the focused pixel in the picture motion direction. Therefore, by detecting magnitude and/or shape of a motion picture pseudo contour occurring to a focused pixel and by correcting a motion picture pseudo contour according to the magnitude and/or shape thereof, motion picture pseudo contour correction with high precision can be achieved.

Since motion picture pseudo contour correction-use gray level values that enable such motion picture pseudo contour correction with high precision are determined beforehand and stored in a memory medium, the foregoing arrangement makes unnecessary a circuit arrangement for generating a motion picture pseudo contour correction-use signal as required. Furthermore, a time needed for computation for generation of the motion picture pseudo contour correction-use signal can be reduced to a time necessary for simple operation for designating an address in the memory medium.

Therefore, the present invention enables to provide an image display device capable of carrying out motion picture pseudo contour correction with high precision in a simple arrangement within a short time.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A motion picture pseudo contour correcting method comprising the steps of:
   detecting a gray level shift from a focused pixel in a frame of a motion picture to an adjacent pixel in the frame, as gray level information of the focused pixel;
   detecting a motion vector indicative of a speed and a direction of motion of a picture from the focused pixel to another pixel, as motion information of the focused pixel; and
   generating a correction gray level signal using one of a plurality of logical formulae, wherein each logical formula is formularized for each of a plurality of motion picture pseudo contour correction patterns classified,
   wherein each correction pattern is classified according to the respective gray level information of the focused pixel and adjacent pixel, and the motion information.

2. The motion picture pseudo contour correcting method as set forth in claim 1, further comprising:
   selecting a correction pattern from among the plurality of correction patterns, based on the gray level information detected, and the logical formula being determined for each of the correction patterns; and
   determining the correction gray level signal by selecting the logical formula corresponding to the correction pattern selected; and
   generating the corrected gray level signal by synthesizing the correction gray level signal determined and an original signal.

3. The motion picture pseudo contour correcting method as set forth in claim 2, wherein, the correction gray level signals are generated with respect to prospective corrective pixels in which pixels affected by the motion vector are selected as prospective corrected pixels, among pixels that the motion vector passes.

4. The motion picture pseudo contour correcting method as set forth in claim 3, wherein at most 4 prospective corrected pixels are selected.

5. A motion picture pseudo contour correcting method in a gray level display method that utilizes at least a time division method in which one field period or one frame period in image display is divided into a plurality of sub-fields, said motion picture pseudo contour correcting method comprising the steps of:
  generating a motion picture pseudo contour correction-use signal according to one of a plurality of formulae, wherein each formula is formularized for each of a plurality of motion picture pseudo contour correction patterns classified, wherein each correction pattern is classified in accordance with gray level information of a focused pixel of a picture in a certain field or a frame, gray level information of a pixel adjacent to the focused pixel in the same field or in the same frame, and picture motion information detected regarding the picture of the field or the frame; and
  outputting the motion picture pseudo contour correction-use signal with respect to an original signal of the picture of the field or the frame.

6. The motion picture pseudo contour correcting method as set forth in claim 5, wherein the motion picture pseudo contour correction-use signal is generated with respect to not less than one pixel selected, according to a magnitude of a motion picture pseudo contour generated, from among a plurality of pixels arranged from the focused pixel in a direction of the motion of the picture.

7. The motion picture pseudo contour correcting method as set forth in claim 5, wherein the time division method is used in combination with a pixel division method in which one pixel is composed of a plurality of sub-pixels.

8. The motion picture pseudo contour correcting method as set forth in claim 5, wherein at most 4 pixels are selected, according to a magnitude of a motion picture pseudo contour generated, from among a plurality of pixels arranged from the focused pixel in a direction of the motion of the picture.

9. The motion picture pseudo contour correcting method as set forth in claim 5, wherein the detected motion information of the picture is divided into components in two directions crossing on a screen, and the motion picture pseudo contour correction-use signal is generated as to at least one of the two components.

10. A motion picture pseudo contour correcting method in a gray level display method that utilizes at least a time division method in which one field period or one frame period in image display is divided into a plurality of sub-fields, said motion picture pseudo contour correcting method involving generating a motion picture pseudo contour correction-use signal according to gray level information of a focused pixel of a picture in a certain field or a frame, gray level information of a pixel adjacent to the focused pixel in the same field or in the same frame, and picture motion information detected regarding the picture of the field or the frame, said motion picture pseudo contour correcting method comprising the steps of:
  generating the motion picture pseudo contour correction-use signal using one of a plurality of formula, wherein each formulae is formularized for each group of gray level shifts between the focused pixel and the adjacent pixel, in order to generate the motion picture pseudo contour correction-use signal using the same computation with respect to gray level shifts of the same group; and
  outputting the motion picture pseudo contour correction-use signal to an original signal of the picture of the field or the frame.

11. An image display device comprising:
  a gray level information detecting section for detecting a gray level shift from a focused pixel to an adjacent pixel as gray level information of the focused pixel;
  a motion information detecting section for detecting a motion vector indicative of a speed and a direction of a picture when the picture moves from the focused pixel to another pixel, as motion information of the focused pixel; and
  a computing section for generating a correction gray level signal using one of a plurality of logical formula, wherein each logical formulae is formularized for each of a plurality of motion picture pseudo contour correction patterns classified, wherein each correction pattern is classified according to the respective gray level information of the focused pixel and adjacent pixel, and the motion information.

12. The image display device as set forth in claim 11, further comprising:
  a signal inserting section for generating a corrected gray level signal by synthesizing the correction gray level signal determined by said computing section and an original signal of the picture,
  wherein:
  said gray level information detecting section selects a correction pattern from among the plurality of correction patterns, according to the gray level information detected, the logical formulae being determined for each of the correction patterns; and
  said computing section determines the correction gray level signal by computing according to the logical formula corresponding to the correction pattern selected.

13. An image display device that executes gray-scale display by adopting at least the time division method in which one field period or one frame period in image display is divided into a plurality of sub-fields, said image display device comprising:
  a gray level information detecting section for detecting gray level information of a focused pixel in a picture of a certain field or frame, and gray level information of a pixel adjacent to the focused pixel in the same field or in the same frame;
  a motion information detection section for detecting motion information of the picture in the field or the frame;
  a correction-use signal generating section for generating a motion picture pseudo contour correction-use signal using one of a plurality of logical formulae, wherein each logical formula is formularized for each of a plurality of motion picture pseudo contour correction patterns classified, wherein each correction pattern is classified according to the respective detected gray level information of the focused pixel and adjacent pixel, and the detected motion information; and
  a signal inserting section for outputting the motion picture pseudo contour correction-use signal to an original signal of the picture of the field or the frame.

14. An image display device that executes gray-scale display by adopting at least the time division method in which one field period or one frame period in image display is divided into a plurality of sub-fields, said image display device comprising:
- a gray level information detecting section for detecting gray level information of a focused pixel of a picture in a certain field or a frame and gray level information of a pixel adjacent to the focused pixel in the same field or in the same frame;
- a motion information detecting section for detecting motion information of the picture in the field or the frame;
- a correction-use signal generating section for generating a motion picture pseudo contour correction-use signal according to the respective detected gray level information of the focused pixel and adjacent pixel, and the detected motion information, gray level shifts between the focused pixel and the adjacent pixel being grouped, the correction-use signal generating section generating the motion picture pseudo contour correction-use signal in accordance with a plurality of formulae, wherein each formula is formularized for each group of the gray level shifts, in order to generate the motion picture pseudo contour correction-use signal using the same computation with respect to gray level shifts of the same group; and
- a signal inserting section for outputting the motion picture pseudo contour correction-use signal to an original signal of the picture of the field or the frame.

* * * * *